(12) United States Patent
Yamatani et al.

(10) Patent No.: US 9,638,267 B2
(45) Date of Patent: May 2, 2017

(54) DRIVING FORCE TRANSMISSION DEVICE

(71) Applicant: JTEKT CORPORATION, Osaka-shi, Osaka (JP)

(72) Inventors: Tomoya Yamatani, Toyota (JP); Gento Aramoto, Osaka (JP); Tsuyoshi Okumura, Yamatokoriyama (JP)

(73) Assignee: JTEKT CORPORATION, Osaka-shi (JP)

( * ) Notice: Subject to any disclaimer, the term of this patent is extended or adjusted under 35 U.S.C. 154(b) by 7 days.

(21) Appl. No.: 14/968,239

(22) Filed: Dec. 14, 2015

(65) Prior Publication Data
US 2016/0169300 A1     Jun. 16, 2016

(30) Foreign Application Priority Data

| Dec. 15, 2014 | (JP) | ................................. | 2014-253268 |
| Jan. 13, 2015 | (JP) | ................................. | 2015-004416 |
| Jan. 15, 2015 | (JP) | ................................. | 2015-005955 |
| Feb. 24, 2015 | (JP) | ................................. | 2015-034377 |

(51) Int. Cl.
| *F16D 27/102* | (2006.01) |
| *F16D 27/14*  | (2006.01) |
| *F16D 15/00*  | (2006.01) |
| *F16D 27/10*  | (2006.01) |

(52) U.S. Cl.
CPC ........... *F16D 27/102* (2013.01); *F16D 15/00* (2013.01); *F16D 27/10* (2013.01); *F16D 27/14* (2013.01)

(58) Field of Classification Search
CPC ........ F16D 27/102; F16D 27/10; F16D 27/14; F16D 15/00
See application file for complete search history.

(56) References Cited

U.S. PATENT DOCUMENTS

| 2,406,644 | A  |   | 8/1946 | Spraragen |            |
|-----------|----|---|--------|-----------|------------|
| 4,901,831 | A  | * | 2/1990 | Ito       | B62D 5/043 |
|           |    |   |        |           | 180/444    |
| 7,654,375 | B2 | * | 2/2010 | Okada     | F16D 27/112|
|           |    |   |        |           | 192/103 R  |

(Continued)

FOREIGN PATENT DOCUMENTS

| JP | 2005-155834 A | 6/2005 |
| JP | 2013-092191 A | 5/2013 |

OTHER PUBLICATIONS

May 27, 2016 Extended Search Report issued in European Patent Application No. 15199809.3.

*Primary Examiner* — Jacob S Scott
*Assistant Examiner* — Tinh Dang
(74) *Attorney, Agent, or Firm* — Oliff PLC

(57) ABSTRACT

A driving force transmission device includes an inner ring; an outer ring; a roller pair constituted by a first roller and a second roller; an elastic member; a first cage including a first pressing portion; a second cage including a second pressing portion; a first guide member; a second guide member; and an electromagnetic clutch including an armature connected to the first and second guide members. Along with rotation of the first cage toward the circumferential second side, the first pressing portion presses the first roller toward the circumferential second side. Along with rotation of the second cage toward the circumferential first side, the second pressing portion presses the second roller toward the circumferential first side.

23 Claims, 45 Drawing Sheets

(56) References Cited

U.S. PATENT DOCUMENTS

| | | | |
|---|---|---|---|
| 8,220,607 B2* | 7/2012 | Watanabe | F16D 41/064 |
| | | | 192/45.015 |
| 9,103,384 B2* | 8/2015 | Akiyoshi | F16D 41/105 |
| 9,279,462 B2* | 3/2016 | Kitayama | F16D 41/088 |
| 2010/0314212 A1 | 12/2010 | Akiyoshi et al. | |
| 2013/0299298 A1 | 11/2013 | Akiyoshi et al. | |
| 2016/0368528 A1* | 12/2016 | Shiina | B62D 3/04 |

* cited by examiner

F I G . 16
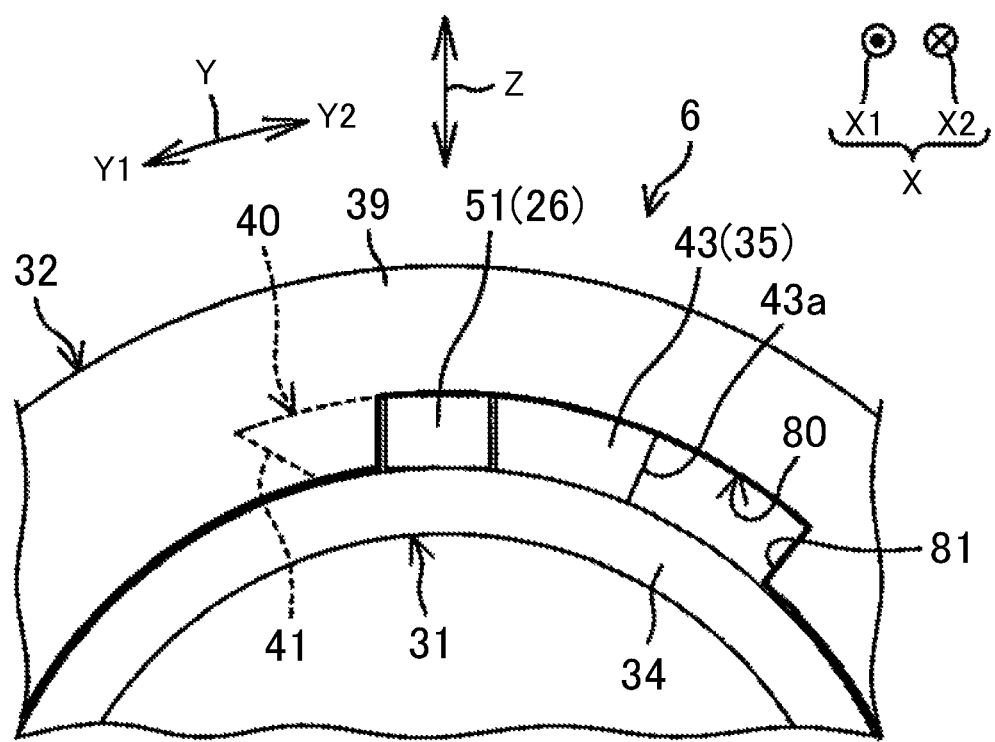

F I G . 21
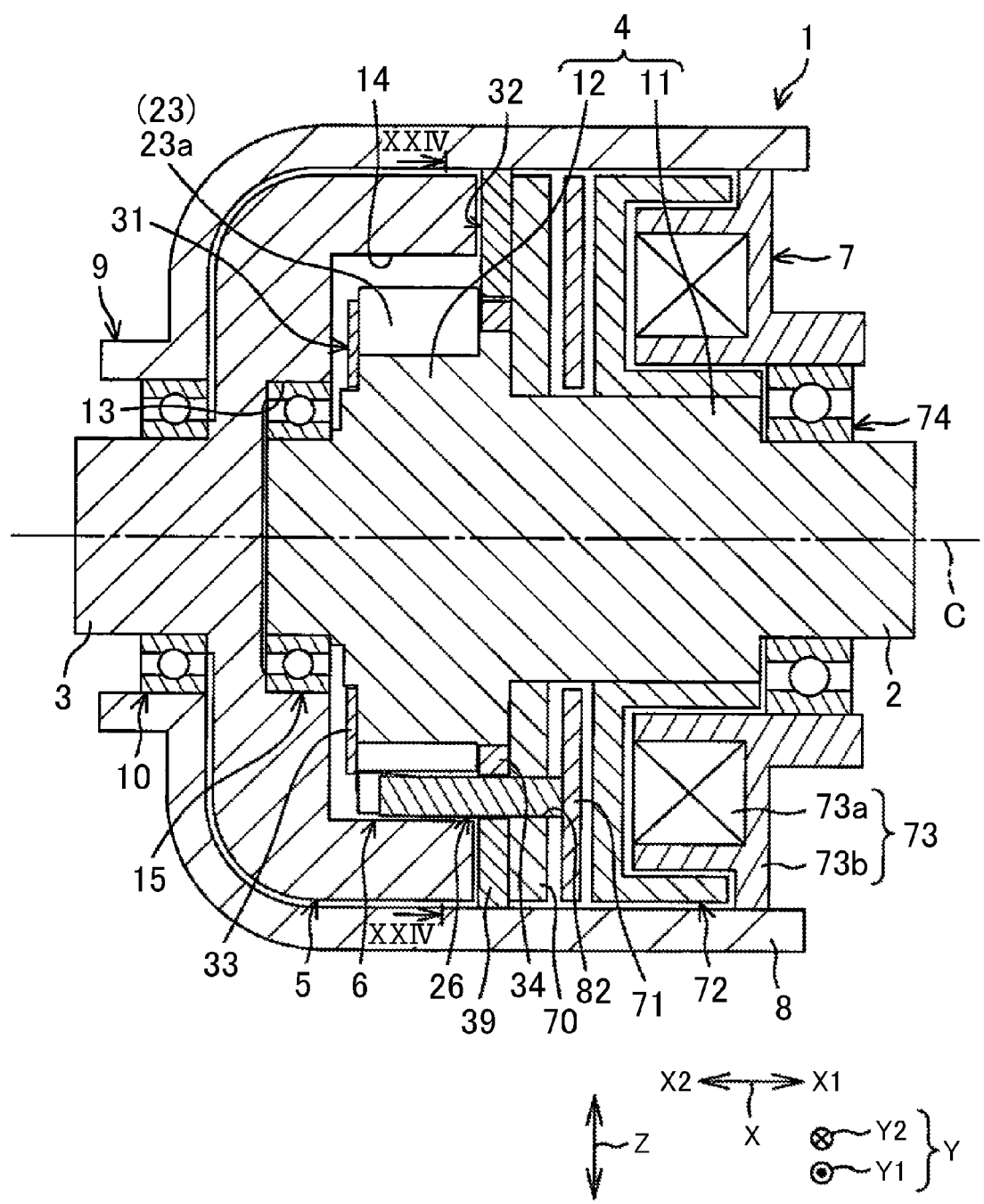

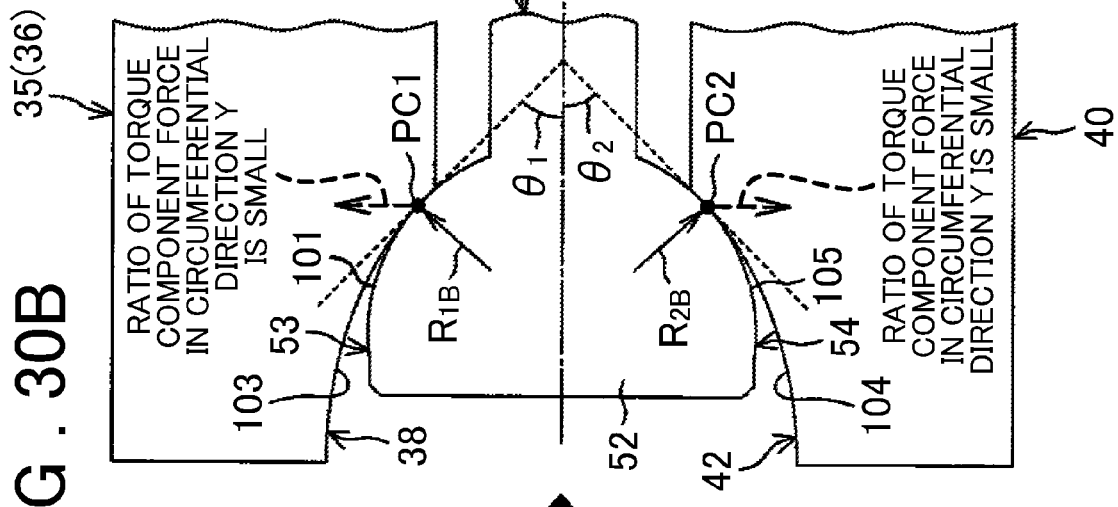
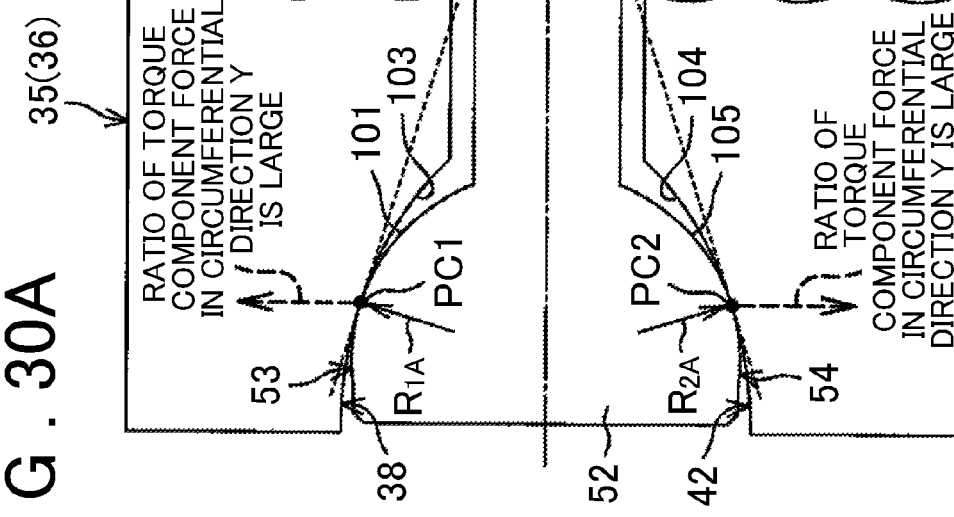

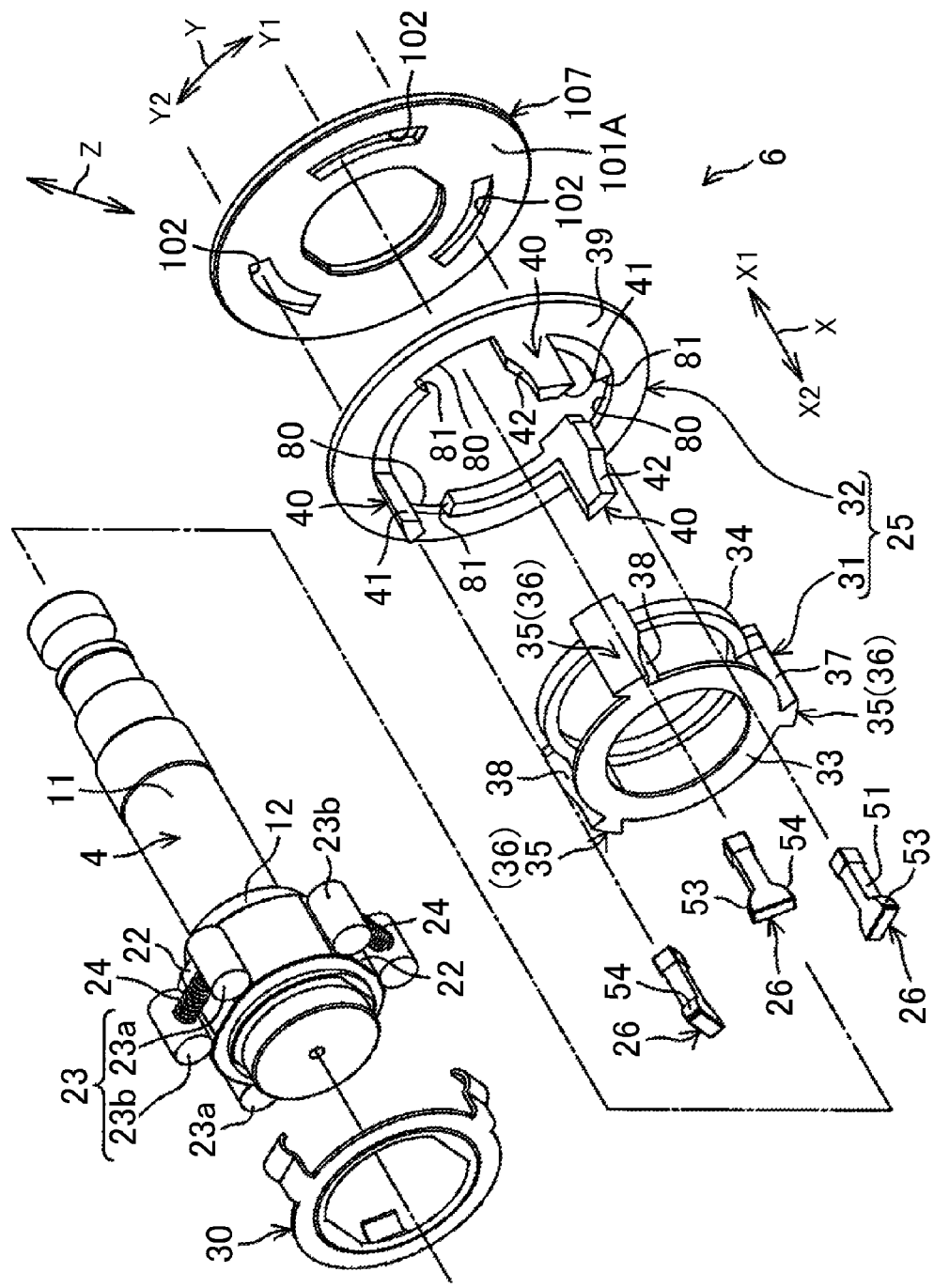

F I G . 36A
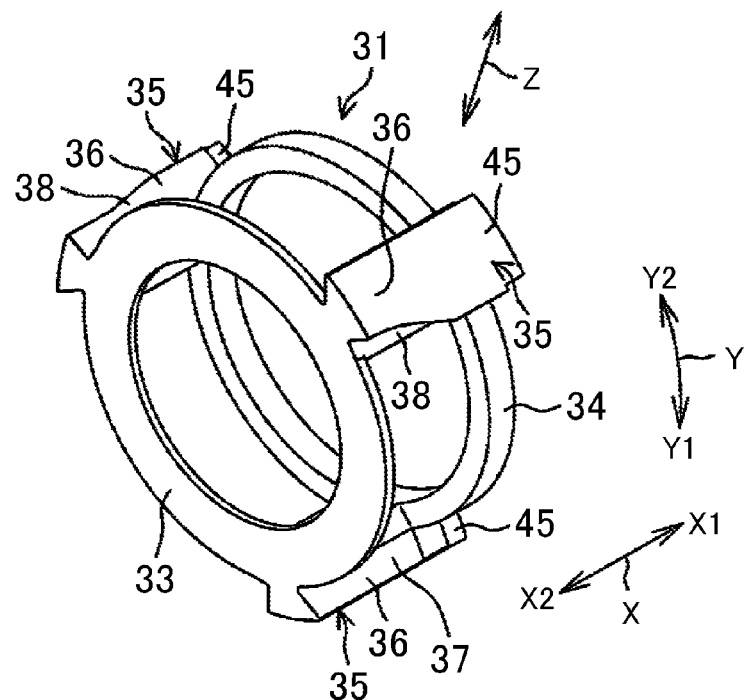
F I G . 36B
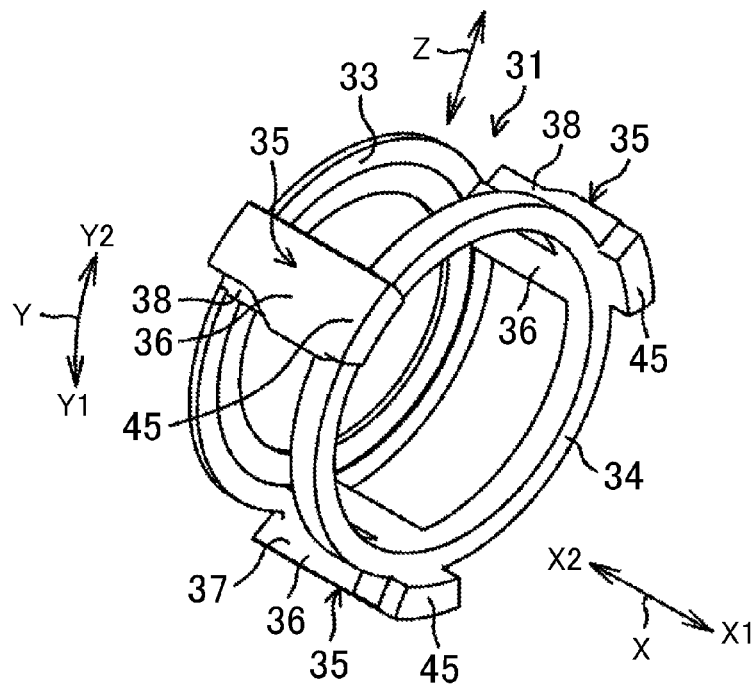

DRIVING FORCE TRANSMISSION DEVICE

INCORPORATION BY REFERENCE

The disclosure of each of Japanese Patent Applications No. 2014-253268, 2015-004416, 2015-005955, and 2015-034377 respectively filed on Dec. 15, 2014, Jan. 13, 2015, Jan. 15, 2015, and Feb. 24, 2015 including the specification, drawings and abstract is incorporated herein by reference in its entirety.

BACKGROUND OF THE INVENTION

1. Field of the Invention

The present invention relates to a driving force transmission device that can switch between transmission and disconnection of a rotational driving force between a first shaft body and a second shaft body.

2. Description of Related Art

A rotation transmission device described in Japanese Patent Application Publication No. 2013-92191 (JP 2013-92191 A) includes an electromagnetic clutch, and a roller clutch as a two-way clutch. The roller clutch is configured such that a pair of opposed rollers, and a spring that urges the rollers in directions away from each other are placed in each of wedge spaces formed by an inner periphery of an outer ring and an outer periphery of an inner ring. The pair of rollers is supported by two cages, that is, a control cage and a rotational cage. A ball cam structure that can rotate the control cage and the rotational cage relative to each other along with an axial movement of the control cage is provided between facing surfaces of a flange of the control cage and a flange of the rotational cage. By axially moving the control cage by current application/power-off of the electromagnetic clutch, the control cage and the rotational cage are rotated relative to each other. Thus, the pair of rollers is changed between an engaged state and a disengaged state between the inner periphery of the outer ring and the outer periphery of the inner ring.

However, in the rotation transmission device described in JP 2013-92191 A, the ball cam structure is integrated with the rotational cage. This complicates a shape of the rotational cage, which causes an increase in cost. Further, heat treatment or the like is necessary because a slide-contact surface between a ball and a cam is required to have a high contact pressure property (a high hardness property). This also causes an increase in cost. The cam can be formed by use of ceramic rather than a steel material, but this also leads an increase in cost. Accordingly, as a mechanism to switch between a fastened state and a released state of the roller clutch, it is desired to employ a new structure with which the ball cam structure can be replaced.

The inventors of the present invention have considered employing a two-way clutch including first and second cages provided in a rotatable manner relative to each other and a plurality of guide members, as a two-way clutch included in a driving force transmission device. The guide member has a first slide-contact surface constituted by an inclined surface. Further, the guide member has a second slide-contact surface constituted by an inclined surface. Along with a movement of the guide member toward an axial first side, the first cage rotates toward a circumferential second side, so as to press one of the rollers toward the circumferential second side. Further, along with a movement of the guide member toward the axial first side, the second cage rotates toward a circumferential first side, so as to press the other one of the rollers toward the circumferential first side. By pressing the rollers as described above, the rollers can be separated from an engaged position. The first and second slide-contact surfaces are set such that respective rotation amounts of the first and second cages along with the axial movement of the guide member are equal to each other.

However, the following situation may be caused for some reasons: one of the first and second cages rotates smoothly, but the other one of the first and second cages has difficulty in rotating (a state may occur in which the other one of them does not rotate or has difficulty in rotating). In this case, when the guide member moves toward the axial first side due to the drive of the electromagnetic clutch, the guide member itself also moves in a circumferential direction. As a result, the one of the first and second cages may rotate excessively by a rotation amount more than an expected rotation amount. It is desirable that excessive rotation of the one of the first and second cages be prevented even in a case where the other one of the first and second cages has difficulty in rotating.

The inventors of the present invention have considered employing a two-way clutch including first and second cages provided in a rotatable manner relative to each other, a guide member, and an electromagnetic clutch, as a two-way clutch included in a driving force transmission device. The electromagnetic clutch is connected to the guide member, and includes an armature axially movable, and a rotor axially opposed to the armature. In a fastened state of the two-way clutch, the electromagnetic clutch is in an OFF state. At this time, the guide member is placed at an initial position. In the meantime, in a released state of the two-way clutch, the electromagnetic clutch is in an ON state. When the electromagnetic clutch is turned into an ON state, the armature is attracted by the electromagnetic clutch toward the axial first side. In association with this, the guide member is drawn toward the axial first side so as to be placed at a drawn position.

Along with a movement of the guide member toward the axial first side, the first cage rotates toward the circumferential second side, so as to press one of the rollers toward the circumferential second side. Further, along with a movement of the guide member toward the axial first side, the second cage rotates toward the circumferential first side, so as to press the other one of the rollers toward the circumferential first side. In the meantime, a magnitude of a drawing force (a drawing at which the electromagnetic clutch draws the guide member) of the electromagnetic clutch is inversely proportional to the square of a distance between the armature and the rotor. That is, a drawing force provided by the electromagnetic clutch is small at an initial stage of the drawing of the guide member by the electromagnetic clutch. Accordingly, it is desired to increase a running torque applied to the first and second cages at the initial stage of the drawing of the guide member by the electromagnetic clutch.

The inventors of the present invention have considered employing a two-way clutch including first and second cages provided in a rotatable manner relative to each other and a guide member, as a two-way clutch included in a driving force transmission device. The guide member makes contact with the first cage from the circumferential first side. Further, the guide member makes contact with the second cage from the circumferential second side. Along with a movement of the guide member toward an axial first side, the first cage rotates toward the circumferential second side and the second cage rotates toward the circumferential first side. Due to the rotation of the first and second cages, roller pairs placed between an inner periphery of an outer ring and an outer periphery of an inner ring can be moved, thereby making it possible to change the state of the two-way clutch from an engaged state to a disengaged state. Respective rotation amounts of the first and second cages along with the axial movement of the guide member are set to be equal to each other.

However, the following situation may occur for some reasons: the first or second cage has difficulty in rotating (a state may occur in which the first or second cage does not rotate at all or has difficulty in rotating). In a case where one of the cages has difficulty in rotating and the other one of the cages smoothly rotates without any problems, when the guide member moves toward the axial first side due to the drive of the electromagnetic clutch, the rotation of the cage (the first cage in the above example) that does not have difficulty in rotating may rotate excessively by a rotation amount more than an expected rotation amount.

In order to drive the roller clutch including the roller pairs, that is, in order to drive the roller pairs in the roller clutch, it is necessary to rotate both of the first and second cages successfully. For this purpose, it is desirable not to allow excessive rotation of at least one of the first and second cages.

SUMMARY OF THE INVENTION

The present invention provides a driving force transmission device which can switch between transmission and disconnection of a rotational driving force between a first shaft body and a second shaft body with a simple structure and which can reduce cost accordingly. Further, the present invention provides a driving force transmission device which can restrict an amount of relative movement of first and second cages and which can prevent excessive rotation of one of the first and second cages accordingly. Further, the present invention provides a driving force transmission device which can maintain a high running torque applied to first and second cages at an initial stage of drawing by an electromagnetic clutch and which can successfully switch between transmission and disconnection of a rotational driving force accordingly. Further, the present invention provides a driving force transmission device which can prevent excessive rotation of at least one of first and second cages.

An aspect of the present invention relates to a driving force transmission device configured to switch between transmission and disconnection of a rotational driving force between a first shaft body and a second shaft body placed coaxially. The driving force transmission device includes an inner ring coaxially connected to the first shaft body; a tubular outer ring coaxially connected to the second shaft body and provided so as to be rotatable relative to the inner ring; a roller pair arranged in a circumferential direction in a wedge space formed by an outer periphery of the inner ring and an inner periphery of the outer ring, the roller pair being constituted by a first roller on a circumferential first side and a second roller on a circumferential second side; an elastic member configured to elastically press the first roller toward a first engaged position which is provided on the circumferential first side in the wedge space and at which the first roller engages with the outer periphery of the inner ring and the inner periphery of the outer ring, and configured to elastically press the second roller toward a second engaged position which is provided on the circumferential second side in the wedge space and at which the second roller engages with the outer periphery of the inner ring and the inner periphery of the outer ring; a first cage including a first pressing portion provided so as to press the first roller toward the circumferential second side, the first cage being configured to retain the roller pair; a second cage configured to retain the roller pair, the second cage including a second pressing portion provided so as to press the second roller toward the circumferential first side, the second cage being provided so as to be rotatable relative to the first cage; a first guide member configured to make slide contact with the first cage from the circumferential first side, the first guide member having a first slide-contact surface constituted by a tapered surface inclined toward the circumferential first side in a direction toward an axial first side, and the first guide member being provided so as to be axially movable; a second guide member configured to make slide contact with the second cage from the circumferential second side, the second guide member having a second slide-contact surface constituted by a tapered surface inclined toward the circumferential second side in the direction toward the axial first side, and the second guide member being provided so as to be axially movable; and an electromagnetic clutch including an armature connected to the first and second guide members, the armature being configured to be driven such that the first and second guide members are axially movable, wherein along with rotation of the first cage toward the circumferential second side, the first pressing portion presses the first roller toward the circumferential second side, and along with rotation of the second cage toward the circumferential first side, the second pressing portion presses the second roller toward the circumferential first side.

In the above configuration, along with a movement of the first guide member toward the axial first side, the first cage rotates toward the circumferential first side, and along with a movement of the second guide member toward the axial first side, the second cage rotates toward the circumferential second side. In an ON state of the electromagnetic clutch, the first and second guide members connected to the armature are drawn toward the axial first side, and thus, the first cage rotates toward the circumferential second side and the second cage rotates toward the circumferential first side. Since the first roller is pressed toward the circumferential second side along with the rotation of the first cage toward the circumferential second side, the first roller can be moved toward the circumferential second side against an elastic pressing force from the elastic member. Further, since the second roller is pressed toward the circumferential first side along with the rotation of the second cage toward the circumferential first side, the second roller can be moved toward the circumferential first side against an elastic pressing force from the elastic member. That is, in an ON state of the electromagnetic clutch, the first roller can be separated from the first engaged position, and the second roller can be separated from the second engaged position. Thus, it is possible to switch between transmission and disconnection of a rotational driving force between the inner ring and the outer ring, with a simple structure. This accordingly makes it possible to provide a driving force transmission device that can achieve cost reduction.

In the above aspect, the first cage may include a first annular portion and a first projection projecting from the first annular portion toward the axial first side; the first pressing portion may be provided in the first projection; the second cage may include a second annular portion placed on the axial first side relative to the first annular portion coaxially with the first annular portion, and a second projection projecting from the second annular portion toward an axial second side; and the second pressing portion may be provided in the second projection.

In the above configuration, since the first pressing portion is provided in the first projection projecting from the first annular portion toward the axial first side, it is possible to shorten an axial length of the first annular portion, thereby making it possible to reduce the size of the first cage. Further, since the second pressing portion is provided in the second projection projecting from the second annular portion toward the axial second side, it is possible to shorten an axial length of the second annular portion, thereby making it possible to reduce the size of the second cage. This makes it possible to reduce the size of the driving force transmission device.

In the above aspect, the first cage may include a first slid-contact portion with which the first slide-contact surface makes slide contact; the first slid-contact portion may be provided in the first projection; the second cage may include a second slid-contact portion with which the second slide-contact surface makes slide contact; and the second slid-contact portion may be provided in the second projection.

In the above configuration, the first slid-contact portion is provided in the first projection, and the second slid-contact portion is provided in the second projection. Accordingly, in comparison with a case where the first and second slid-contact portions are provided separately from the first and second projections, it is possible to reduce the number of components in each of the first cage and the second cage.

In the above aspect, a plurality of roller pairs may be provided in the circumferential direction; in the first cage and the second cage, the first projection configured to press the first roller of each of the roller pairs and the second projection configured to press the second roller of an adjacent roller pair adjacent to a circumferential first side of the roller pair may be adjacent to each other; the first and second guide members may each include a wedge member provided so as to be axially movable; and the wedge member may include the first slide-contact surface that makes slide contact with the first slid-contact portion of the first projection, and the second slide-contact surface that makes slide contact with the second slid-contact portion of the second projection.

In the above configuration, the first slide-contact surface that makes slide contact with the first projection corresponding to the first roller and the second slide-contact surface that makes slide contact with the second projection corresponding to the second roller of the adjacent roller pair are both provided in one wedge member. In a case where the first guide member is provided with only the first slide-contact surface and the second guide member is provided with only the second slide-contact surface, a total number of first and second guide members is the double of the number of roller pairs. In contrast, in the above configuration, since one wedge member is provided with both the first slide-contact surface and the second slide-contact surface, the same number of wedge members as the number of roller pairs are provided. This makes it possible to achieve reduction in the number of components.

In the above aspect, the first annular portion may be fitted to the outer periphery of the inner ring; and the first cage may further include a third annular portion placed on the axial first side relative to the first annular portion coaxially with the first annular portion and fitted to the outer periphery of the inner ring, and a connecting portion configured to connect the first annular portion with the third annular portion.

In the above configuration, since the first cage is fitted to the outer periphery of the inner ring at a plurality of parts in the axial direction, the first cage can be strongly supported by the inner ring.

In the above aspect, the second annular portion may be placed so as to surround an outer side of the third annular portion; the first annular portion may restrict a movement of each of the rollers toward the axial second side; and the third annular portion may restrict a movement of each of the rollers toward the axial first side.

In the above configuration, it is possible to effectively prevent, by the first and third annular portions of the first cage, the rollers from falling from the outer periphery of the inner ring.

In the above aspect, the first projection may be provided in the connecting portion.

In the above configuration, since the first projection is provided in the connecting portion, it is possible to reduce the number of components of the first cage in comparison with a case where the first projection is provided separately from the connecting portion.

In the above aspect, one of the first cage and the second cage may be provided with an engageable projection portion configured to engage the first cage and the second cage with each other; the other one of the first cage and the second cage may be provided with a receptacle recessed portion configured to receive the engageable projection portion; and an amount of relative rotation of the first cage and the second cage may be restricted when the engageable projection portion engages with a regulation wall of the receptacle recessed portion.

In the above configuration, the amount of relative rotation of the first and second cages is restricted when the engageable projection portion provided in one of the first and second cages engages with the regulation wall of the receptacle recessed portion provided in the other one of the first and second cages. Thus, it is possible to prevent excessive rotation of one of the first and second cages.

In the above aspect, the engageable projection portion may be provided on the outer periphery of the first cage; and the receptacle recessed portion may be provided on the inner periphery of the second cage.

In the above configuration, the engageable projection portion is provided on the outer periphery of the first cage, and the receptacle recessed portion is provided on the inner periphery of the second cage. Thus, the engageable projection portion and the receptacle recessed portion can be realized with a relatively simple configuration.

In the above aspect, in the first cage, the engageable projection portion may be provided in a part including the first pressing portion provided so as to press the first roller toward the circumferential second side.

In the above configuration, since the engageable projection portion is provided in a part including the first pressing portion, it is possible to reduce the size of the first cage, in comparison with a case where the engageable projection portion is provided separately from the part including the first pressing portion.

In the above aspect, the first cage may include a first slid-contact surface with which the first slide-contact surface makes slide contact; the second cage may include a second slid-contact surface with which the second slide-contact surface makes slide contact; and the first slide-contact surface and the first slid-contact surface may be provided such that a first contact angle at a contact point between the first slide-contact surface and the first cage is increased as the guide member moves toward the axial first side relative to the first cage, and/or the second slide-contact surface and the second slid-contact surface may be provided such that a second contact angle at a contact point between the second slide-contact surface and the second cage is increased as the guide member moves toward the axial first side relative to the second cage.

In the above configuration, at an initial stage of drawing of the guide member by the electromagnetic clutch, at least one of the first and second contact angles is small. As the guide member is drawn toward the axial first side, the at least one of the first and second contact angles is increased. In a state where at least one of the first and second contact angles is small, a ratio of a torque component force in the circumferential direction is high. Further, in a state where at least one of the first and second contact angles is large, a ratio of a torque component force in the circumferential direction is low. Since the ratio of the torque component force in the circumferential direction can be increased at an initial stage of the drawing of the guide member at which a drawing force of the electromagnetic clutch is small, it is possible to maintain a high rotational driving force applied to the first and second cages at the initial stage of the drawing by the electromagnetic clutch. Accordingly, it is possible to successfully switch between transmission and disconnection of a rotational driving force in the driving force transmission device.

In the above aspect, at least one of the first slide-contact surface and the second slide-contact surface may include a first curved portion whose sectional shape along an axial direction is curved to protrude.

In the above configuration, since at least one of the first and second slide-contact surfaces has the first curved portion (the projecting curved surface), at least one of the first and second contact angles is increased as the guide member moves toward the axial first side. Thus, it is possible to realize, with a simple configuration, a structure in which the first contact angle is increased as the guide member moves toward the axial first side and/or a structure in which the second contact angle is increased as the guide member moves toward the axial first side relative to the second cage.

In the above configuration, the at least one of the first slide-contact surface and the second slide-contact surface may include a second curved portion whose sectional shape along a radial direction is curved to protrude.

In the above configuration, at least one of the first and second slide-contact surfaces is configured such that a sectional shape along the radial direction is curved to protrude. In a case where the guide member has an inclined posture in the circumferential direction, at least one of the first and second slide-contact surfaces may be inclined in the circumferential direction. However, even in such a case, since at least one of the first and second slide-contact surfaces has the aforementioned shape, it is possible to prevent at least one of the first and second slide-contact surfaces from making uneven contact with the cage (at least one of the first and second cages).

In the above aspect, at least one of the first slid-contact surface and the second slid-contact surface, with which the at least one of the first slide-contact surface and the second slide-contact surface makes slide contact, may be constituted by a recessed curved surface that is curved to be recessed with a curvature smaller than a curvature of the first curved portion in the axial direction.

In the above configuration, since at least one of the first and second slid-contact surfaces is constituted by a recessed curved surface having the curvature smaller than the curvature of the first curved portion in the axial direction, it is possible to smoothly move the guide member in an axial direction relative to the first and second cages.

In the above aspect, at least one of the first slid-contact surface and the second slid-contact surface, with which the at least one of the first slide-contact surface and the second slide-contact surface makes slide contact, may be constituted by a recessed curved surface that is curved to be recessed with a curvature smaller than a curvature of the first curved portion in the axial direction, and a flat inclined surface that is continuous with an axial second side of the recessed curved surface.

In the above configuration, at least one of the first and second slid-contact surfaces includes an inclined surface constituted by a flat surface.

Due to a dimensional tolerance of the guide member, an axial position of the guide member varies at an initial stage of drawing of the guide member, and as a result, a rotational driving force applied to the first and second cages may vary at the initial stage of the drawing. However, by providing the inclined surface constituted by a flat surface so that at least one of the first and second slide-contact surfaces makes contact with the inclined surface at the initial stage of the drawing of the guide member, it is possible to suppress variation of at least one of the first and second contact angles at the time of the initial stage of the drawing of the guide member.

The driving force transmission device according to the above aspect may further include a regulation projection provided in at least one of the first cage and the second cage and extending toward the axial first side from the at least one of the first cage and the second cage; and a holding plate placed between the armature and each of the first cage and the second cage, the holding plate being configured to hold the guide member, the holding plate having an insertion recess through which the guide member and the regulation projection are inserted, and the holding plate being provided on the inner ring so as to be rotatable together with the inner ring, wherein the first cage and the second cage are provided so as to be rotatable relative to the holding plate; and when the regulation projection engages with a circumferential end portion of the insertion recess, a rotation amount, relative to the holding plate, of the at least one of the first cage and the second cage provided with the regulation projection is restricted.

In the configuration, the guide member and the regulation projection are inserted through the insertion recess of the holding plate. Since the first and second cages are provided so as to be rotatable relative to the holding plate, the regulation projection provided in at least one of the first and second cages rotates relative to the holding plate along with the rotation of the first and second cages. When the regulation projection inserted through the insertion recess engages with the circumferential end portion of the insertion recess, a rotation amount of the cage provided with the regulation projection is restricted. Accordingly, in a case where the first and second cages rotate along with the axial movement of the guide member due to the drive of the electromagnetic clutch, it is possible to prevent excessive rotation of at least one of the first and second cages.

In the above aspect, the regulation projection may include a first regulation projection provided in the first cage, and a second regulation projection provided in the second cage; the first regulation projection and the second regulation projection may be inserted through the insertion recess in a state where the guide member is sandwiched between the first regulation projection and the second regulation projection in the circumferential direction; when the first regulation projection engages with an end portion of the insertion recess on the circumferential second side, a rotation amount of the first cage relative to the holding plate may be restricted; and when the second regulation projection engages with an end portion of the insertion recess on the circumferential first side, a rotation amount of the second cage relative to the holding plate may be restricted.

In the above configuration, the first and second regulation projections are inserted through the insertion recess in a state where the guide member is sandwiched between the first and second regulation projections in the circumferential direction. When the first regulation projection engages with the end portion of the insertion recess on the circumferential second side, the rotation amount of the first cage relative to the holding plate is restricted. Further, when the second regulation projection engages with the end portion of the insertion recess on the circumferential first side, the rotation amount of the second cage relative to the holding plate is restricted. Accordingly, in a case where the first and second cages rotate along with the axial movement of the guide member due to the drive of the electromagnetic clutch, it is possible to prevent the first cage from rotating excessively and to prevent the second cage from rotating excessively.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a front view illustrating a positional relationship of the wedge member with respect to the inner cage and the outer cage in a fastened state of the two-way clutch;

FIG. 21 is a sectional view of a driving force transmission device according to a third embodiment of the present invention;

FIG. 30A is a schematic view illustrating a change of first and second contact angles along with drawing of the wedge member by an electromagnetic clutch;

FIG. 30B is a schematic view illustrating the change of the first and second contact angles along with the drawing of the wedge member by the electromagnetic clutch;

FIG. 35 is an exploded perspective view illustrating the configuration of the two-way clutch;

FIG. 36A is a perspective view illustrating a configuration of an inner cage;

FIG. 36B is a perspective view illustrating the configuration of the inner cage;

DETAILED DESCRIPTION OF EMBODIMENTS

Figure 1:
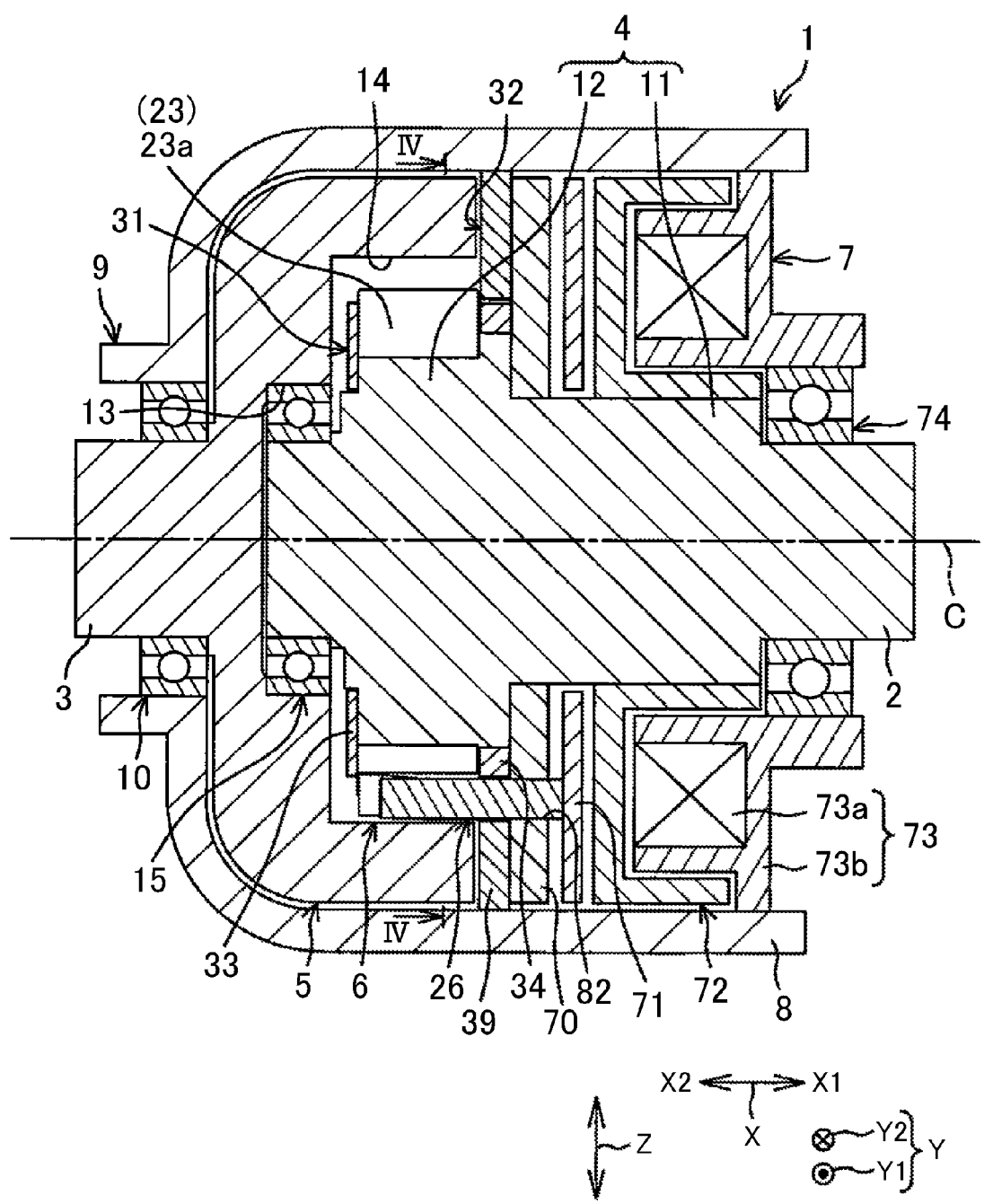
FIG. 1 is a sectional view of a driving force transmission device according to a first embodiment of the present invention.

The following describes a first embodiment of the present invention in detail with reference to the attached drawings. FIG. 1 is a sectional view of a driving force transmission device 1 according to a first embodiment of the present invention. The driving force transmission device 1 is a device that can switch between transmission and disconnection of a rotational driving force (a running torque) between a first shaft body 2 and a second shaft body 3 placed coaxially. The driving force transmission device 1 includes: an inner ring 4 coaxially and integrally connected to the first shaft body 2 serving as an input shaft; an outer ring 5 coaxially and integrally connected to the second shaft body 3 serving as an output shaft; a two-way clutch 6 that performs transmission/disconnection of a rotational driving force from the inner ring 4 to the outer ring 5; an electromagnetic clutch 7 that performs fastening/release of the two-way clutch 6; and a housing 8 that accommodates therein the inner ring 4, the outer ring 5, the two-way clutch 6, and the electromagnetic clutch 7.

The driving force transmission device 1 is provided in a steering device, for example. More specifically, the driving force transmission device 1 is placed between a steering shaft connected to a steering member such as a steering wheel and a steered shaft of a steered mechanism such as a rack and pinion. The steering device is provided with a steer-by-wire system which detects an operation angle of the steering wheel (the steering member) by an angle sensor and which transmits, to the steered shaft, a driving force of a motor for steering which is controlled according to an output of the angle sensor. In a normal time, the steer-by-wire system is enabled and the two-way clutch 6 is released, so that transmission of a rotational driving force (a running torque) between the steering shaft and the steered shaft is disconnected. In an emergency, the steer-by-wire system is temporarily disabled and the two-way clutch 6 of the driving force transmission device 1 is fastened, so that a rotational driving force (a running torque) is transmitted between the steering shaft and the steered shaft.

In the following description, an axial direction of a rotating axis C of the first and second shaft bodies 2, 3 is an axial direction X. An axial direction of the inner ring 4, an axial direction of the outer ring 5, an axial direction of the electromagnetic clutch 7, and an axial direction of the two-way clutch 6 coincide with the axial direction X. Further, with regard to the axial direction X, an axial direction (a right direction in FIG. 1) toward a first-shaft-body-2 side when viewed from the two-way clutch 6 is an axial direction toward an axial first side X1, and also with regard to the axial direction X, an axial direction (a left direction in FIG. 1) toward a second-shaft-body-3 side when viewed from the two-way clutch 6 is an axial direction toward an axial second side X2.

A rotational radial direction of the first and second shaft bodies 2, 3 is a radial direction Z. A radial direction of the inner ring 4, a radial direction of the outer ring 5, and a radial direction of the two-way clutch 6 coincide with the radial direction Z. A circumferential direction of the first and second shaft bodies 2, 3 is a circumferential direction Y. A circumferential direction of the inner ring 4, a circumferential direction of the outer ring 5, a circumferential direction of the electromagnetic clutch 7, and a circumferential direction of the two-way clutch 6 coincide with the circumferential direction Y. Further, with regard to the circumferential direction Y, a clockwise circumferential direction when viewed from the axial second side X2 is a circumferential direction toward a circumferential first side Y1, and also with regard to the circumferential direction Y, a counter-clockwise circumferential direction when viewed from the axial second side X2 is a circumferential direction toward a circumferential second side Y2.

The housing 8 has a cylindrical shape, and a bushing 9 having a small diameter is formed in an end portion of the housing 8 on the axial second side X2. A first rolling bearing 10 is fixed to an inner periphery of the bushing 9, and the second shaft body 3 is supported by the first rolling bearing 10 such that the second shaft body 3 is rotatable and immovable in the axial direction X. The inner ring 4 is formed by use of a steel material, for example, and integrally includes a shaft portion 11, and a large diameter portion 12 provided in an intermediate portion of the shaft portion 11 in the axial direction X. FIG. 1 illustrates an example in which the inner ring 4 is provided integrally in an axial end part of the first shaft body 2, but the inner ring 4 may be a member formed separately from the first shaft body 2, and the inner ring 4 may be connected to the first shaft body 2 so as to be rotatable together.

The outer ring 5 has a tubular shape in which the outer ring 5 has a closed end on the axial second side X2, and is formed by use of a steel material. The second shaft body 3 is connected to the closed end of the outer ring 5. FIG. 1 illustrates an example in which the closed end of the outer ring 5 is provided integrally with the second shaft body 3, but the outer ring 5 may be a member formed separately from the second shaft body 3, and the outer ring 5 may be connected to the second shaft body 3 so as to be rotatable together. On an inner periphery of the outer ring 5, a first annular stepped portion 13, and a second annular stepped portion 14 having a diameter larger than that of the first annular stepped portion 13 are formed sequentially from an end portion side of the outer ring 5 on the axial second side X2. A second rolling bearing 15 is fixed to an inner periphery of the first annular stepped portion 13, and the outer ring 5 is supported by the second rolling bearing 15 such that the outer ring 5 is rotatable and immovable in the axial direction X.

Figure 2:
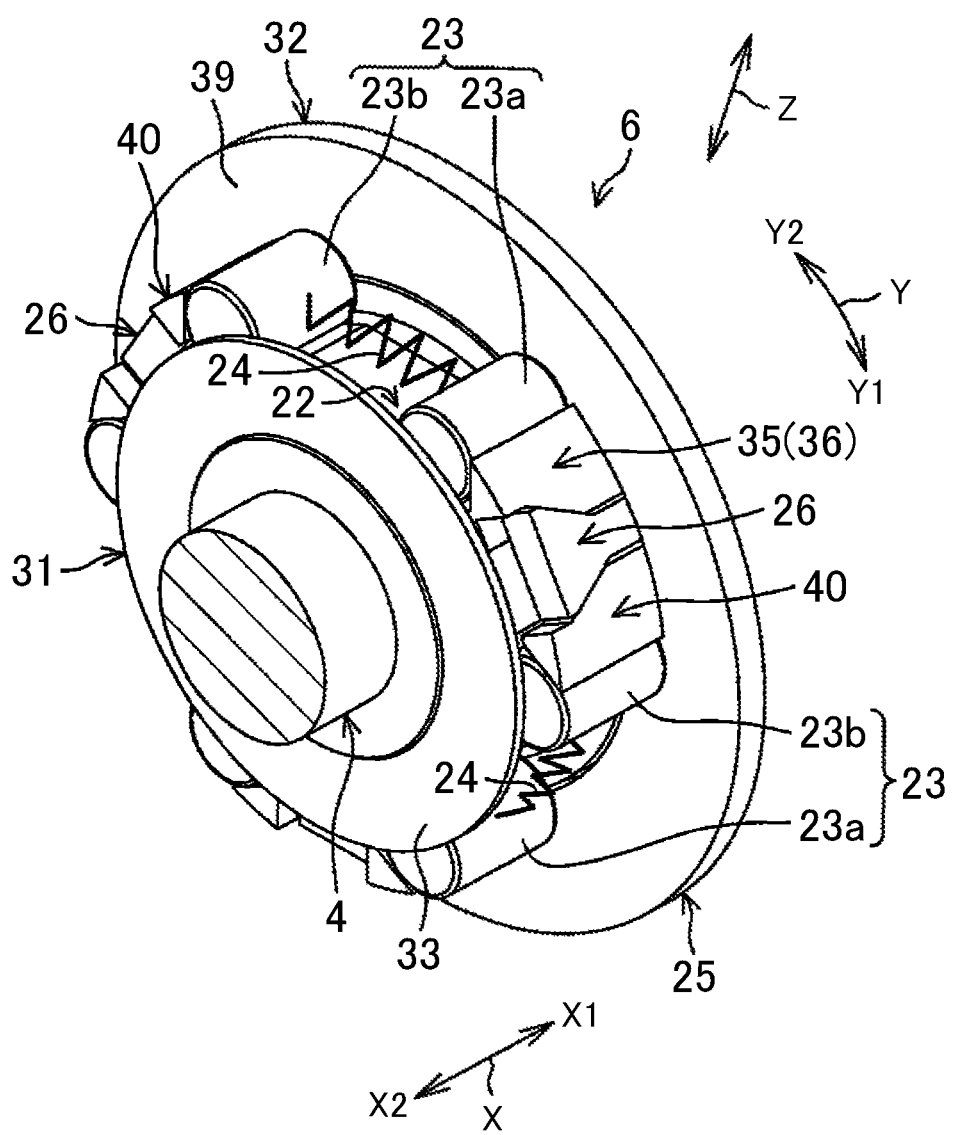
FIG. 2 is a perspective view illustrating a configuration of a two-way clutch included in the driving force transmission device according to the first embodiment.
Figure 3:
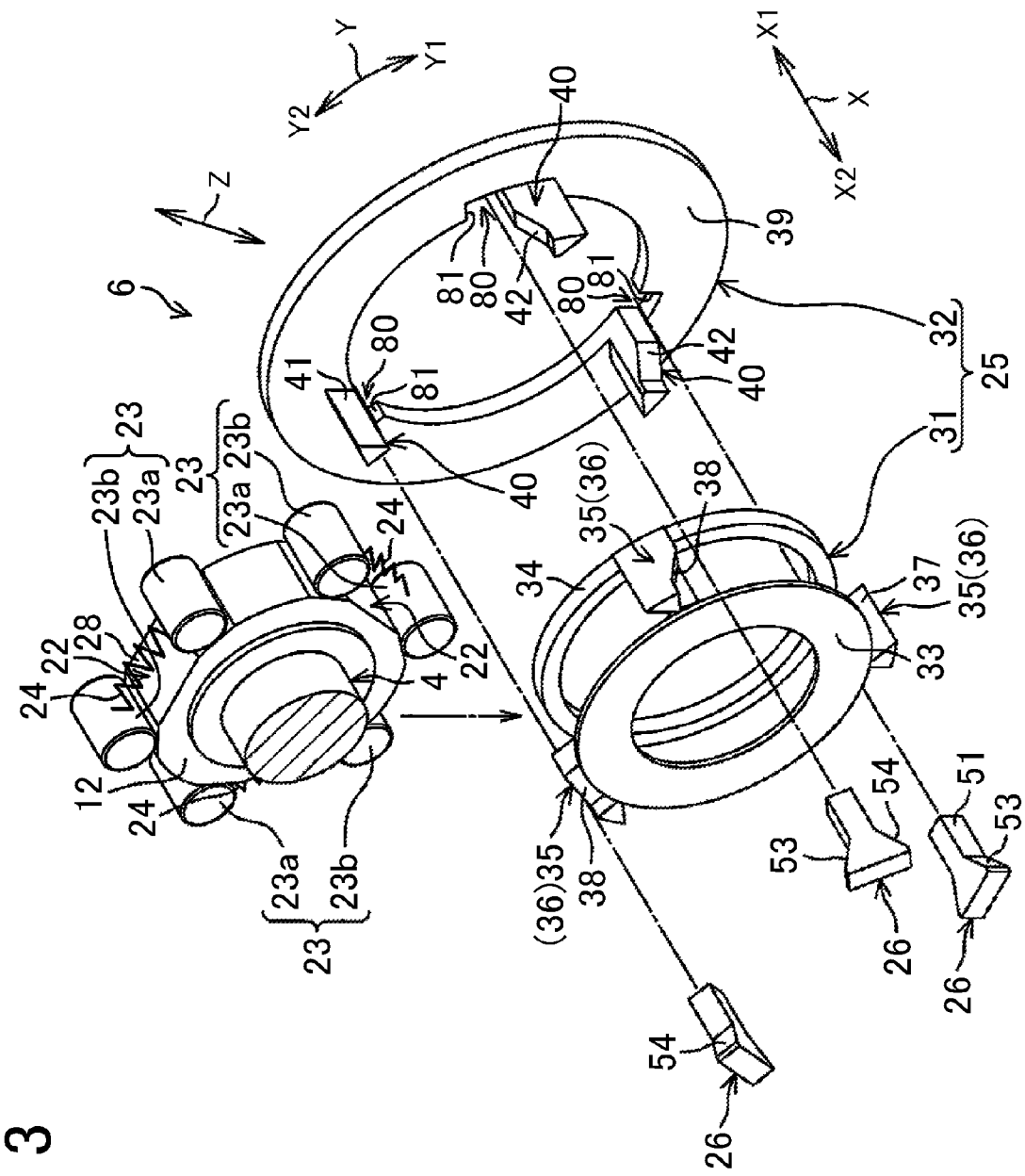
FIG. 3 is an exploded perspective view illustrating the configuration of the two-way clutch.
Figure 4:
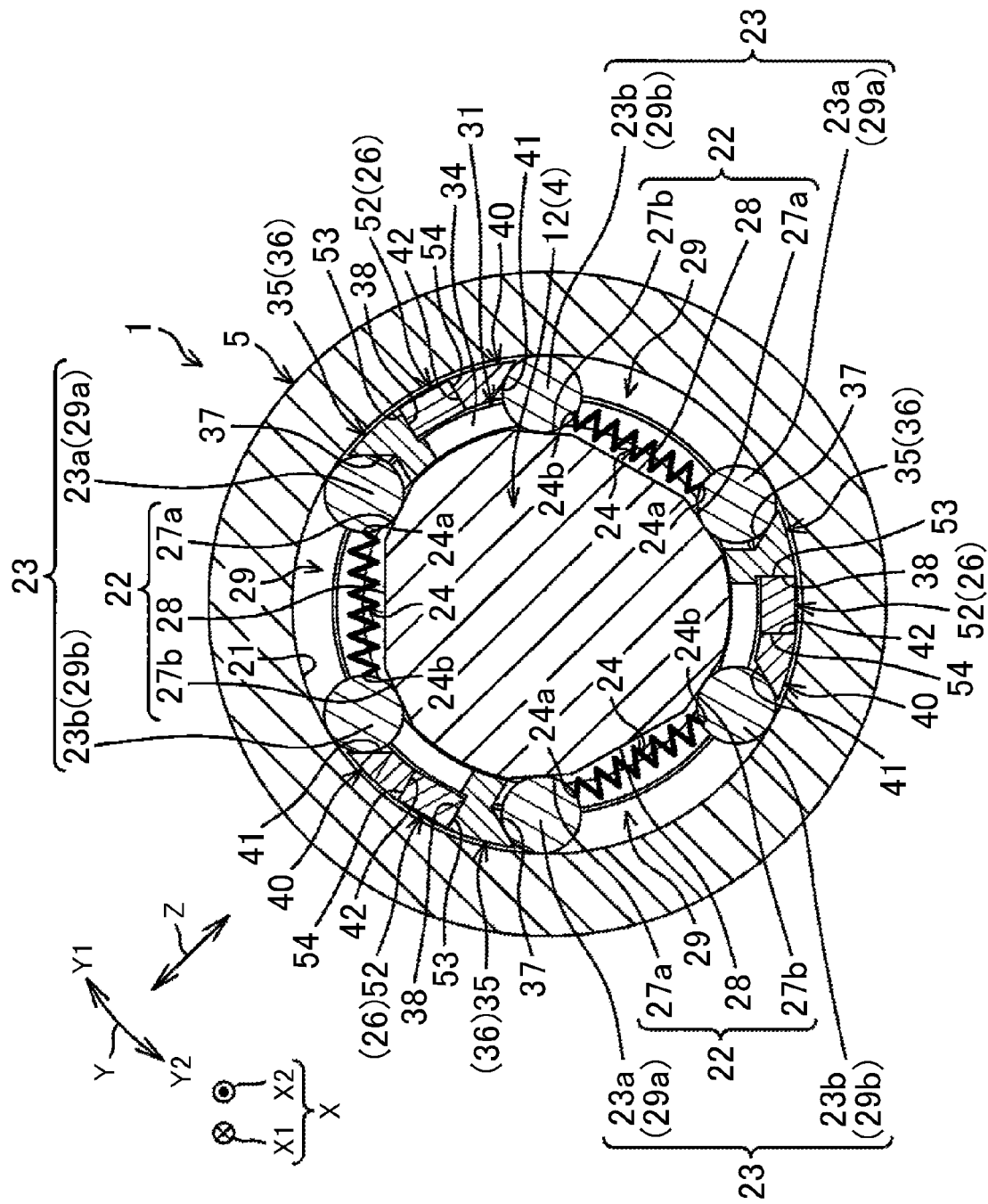
FIG. 4 is a sectional view of the configuration of the two-way clutch when viewed from a section line IV-IV in FIG. 1.

The two-way clutch 6 is placed between the inner ring 4 and the outer ring 5. That is, the two-way clutch 6 can switch between transmission and disconnection of a rotational driving force (a torque) between the inner ring 4 and the outer ring 5. FIG. 2 is a perspective view illustrating a configuration of the two-way clutch 6. FIG. 3 is an exploded perspective view illustrating the configuration of the two-way clutch 6. FIG. 4 is a sectional view of the configuration of the two-way clutch 6 when viewed from a section line IV-IV in FIG. 1. Referring now to FIGS. 1 to 4, the configuration of the two-way clutch 6 is described below. In FIGS. 2 and 3, the large diameter portion 12 is mainly illustrated in the inner ring 4. Further, the outer ring 5 is not illustrated in FIGS. 2 to 4. Further, FIG. 4 illustrates a fastened state of the two-way clutch 6.

The two-way clutch 6 includes: a cylindrical surface 21 (see FIG. 4) provided on an inner periphery of the second annular stepped portion 14 of the outer ring 5; a plurality of (e.g., three) cam surfaces 22 (see FIG. 4) provided on an outer periphery of the large diameter portion 12 of the inner ring 4 so as to be arranged at regular intervals in the circumferential direction Y; a plurality of (e.g., three) roller pairs 23; a plurality of (e.g., the same number as the number of roller pairs 23) elastic members 24; a cage 25 that retains the roller pairs 23 and the elastic members 24; and a plurality of (the same number as the number of roller pairs 23) wedge members (first and second guide members) 26 made of synthetic resin and connected to an armature 71 (see FIG. 1) of the electromagnetic clutch 7 (see FIG. 1) so as to be movable together with the armature 71 in the axial direction X. The cam surfaces 22 are placed at regular intervals in the circumferential direction Y on the outer periphery of the inner ring 4. Further, the plurality of cam surfaces 22 may be provided on the inner periphery of the outer ring 5 and the cylindrical surface may be provided on the outer periphery of the inner ring 4. Further, an elastic-member cage that collectively supports the plurality of elastic members 24 may be attached to the outer periphery of the inner ring 4.

As illustrated in FIG. 4, the cylindrical surface 21 of the outer ring 5 is opposed to each of the cam surfaces 22 of the inner ring 4 in the radial direction Z. Each of the cam surfaces 22 includes: a pair of inclined surfaces 27a, 27b provided so as to be inclined toward opposite sides along the circumferential direction Y; and a flat spring supporting surface 28 provided between the pair of inclined surfaces 27a, 27b along a tangential direction of the inner ring 4. A wedge space 29 is formed between each of the cam surfaces 22 and the cylindrical surface 21. Each wedge space 29 is narrowed toward both ends in the circumferential direction Y.

As illustrated in FIG. 4, each of the roller pairs 23 includes a first roller 23a placed on a circumferential first side Y1, and a second roller 23b placed on a circumferential second side Y2. In each wedge space 29, the first roller 23a and the second roller 23b are placed so as to be opposed to each other. In each wedge space 29, an elastic member 24 that elastically presses the first and second rollers 23a, 23b so as to be separated from each other in the circumferential direction Y is placed. A compression coil spring can be exemplified as the elastic member 24. Further, as the elastic member 24, other types of spring such as a leaf spring or a rubber material may be used. One end 24a of each elastic member 24 elastically presses a corresponding first roller 23a toward the circumferential first side Y1, and the other end 24b of each elastic member 24 elastically presses a corresponding second roller 23b toward the circumferential second side Y2. The elastic member 24 is supported by the spring supporting surface 28.

As illustrated in FIGS. 2 and 3, the cage 25 includes an inner cage (a first cage) 31 and an outer cage (a second cage) 32, which are separate members. The inner cage 31 and the outer cage 32 are provided so as to be rotatable relative to each other. The inner cage 31 includes a first annular portion 33 having a thin disc shape, a third annular portion 34 having a tonic shape and placed on the axial first side X1 relative to the first annular portion 33 coaxially therewith, and a plurality of (the same number as the number of roller pairs 23) connection portions 35 that connects the first annular portion 33 with the third annular portion 34. The first and third annular portions 33, 34 (that is, the inner cage 31) are fitted to an outer periphery of the large diameter portion 12 of the inner ring 4 so as to be rotatable relative to the inner ring 4. Further, the first annular portion 33 contacts the large diameter portion 12 from the axial second side X2. Since the inner cage 31 is fitted to the inner ring 4 at a plurality of parts in the axial direction X, the inner cage 31 can be strongly (successfully) supported by the inner ring 4.

As illustrated in FIG. 3, the same number of (three in this embodiment) connecting portions 35 as the number of the roller pairs 23 are provided and placed at regular intervals in the circumferential direction Y. The first annular portion 33, the third annular portion 34, and the plurality of connecting portions 35 are formed integrally by use of a synthetic resin material (e.g., polyacetal, polyamide, polytetrafluoro-ethylene, polyether ether ketone, polyphenylenesulfide, or the like). That is, the inner cage 31 is formed by use of a synthetic resin material.

Each of the connecting portions 35 has a pillar shape extending along the axial direction X. Each of the connecting portions 35 is a first projection 36 projecting from an outer periphery of the first annular portion 33 toward the axial first side X1. On a surface of each of the connecting portions 35 on the circumferential second side Y2, a first abutting surface (a first pressing portion) 37 (mainly see FIG. 4) that can contact (press) the first roller 23a of the roller pair 23 is formed. The first abutting surface 37 is constituted by a flat surface, for example. That is, the first abutting surface 37 can make surface contact with the first roller 23a. However, the first abutting surface 37 is not limited to one that makes surface contact with the first roller 23a, and may be configured to make line contact or point contact with the first roller 23a.

On a surface of each of the connecting portions 35 on the circumferential first side Y1, a first slid-contact surface (a first slid-contact portion) 38 (mainly see FIGS. 3, 4) that makes slide contact with a corresponding wedge member 26 is formed. The first slid-contact surface 38 is constituted by a flat tapered surface (an inclined surface) inclined toward the circumferential first side Y1 in a direction toward the axial first side X1 of the inner ring 4. A tapered angle (an inclined angle) of the first slid-contact surface 38 is set to an angle that allows the first slid-contact surface 38 to fit the after-mentioned first slide-contact surface 53.

Since the first abutting surface 37 is provided in each of the connecting portions 35 that connect the first and third annular portions 33, 34 to each other, it is possible to achieve reduction of the number of components in comparison with a case where the first projection 36 provided with the first abutting surface 37 is a member formed separately from the connecting portion 35. Further, since the first slid-contact surface 38 is provided in each of the connecting portions 35 (the first projections 36), it is possible to achieve reduction of the number of components in comparison with a case where a member provided with the first slid-contact surface 38 is a member formed separately from the connecting portion 35.

The outer cage 32 includes a second annular portion 39 having a toric shape, and a plurality of second projections 40 projecting from an inner periphery of the second annular portion 39 toward the axial second side X2. The second annular portion 39 is fitted to an outer periphery of the outer ring 5 so as to be rotatable relative to the outer ring 5. The second annular portion 39 is placed so as to surround an outer periphery of the third annular portion 34. The same number of (three in this embodiment) second projections 40 as the number of the roller pairs 23 are provided and placed at regular intervals in the circumferential direction Y. The second annular portion 39 and the plurality of second projections 40 are formed integrally by use of a synthetic resin material (e.g., polyacetal, polyamide, polytetrafluoroethylene, polyether ether ketone, polyphenylenesulfide, or the like). That is, the outer cage 32 is formed by use of a synthetic resin material.

On an inner periphery of the second annular portion 39, receptacle recessed portions 80 each recessed outwardly in the radial direction Z are formed over the axial direction X. The same number of (e.g., three) receptacle recessed portions 80 as the number of second projections 40 are provided such that one receptacle recessed portion 80 corresponds to one second projection 40. Each of the receptacle recessed portions 80 is formed in the second annular portion 39 at a position adjacent to a circumferential second side Y2 of a corresponding second projection 40. Each of the receptacle recessed portions 80 is a recessed portion through which an insertion portion 51 of the wedge member 26 is inserted. Note that a side face 81 of each of the receptacle recessed portions 80 on the circumferential second side Y2 may contact a distal end of the insertion portion 51 of the corresponding wedge member 26, so as to function as a regulation surface that regulates a rotation amount of the outer cage 32 relative to the wedge member 26.

On a surface of each of the second projections 40 on the circumferential first side Y1, a second abutting surface (a second pressing portion) 41 (mainly see FIG. 4) that can contact (press) the second roller 23b of the roller pair 23 is formed. The second abutting surface 41 is constituted by a flat surface, for example. That is, the second abutting surface 41 can make surface contact with the second roller 23b. However, the second abutting surface 41 is not limited to one that makes surface contact with the second roller 23b, and may be configured to make line contact or point contact with the second roller 23b.

On a surface of each of the second projections 40 on the circumferential second side Y2, a second slid-contact surface (a second slid-contact portion) 42 (mainly see FIGS. 3, 4) that makes slide contact with a corresponding wedge member 26 is formed. The second slid-contact surface 42 is constituted by a flat tapered surface (an inclined surface) inclined toward the circumferential second side Y2 in a direction toward the axial first side X1. A tapered angle (an inclined angle) of the second slid-contact surface 42 is set to an angle that allows the second slid-contact surface 42 to fit the after-mentioned second slide-contact surface 54.

Since the second slid-contact surface 42 is provided in each of the second projections 40, it is possible to achieve reduction of the number of components in comparison with a case where a member provided with the second slid-contact surface 42 is a member formed separately from the second projection 40. As illustrated in FIG. 2, the inner cage 31 and the outer cage 32 are combined so that the plurality of connecting portions 35 and the plurality of second projections 40 are arranged alternately in the circumferential direction Y. On the circumferential second side Y2 relative to each of the connecting portions 35, a second projection 40 that can press a second roller 23b paired with a first roller 23a that can be pressed by the connecting portion 35 is provided adjacently via the roller pair 23. Further, on the circumferential first side Y1 relative to each of the connecting portions 35, a second projection 40 (hereinafter referred to as the "second projection 40 for the adjacent roller pair 23") that can press a second roller 23b of an adjacent roller pair 23 provided adjacently, on the circumferential first side Y1, to the roller pair 23 including the first roller 23a that can be pressed by the connecting portion 35 is provided adjacently via a wedge member 26. That is, in the inner cage 31 and the outer cage 32, a connecting portion 35 that can press a first roller 23a of each roller pair 23 and a second projection 40 that can press a second roller 23b of an adjacent roller pair 23 that is adjacent to a circumferential first side Y1 of the roller pair 23 are adjacent to each other via one wedge member 26.

As illustrated in FIGS. 2 and 3, a movement (that is, falling) of each of the rollers 23a, 23b toward the axial first side X1 is regulated by both the third annular portion 34 of the inner cage 31 and the second annular portion 39 of the outer cage 32. Further, a movement (that is, falling) of each of the rollers 23a, 23b toward the axial second side X2 is regulated by the first annular portion 33 of the inner cage 31. Further, the movement of each of the rollers 23a, 23b toward the axial first side X1 may be regulated by either one of the third annular portion 34 and the second annular portion 39.

Figure 5A:
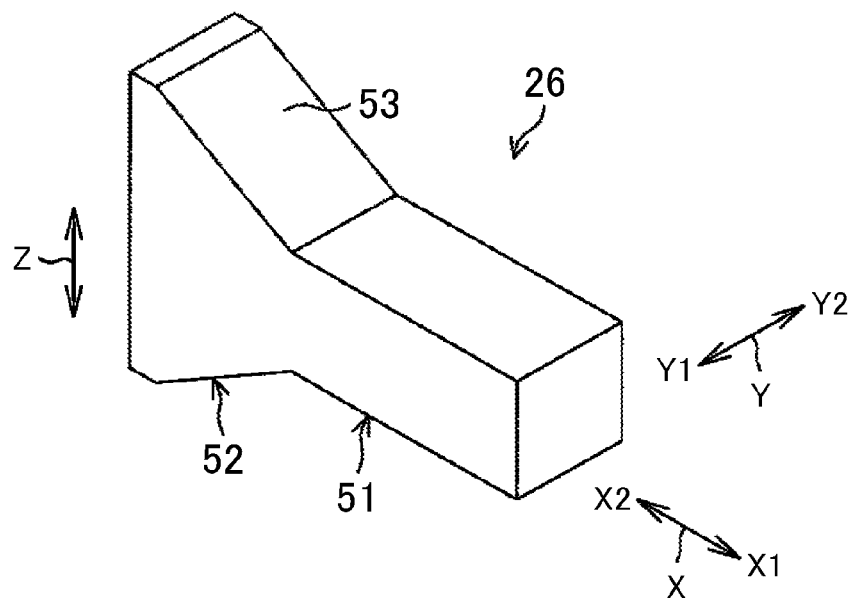
FIG. 5A is a perspective view illustrating a configuration of a wedge member.
Figure 5B:
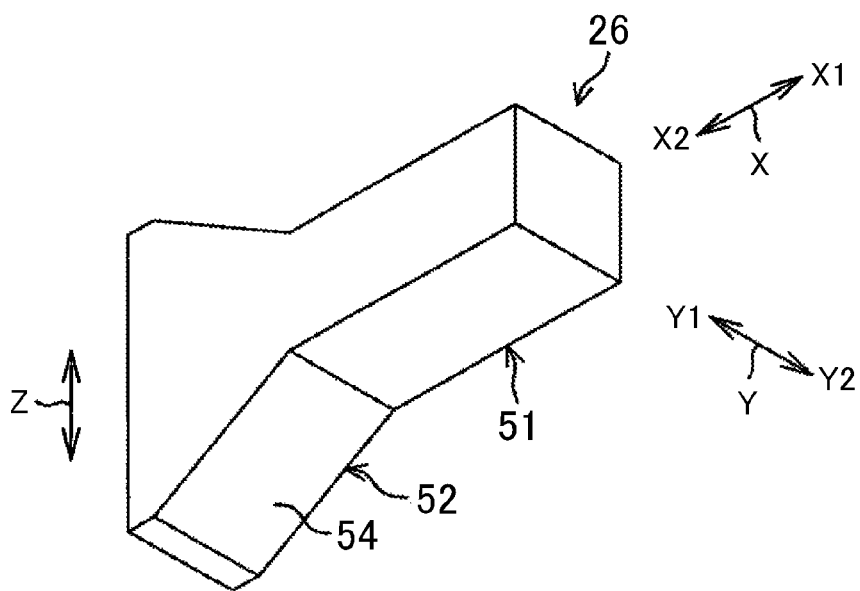
FIG. 5B is a perspective view illustrating the configuration of the wedge member.

One corresponding wedge member 26 is inserted between each of the connecting portions 35 and the second projection 40 for the adjacent roller pair 23. FIGS. 5A, 5B are perspective views each illustrating a configuration of the wedge member 26. In FIGS. 5A and 5B, the wedge member 26 is viewed from two different directions. Each of the wedge members 26 includes: an insertion portion 51 having a rectangular section and inserted between the connecting portion 35 (see FIG. 2, etc.) and the second projection 40 (see FIG. 2, etc.) for the adjacent roller pair 23; and a wedge portion 52 that expands (increases in diameter) toward both sides in the circumferential direction Y from the other end of the insertion portion 51 in the axial direction X. The insertion portion 51 extends in a stick shape along the axial direction X and its section orthogonal to its axis has a rectangular shape. The wedge portion 52 includes a first slide-contact surface 53 provided on a surface thereof on the circumferential second side Y2, and a second slide-contact surface 54 provided on a surface thereof on the circumferential first side Y1. The first slide-contact surface 53 is constituted by a tapered surface (an inclined surface) inclined toward the circumferential first side Y1 in the direction toward the axial first side X1, and makes slide contact with the connecting portion 35 from the circumferential first side Y1. The second slide-contact surface 54 is constituted by a tapered surface (an inclined surface) inclined toward the circumferential second side Y2 in the direction toward the axial first side X1, and makes slide contact with the second projection 40 for the adjacent roller pair 23 from the circumferential second side Y2. The first and second slide-contact surfaces 53, 54 face opposite sides and each of the first and second slide-contact surfaces 53, 54 is formed of a flat surface.

Note that the first and second slide-contact surfaces 53, 54 may be each formed of a projecting curved surface that is curved to protrude in an arc shape along the radial direction Z. In this case, it is possible to restrain the first and second slide-contact surfaces 53, 54 from making point contact with the first slid-contact surface 38 of the connecting portion 35 and the second slid-contact surface 42 of the second projection 40, respectively. Conversely, instead of the first and second slide-contact surfaces 53, 54, each of the first slid-contact surface 38 and the second slid-contact surface 42 may be formed of a projecting curved surface.

As illustrated in FIG. 1, the electromagnetic clutch 7 includes the annular armature 71 to which the plurality of wedge members 26 is fixed and connected, an annular rotor 72 that is positioned on the axial first side X1 relative to the armature 71 and is opposed to the armature 71, and an electromagnet 73 placed on the axial first side X1 relative to the rotor 72. The armature 71 is placed on the axial first side X1 via a back plate 70 relative to the third annular portion 34 of the inner cage 31 and the second annular portion 39 of the outer cage 32.

The back plate 70 has a toric shape and is fitted to an outer periphery of the shaft portion 11 of the inner ring 4 in a fixed manner. The back plate 70 is formed by use of a steel material, for example. A principal surface of the back plate 70 on the axial first side X1 makes slide contact with respective principal surfaces of the third annular portion 34 and the second annular portion 39 on the axial second side X2. A plurality of (the same number as the number of wedge members 26) insertion holes 82 is placed in the back plate 70 at regular intervals in the circumferential direction Y. The insertion holes 82 (only one of them is illustrated in FIG. 1) are provided such that one insertion hole 82 corresponds to one wedge member 26. Each of the wedge members 26 is inserted through a corresponding insertion hole 82 so as to be connected to the armature 71 in a fixed manner. The armature 71 is provided so as to be rotatable and movable in the axial direction X relative to the housing 8 and the inner ring 4. The rotor 72 is fitted to the outer periphery of the inner ring 4. The electromagnet 73 includes an electromagnetic coil 73a and a core 73b that supports the electromagnetic coil 73a. An outer periphery of the core 73b is fitted to an inner periphery of the housing 8 in a fixed manner. An inner periphery of the core 73b is supported by a third rolling bearing 74 fitted to an outer periphery of the inner ring 4 in a fixed manner so that the core 73b is rotatable relative to the inner ring 4 and immovable in the axial direction X. Due to the third rolling bearing 74, the electromagnet 73 and the first shaft body 2 are relatively rotatable.

Figure 6:
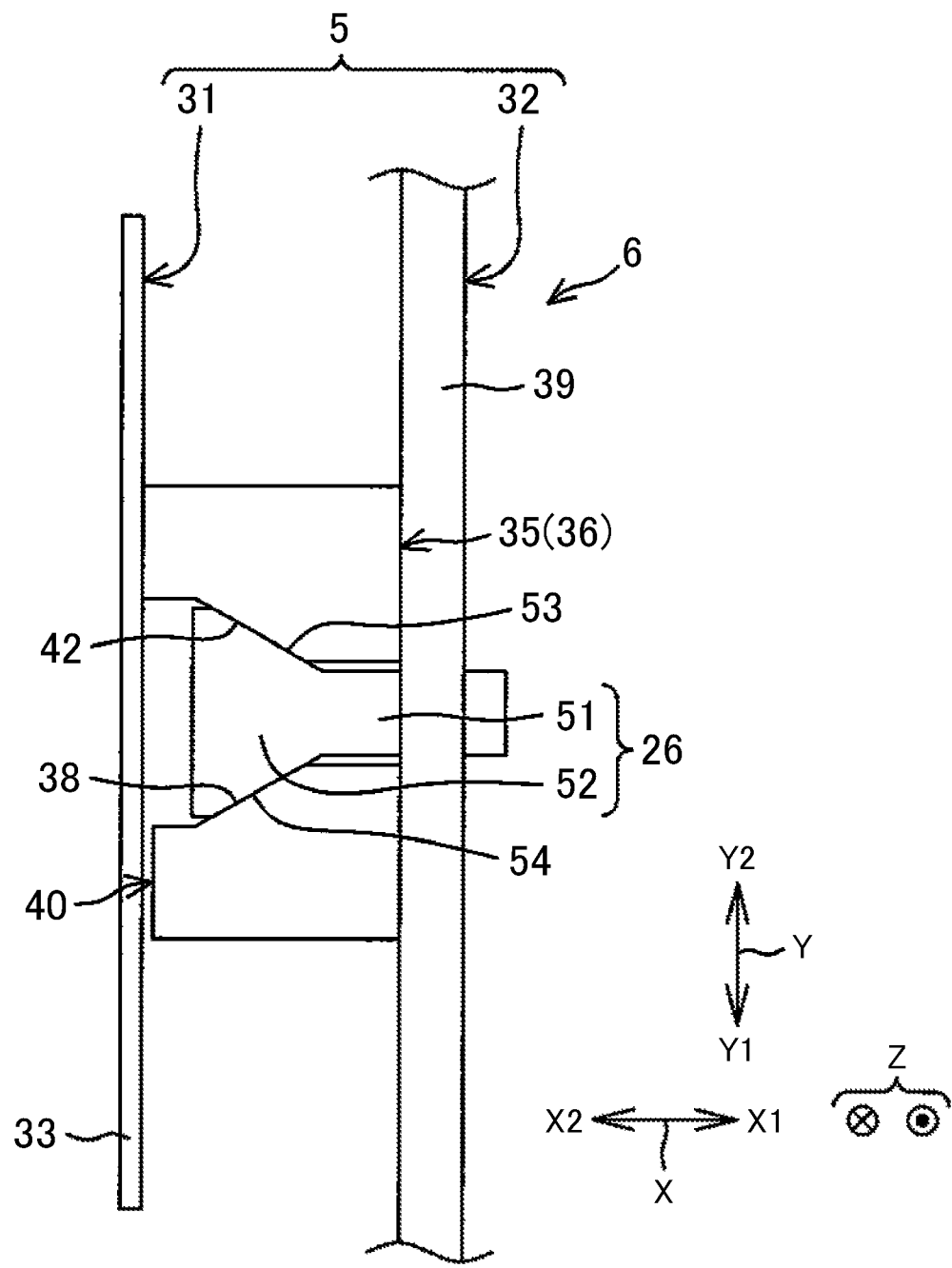
FIG. 6 is a side view illustrating a positional relationship of the wedge member with respect to an inner cage and an outer cage in a fastened state of the two-way clutch.
Figure 7:
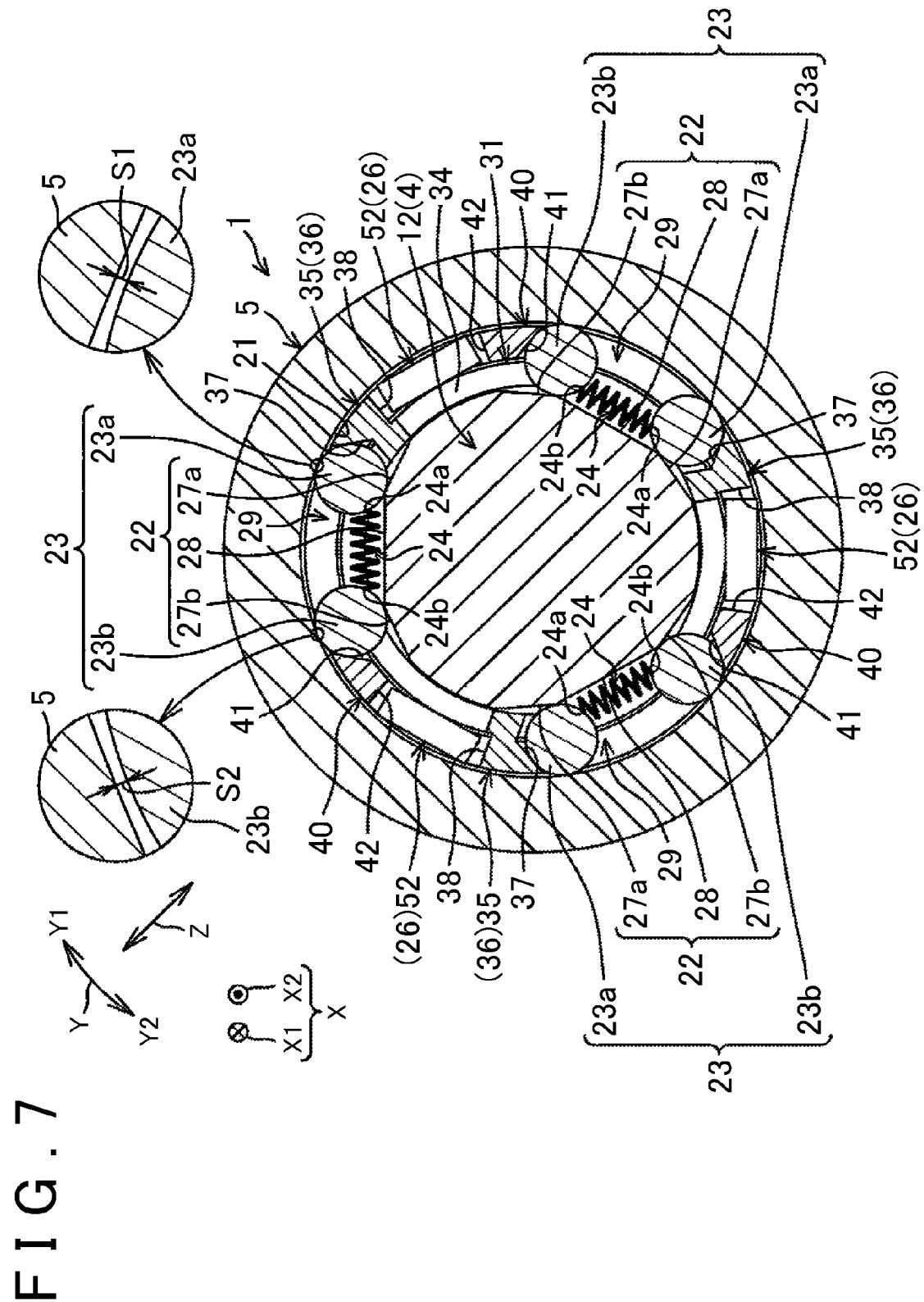
FIG. 7 is a sectional view illustrating the configuration of the two-way clutch in a released state of the two-way clutch.
Figure 8:
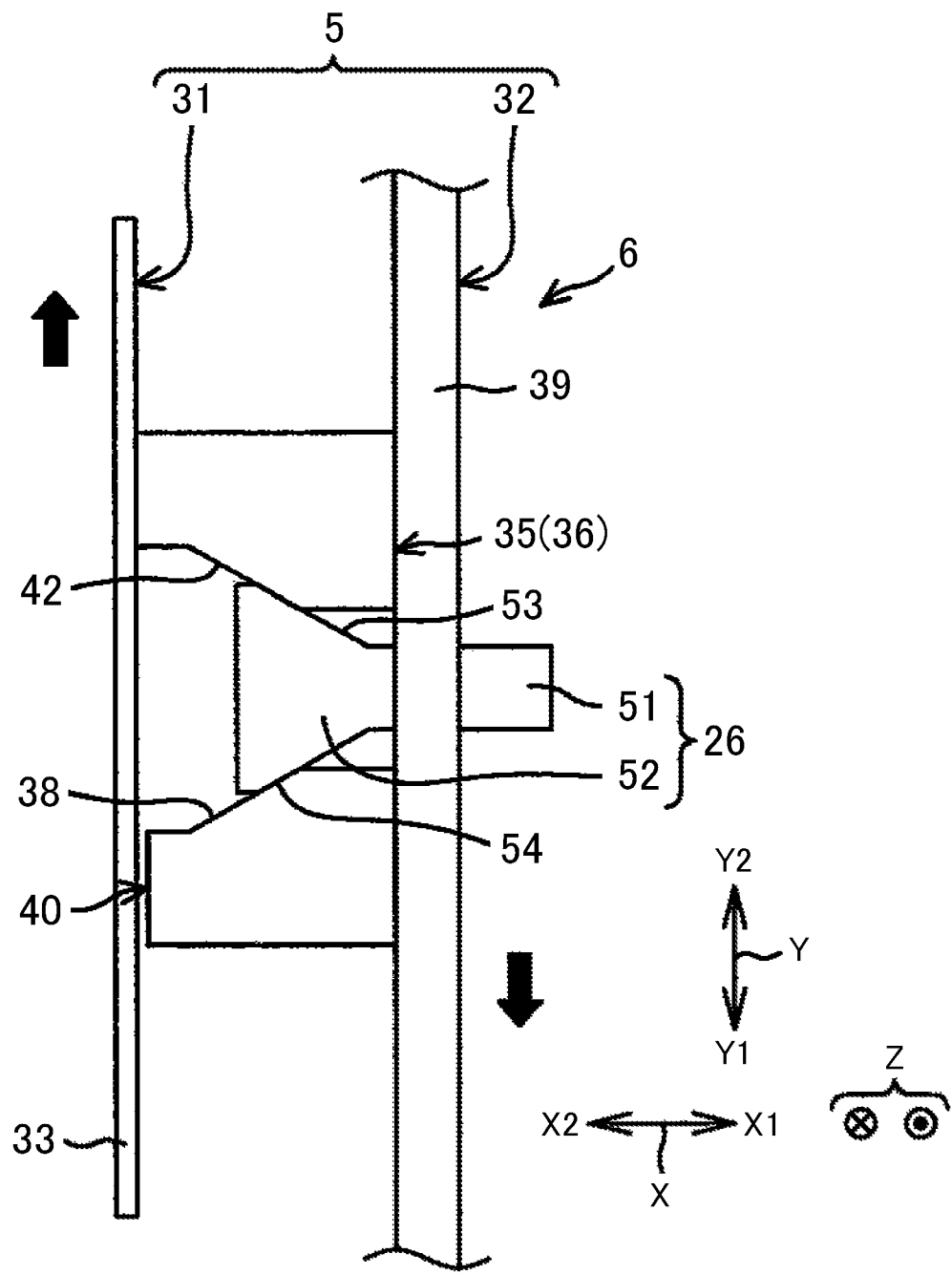
FIG. 8 is a side view illustrating a positional relationship of the wedge member with respect to the inner cage and the outer cage in a released state of the two-way clutch.

FIG. 6 is a side view illustrating a positional relationship of the wedge member 26 with respect to the inner cage 31 and the outer cage 32 in a fastened state of the two-way clutch 6. FIG. 7 is a sectional view illustrating the configuration of the two-way clutch 6 in a released state of the two-way clutch 6, when viewed from a section line IV-IV in FIG. 1, similarly to FIG. 4. FIG. 8 is a side view illustrating a positional relationship of the wedge member 26 with respect to the inner cage 31 and the outer cage 32 in a released state of the two-way clutch 6.

As illustrated in FIGS. 4 and 6, in an OFF state of the electromagnetic clutch 7, the two-way clutch 6 is in a fastened state. That is, in an OFF state of the electromagnetic clutch 7, the armature 71 is not attracted by the electromagnet 73. Accordingly, the armature 71 is placed at an initial position, and the wedge member 26 provided in the armature 71 in a movable manner in the axial direction X is placed at a first position (a position illustrated in FIG. 6).

In this state, as illustrated in FIG. 4, each of the first rollers 23a is elastically pressed by the elastic member 24 toward a first engaged position 29a provided in an end portion of the wedge space 29 on the circumferential first side Y1. When the first roller 23a is placed at the first engaged position 29a, the first roller 23a engages with the outer periphery of the inner ring 4 (the large diameter portion 12) and the inner periphery of the outer ring 5 (the second annular stepped portion 14). Further, in this state, each of the second rollers 23b is elastically pressed by the elastic member 24 toward a second engaged position 29b provided in an end portion of the wedge space 29 on the circumferential second side Y2. When the second roller 23b is placed at the second engaged position 29b, the second roller 23b engages with the outer periphery of the inner ring 4 (the large diameter portion 12) and the outer ring 5 (the second annular stepped portion 14). Thus, in an OFF state of the electromagnetic clutch 7, the first and second rollers 23a, 23b engage with the outer periphery of the inner ring 4 and the inner periphery of the outer ring 5, so that the two-way clutch 6 is in a fastened state.

Further, in this state, the insertion portion 51 of the wedge member 26 is inserted between the connecting portion 35 and the second projection 40 for the adjacent roller pair 23. The first slide-contact surface 53 provided on the surface of the wedge member 26 on the circumferential second side Y2 is opposed to the first slid-contact surface 38 of the connecting portion 35 via a very small gap. The second slide-contact surface 54 provided on the surface of the wedge member 26 on the circumferential first side Y1 is opposed to the second slid-contact surface 42 of the second projection 40 of the adjacent roller pair 23 via a very small gap. Thus, in an OFF state of the electromagnetic clutch 7, a very small gap is formed between the slide-contact surfaces 53, 54 and the slid-contact surfaces 38, 42. This makes it possible to minimize transmission loss of a force between each of the wedge members 26 and the inner and outer cages 31, 32 at the time when the electromagnetic clutch 7 is turned on as described below.

In the meantime, when the electromagnetic clutch 7 is turned into an ON state, the armature 71 is attracted by the electromagnetic clutch 7 as illustrated in FIGS. 7 and 8, so that the plurality of wedge members 26 connected to the armature 71 is drawn toward the axial first side X1 (the plurality of wedge members 26 moves in the axial direction X). Due to the drawing, each wedge member 26 is placed at the second position (a position of the wedge member 26 illustrated in FIG. 8) on the axial first side X1 relative to the first position (a position of the wedge member 26 illustrated in FIG. 6).

The first slide-contact surface 53 provided on the surface of the wedge member 26 on the circumferential second side Y2 is constituted by a tapered surface (an inclined surface) inclined toward the circumferential first side Y1 in the direction toward the axial first side X1. Accordingly, along with a movement of each of the wedge members 26 toward the axial first side X1, the first slide-contact surface 53 guides the connecting portion 35 toward the circumferential second side Y2 while the first slide-contact surface 53 makes slide contact with the first slid-contact surface 38 of the connecting portion 35. Further, the second slide-contact surface 54 provided on the surface of the wedge member 26 on the circumferential first side Y1 is constituted by a tapered surface (an inclined surface) inclined toward the circumferential second side Y2 in the direction toward the axial first side X1. Accordingly, along with a movement of each of the wedge members 26 toward the axial first side X1, the second slide-contact surface 54 guides the second projection 40 for the adjacent roller pair 23 toward the circumferential first side Y1 while the second slide-contact surface 54 makes slide contact with the second slid-contact surface 42 of the second projection 40. That is, along with a movement of each of the wedge members 26 toward the axial first side X1, the connecting portion 35 and the second projection 40 for the adjacent roller pair 23 are separated from each other relative to the wedge member 26 (the insertion portion 51). As a result, the inner cage 31 rotates toward the circumferential second side Y2 and the outer cage 32 rotates toward the circumferential first side Y1. At this time, the third annular portion 34 and the second annular portion 39 each slide on the back plate 70. Note that respective rotation amounts of the outer cage 32 and the inner cage 31 may be regulated by contact between the side face (regulation wall) 81, on the circumferential second side Y2, of the receptacle recessed portion 80 of the outer cage 32 and an insertion portion 51 of a corresponding wedge member 26.

Along with rotation of the inner cage 31 toward the circumferential second side Y2, each of the first abutting surfaces 37 moves toward the circumferential second side Y2, and thus, each of the first abutting surfaces 37 contacts a corresponding first roller 23a so as to press the corresponding first roller 23a toward the circumferential second side Y2. This moves each of the first rollers 23a toward the circumferential second side Y2 against an elastic pressing force from the elastic member 24. This accordingly separates each of the first rollers 23a from the first engaged position 29a (see FIG. 4), so that a gap S1 is formed between each of the first rollers 23a and the inner periphery of the outer ring 5 as illustrated in FIG. 7. Hereby, the engagement of each of the first rollers 23a with the outer periphery of the inner ring 4 and the inner periphery of the outer ring 5 is released.

Further, along with rotation of the outer cage 32 toward the circumferential first side Y1, each of the second abutting surfaces 41 moves toward the circumferential first side Y1, and thus, each of the second abutting surfaces 41 contacts a corresponding second roller 23b so as to press the corresponding second roller 23b toward the circumferential first side Y1. This moves each of the second rollers 23b toward the circumferential first side Y1 against an elastic pressing force from the elastic member 24. This accordingly separates each of the second rollers 23b from the second engaged position 29b (see FIG. 4), so that a gap S2 is formed between each of the second rollers 23b and the inner periphery of the outer ring 5 as illustrated in FIG. 7. Hereby, the engagement of each of the second rollers 23b with the outer periphery of the inner ring 4 and the inner periphery of the outer ring 5 is released.

Thus, in an ON state of the electromagnetic clutch 7, each of the rollers 23a, 23b is disengaged from the outer periphery of the inner ring 4 (the large diameter portion 12) and the inner periphery of the outer ring 5, so that the two-way clutch 6 is turned into a released state. As described above, according to this embodiment, along with the movement of each of the wedge members 26 in the axial direction X, it is possible to switch the rollers 23a, 23b of the roller pair 23 between a state where the rollers 23a, 23b are engaged with the outer periphery of the inner ring 4 and the inner periphery of the outer ring 5 and a state where the rollers 23a, 23b are disengaged from the outer periphery of the inner ring 4 and the inner periphery of the outer ring 5. This accordingly makes it possible to realize fastening/release of the two-way clutch 6 with a simple structure. This makes it possible to achieve cost reduction.

Further, each of the wedge members 26 includes both the first slide-contact surface 53 that makes slide contact with the connecting portion 35 corresponding to the first roller 23a, and the second slide-contact surface 54 that makes slide contact with the second projection 40 corresponding to the second roller 23b of the adjacent roller pair 23. In a case where a first guide member provided with only the first slide-contact surface 53 and a second guide member provided with only the second slide-contact surface 54 are used, a total number of necessary first and second guide members is the double (that is, six) of the number of roller pairs 23. In contrast, in the present embodiment, since each of the wedge members 26 is provided with both the first slide-contact surface 53 and the second slide-contact surface 54, the same number (that is, three) of wedge members 26 as the number of roller pairs 23 are provided. This makes it possible to achieve reduction in the number of components.

Further, since the plurality of wedge members 26 is provided, it is possible to stably rotate both the inner cage 31 and the outer cage 32 at the time when the electromagnetic clutch 7 is turned on. Further, since the inner cage 31 and the outer cage 32 are formed by use of a synthetic resin material, it is possible to reduce the weight of the driving force transmission device in comparison with a case where a metallic material is used as a cage.

One embodiment of the present invention has been described above, but the present invention can be carried out according to other embodiments. For example, in the connecting portion 35, a form of the first slid-contact portion that makes slide contact with the first slide-contact surface 53 may not be a planar shape like the first slid-contact surface 38. Further, in the second projection 40, a form of the second slid-contact portion that makes slide contact with the second slide-contact surface 54 may not be a planar shape like the second slid-contact surface 42.

Further, in the inner cage 31, the first projection 36 provided with the first abutting surface 37 may be a member formed separately from the connecting portion 35. Further, a member provided with the second slid-contact surface 42 may be a member formed separately from the connecting portion 35 (the first projection 36). Further, it has been described that the inner cage 31 is configured to include the first annular portion 33 and the third annular portion 34, but, for example, the third annular portion 34 may be omitted. In this case, in order to stably support the inner cage 31 by the inner ring 4, a thickness of the first annular portion 33 in the axial direction X may be increased. Further, a shape of the first annular portion 33 is not limited to a toric shape and may be other annular shapes.

Further, in the outer cage 32, a member provided with the second slid-contact surface 42 may be a member formed separately from the second projection 40. Further, the shape of the second annular portion 39 of the outer cage 32 is not limited to a toric shape, and may be other annular shapes. Further, the above embodiment describes such a configuration that: the wedge members 26 each includes both the first slide-contact surface 53 that makes slide contact with the connecting portion 35 corresponding to the first roller 23*a*, and the second slide-contact surface 54 that makes slide contact with the second projection 40 corresponding to the second roller 23*b* of the adjacent roller pair 23; and a function of the first and second guide members is performed by the plurality of wedge members 26. However, the first guide member having the first slide-contact surface 53 and the second guide member having the second slide-contact surface 54 may be provided as separate members. In this case, it is necessary that the same number of each of first and second guide members as the number of roller pairs be provided, so a total number of necessary first and second guide members is the double (that is, six) of the number of roller pairs.

Further, the present invention is applicable not only to the driving force transmission device provided in a steering device, but also to other driving force transmission mechanisms (e.g., a driving force transmission mechanism for switching between two-wheel drive and four-wheel drive). In addition, various modifications can be made within the scope of the present invention.

Figure 9:
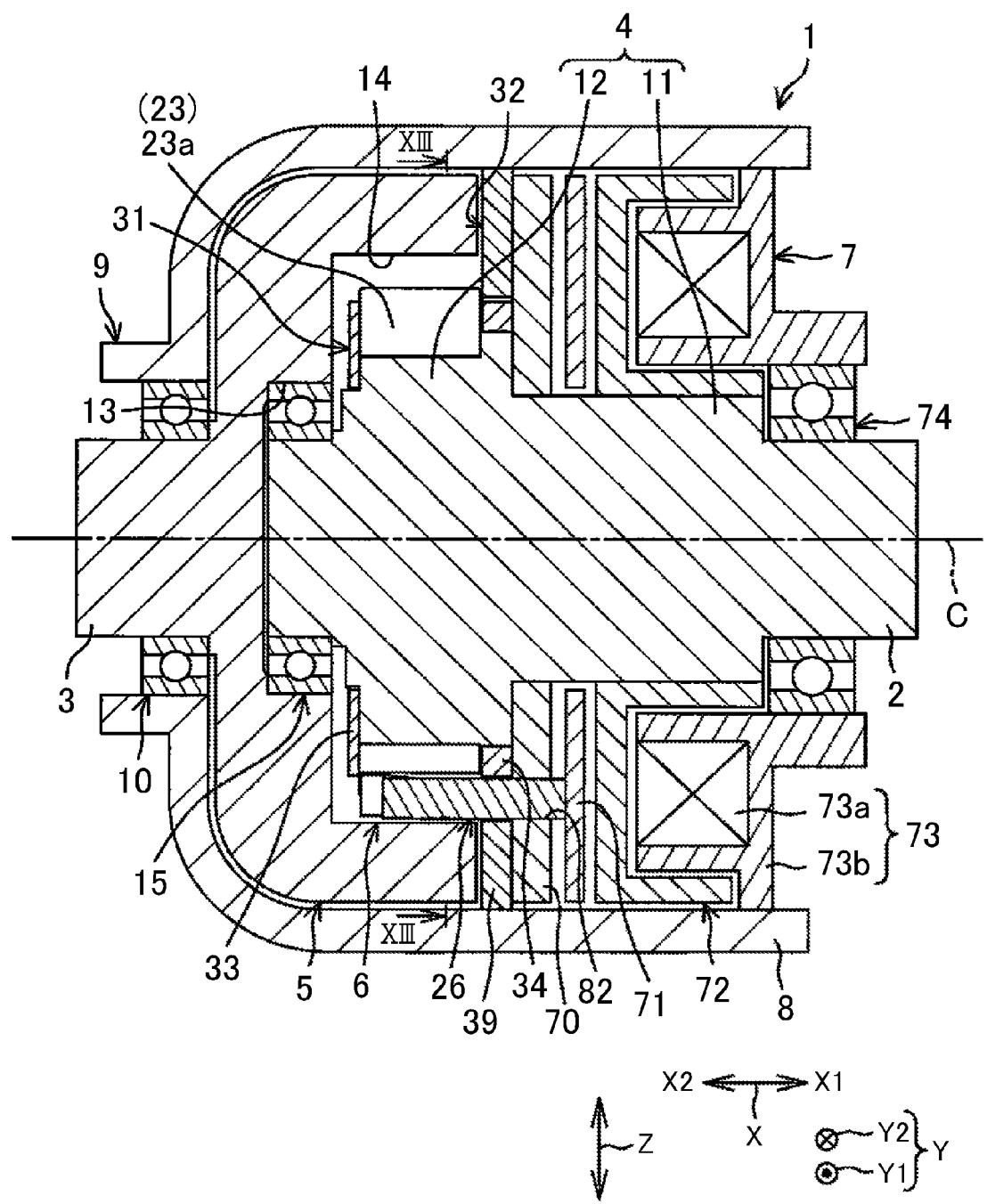
FIG. 9 is a sectional view of a driving force transmission device according to a second embodiment of the present invention.

The following describes a second embodiment of the present invention in detail with reference to FIGS. 9 to 20. Note that a member that is the same as or equivalent to a member in the first embodiment has the same reference numeral as in the first embodiment and a redundant description thereof is omitted. FIG. 9 is a sectional view of a driving force transmission device 1 according to the second embodiment of the present invention.

Figure 10:
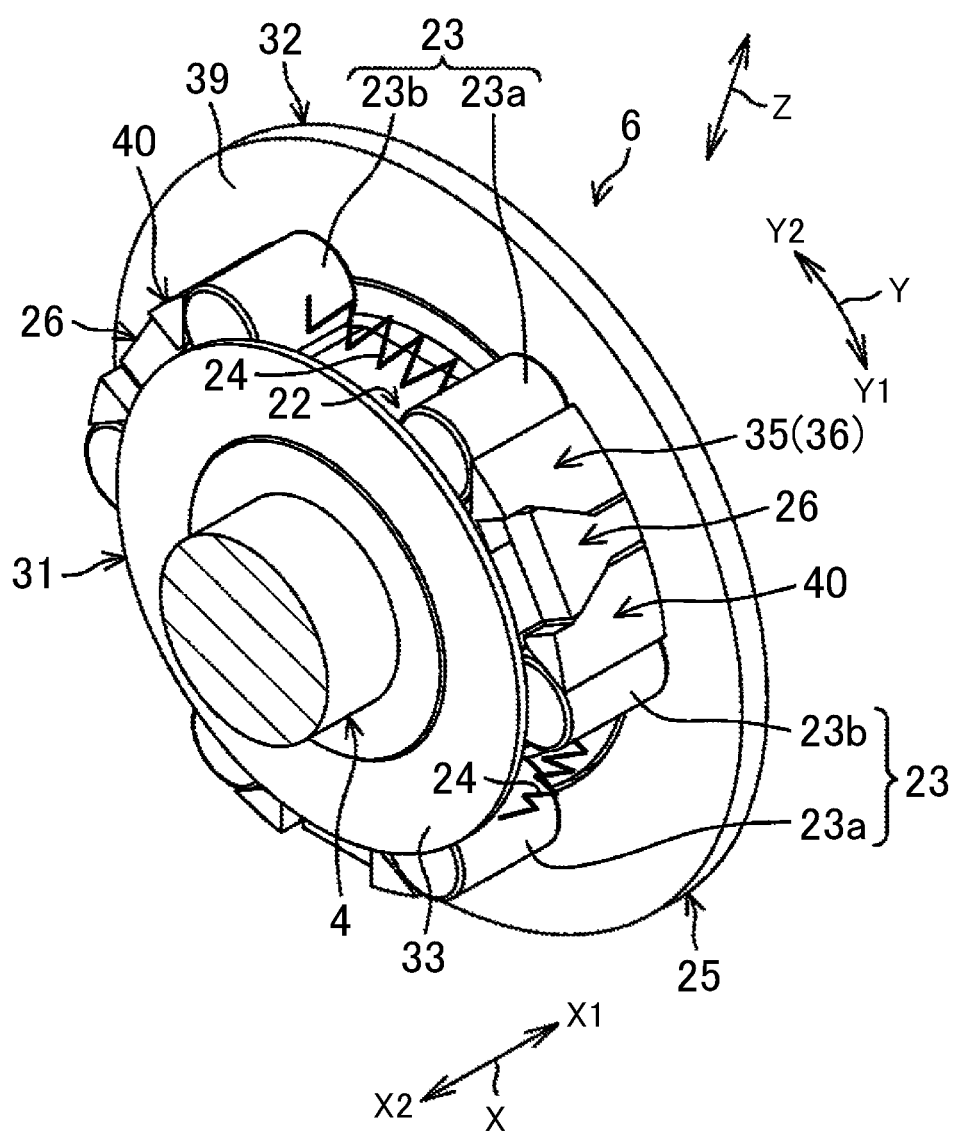
FIG. 10 is a perspective view illustrating a configuration of a two-way clutch included in the driving force transmission device according to the second embodiment.
Figure 11:
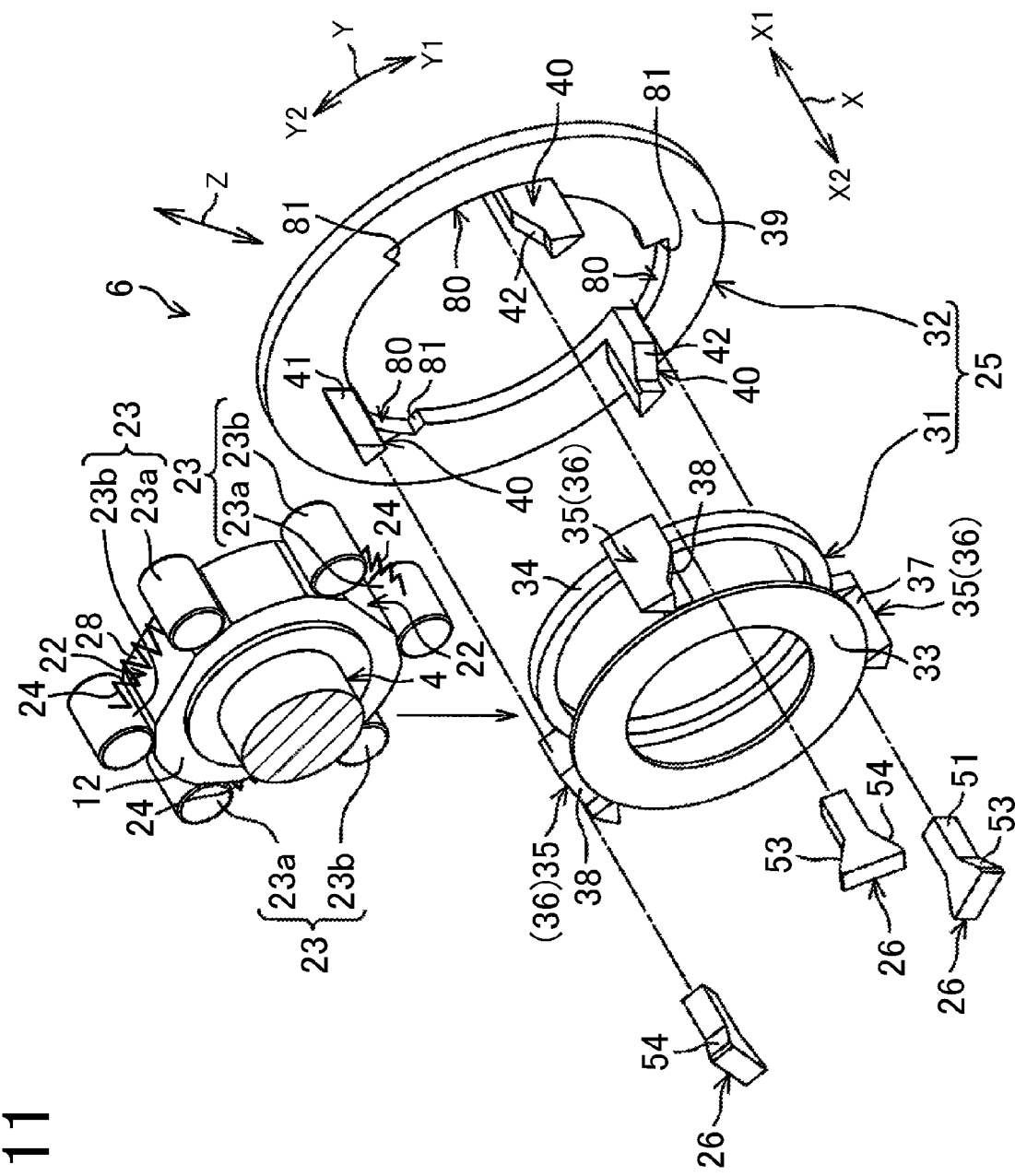
FIG. 11 is an exploded perspective view illustrating the configuration of the two-way clutch.
Figure 12:
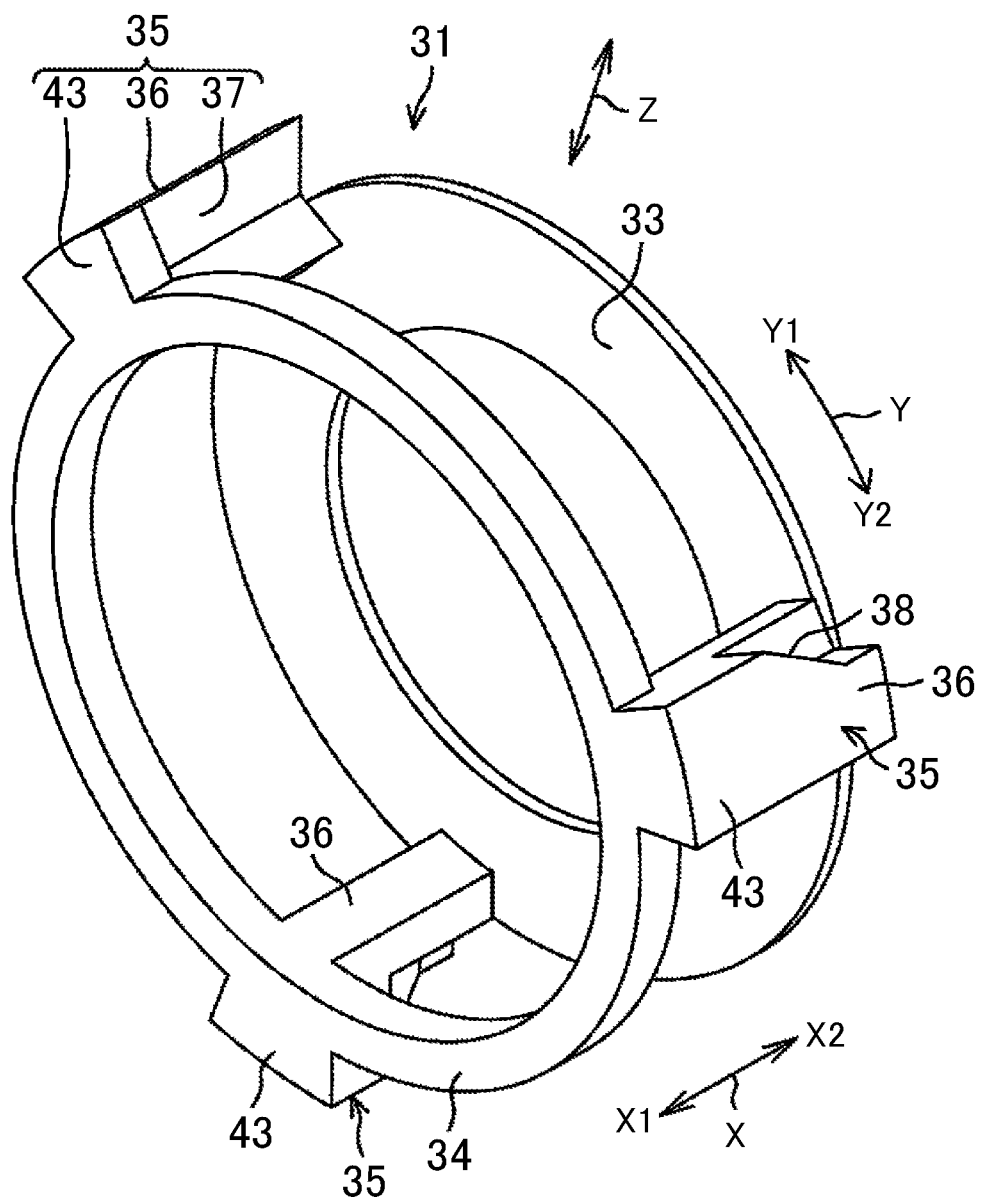
FIG. 12 is a perspective view illustrating a configuration of an inner cage.
Figure 13:
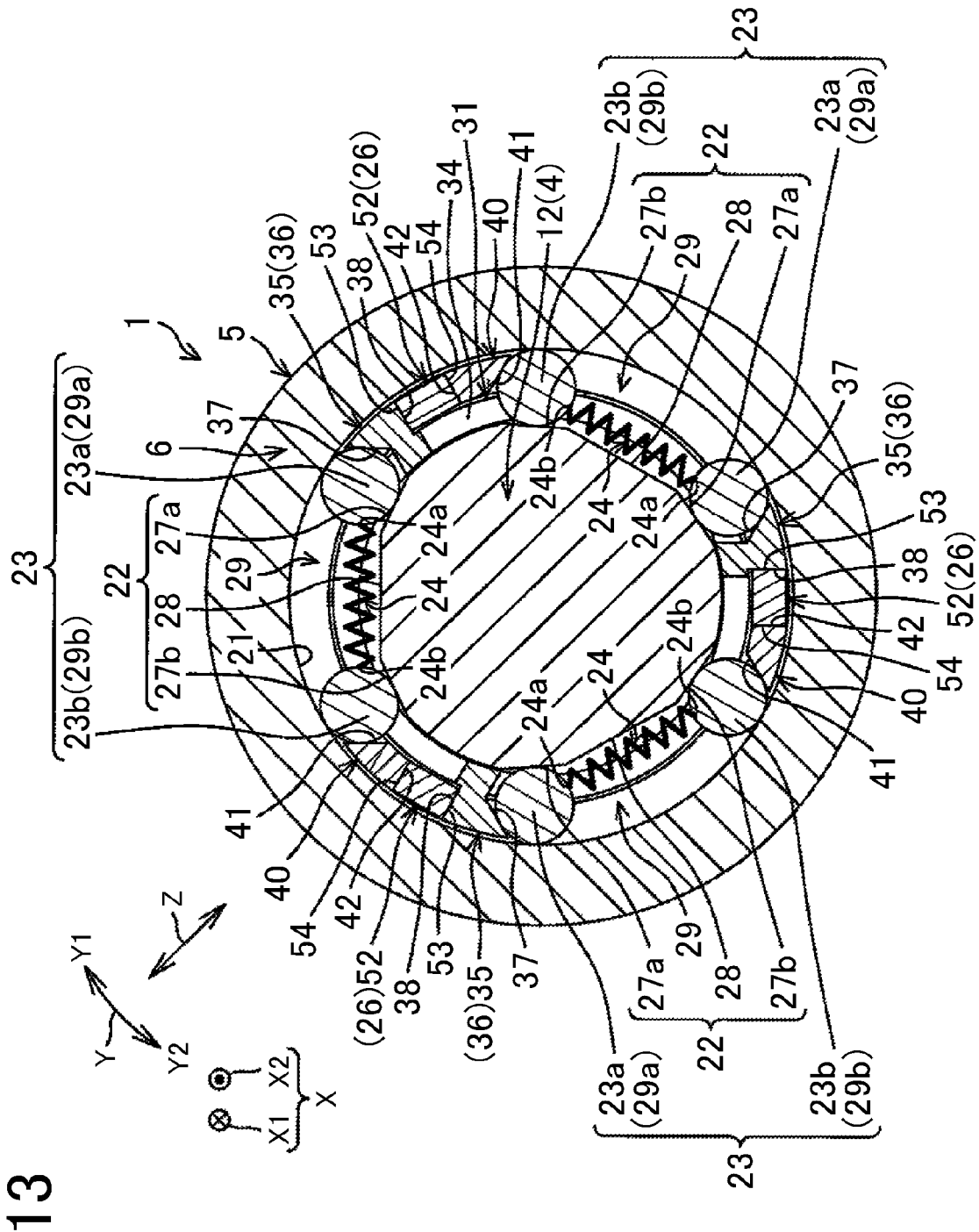
FIG. 13 is a sectional view of the configuration of the two-way clutch when viewed from a section line XIII-XIII in FIG. 9.

FIG. 10 is a perspective view illustrating a configuration of a two-way clutch 6. FIG. 11 is an exploded perspective view illustrating the configuration of the two-way clutch 6. FIG. 12 is a perspective view illustrating a configuration of an inner cage 31. FIG. 13 is a sectional view of the configuration of the two-way clutch 6 when viewed from a section line XIII-XIII in FIG. 9. With reference to FIGS. 9 to 13, the following describes the configuration of the two-way clutch 6. In FIGS. 10 and 11, a large diameter portion 12 is mainly illustrated in an inner ring 4. Further, an outer ring 5 is not illustrated in FIGS. 10, 11, 14A, 14B. Further, FIG. 13 illustrates a fastened state of the two-way clutch 6.

As illustrated in FIGS. 10, 11, a cage 25 includes an inner cage (a first cage) 31 and an outer cage (a second cage) 32, which are provided as separate members. The inner cage 31 and the outer cage 32 are each provided so as to be rotatable. That is, the inner cage 31 and the outer cage 32 are provided so as to be rotatable relative to each other. The inner cage 31 includes a first annular portion 33 having a thin disc shape, a third annular portion 34 having a toric shape and placed on an axial first side X1 relative to the first annular portion 33 coaxially therewith, and a plurality of connection portions (parts including a pressing portion) 35 that connects the first annular portion 33 with the third annular portion 34. The first and third annular portions 33, 34 are fitted to an outer periphery of the large diameter portion 12 of the inner ring 4 so as to be rotatable relative to the inner ring 4. Further, the first annular portion 33 contacts the large diameter portion 12 from an axial second side X2.

Each of the connecting portions 35 has a pillar shape extending along an axial direction X. Each of the connecting portion 35 integrally includes: a first projection 36 (having a first abutting surface 37) projecting from an outer periphery of the first annular portion 33 toward the axial first side X1; and an engageable projection portion 43 provided in an end portion of the first projection 36 on the axial first side X1. That is, the engageable projection portion 43 is provided in the connecting portion 35. From a different viewpoint, each engageable projection portion 43 is placed (provided) on an outer periphery of the third annular portion 34 as illustrated in FIG. 12. An outer periphery of each first projection 36 and an outer periphery of each engageable projection portion 43 form the same cylindrical surface. On a surface of each first projection 36 on a circumferential second side Y2, the first abutting surface (a pressing portion) 37 (mainly see FIG. 13) that can contact (press) a first roller 23*a* of a roller pair 23 is formed. The first abutting surface 37 is constituted by a flat surface, for example. That is, the first abutting surface 37 can make surface contact with the first roller 23*a*. However, the first abutting surface 37 is not limited to one that makes surface contact with the first roller 23*a*, and may be configured to make line contact or point contact with the first roller 23*a*.

On an inner periphery of the second annular portion 39, receptacle recessed portions 80 each recessed outwardly in a radial direction Z are formed over the axial direction X. The same number of (e.g., three) receptacle recessed portions 80 as the number of second projections 40 are provided such that one receptacle recessed portion 80 corresponds to one second projection 40. Each of the receptacle recessed portions 80 is formed in the second annular portion 39 in a region adjacent to a circumferential second side Y2 of a corresponding second projection 40, over a predetermined length in the circumferential direction Y. Each of the receptacle recessed portions 80 is a recessed portion which receives a corresponding engageable projection portion 43 of the inner cage 31 and through which an insertion portion 51 of a wedge member 26 is inserted. Further, a side face of each of the receptacle recessed portions 80 on the circumferential second side Y2 contacts the after-mentioned engaged portion 43*a* of the engageable projection portion 43 provided in the inner cage 31, so as to function as a regulation wall 81 that regulates a rotation amount of the inner cage 31 relative to the outer cage 32.

Figure 14A:
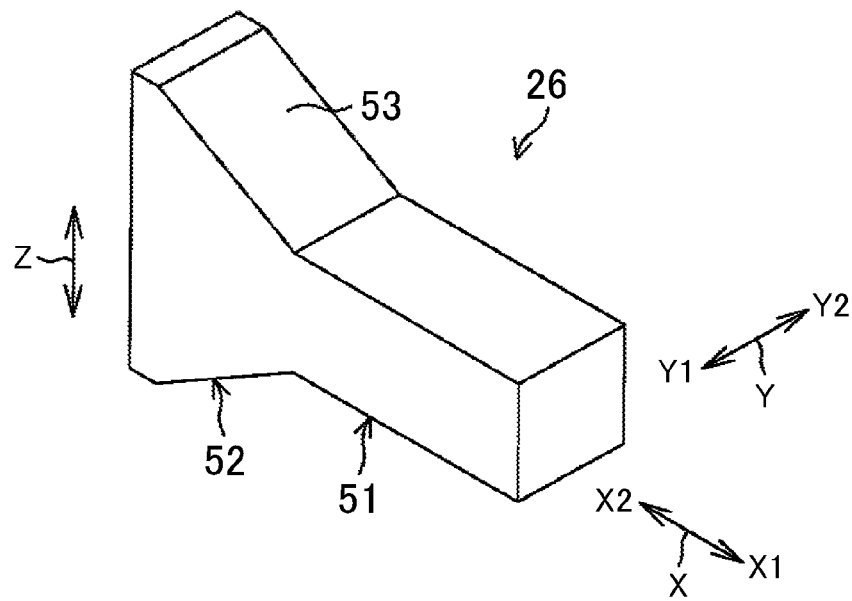
FIG. 14A is a perspective view illustrating a configuration of a wedge member.
Figure 14B:
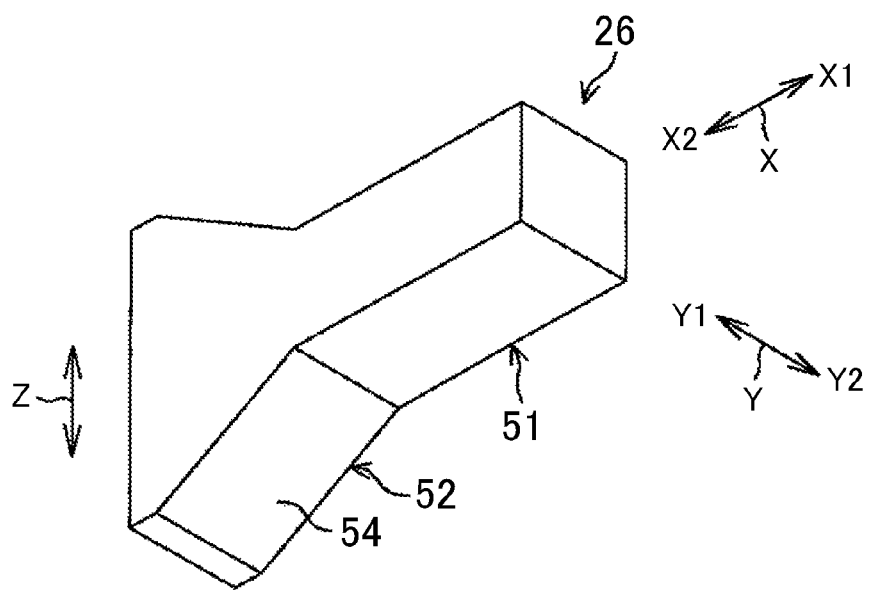
FIG. 14B is a perspective view illustrating the configuration of the wedge member.

One corresponding wedge member 26 is inserted between each of the connecting portions 35 and a second projection 40 for the adjacent roller pair 23. FIGS. 14A, 14B are perspective views each illustrating a configuration of the wedge member 26. In FIGS. 14A and 14B, the wedge member 26 is viewed from two different directions.

First and second slide-contact surfaces 53, 54 may be each formed of a projecting curved surface that is curved in a projecting shape in the axial direction X, instead of a flat surface. In this case, each of the first and second slide-contact surfaces 53, 54 may be formed of a recessed curved surface having a curvature radius larger than that of the projecting curved surface or may have a shape obtained by combining the curved surface and a flat surface (an inclined surface).

An armature 71 is placed on the axial first side X1 via a back plate 70 relative to the third annular portion 34 of the inner cage 31 and the second annular portion 39 of the outer cage 32. The back plate 70 has a toric shape and is fitted to an outer periphery of a shaft portion 11 of the inner ring 4 in a fixed manner. The back plate 70 is formed by use of a steel material, for example. A principal surface of the back plate 70 on the axial second side X2 makes slide contact with respective principal surfaces of the third annular portion 34 and the second annular portion 39 on the axial first side X1.

Figure 15:
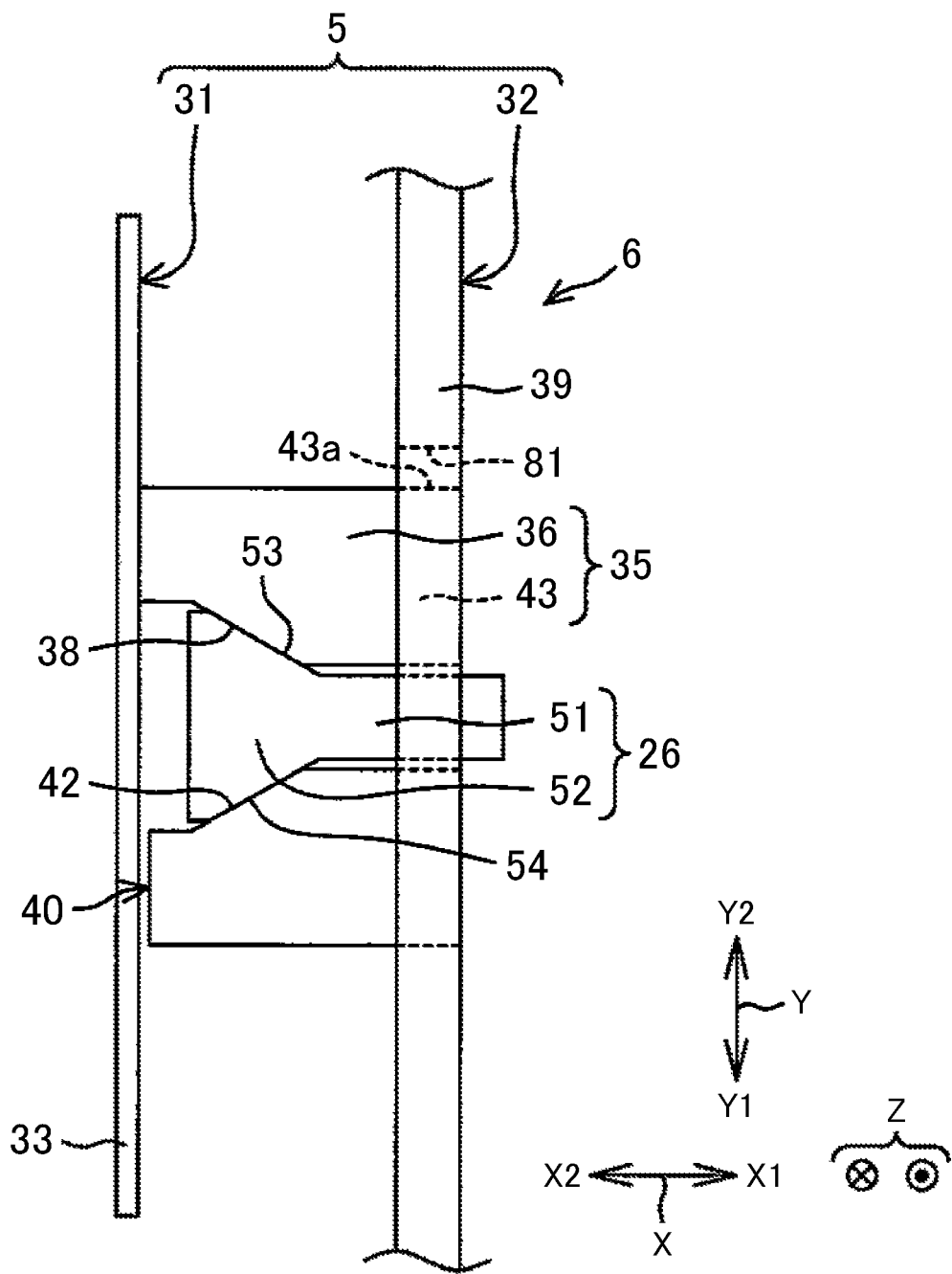
FIG. 15 is a side view illustrating a positional relationship of the wedge member with respect to an inner cage and an outer cage in a fastened state of the two-way clutch.
Figure 17:
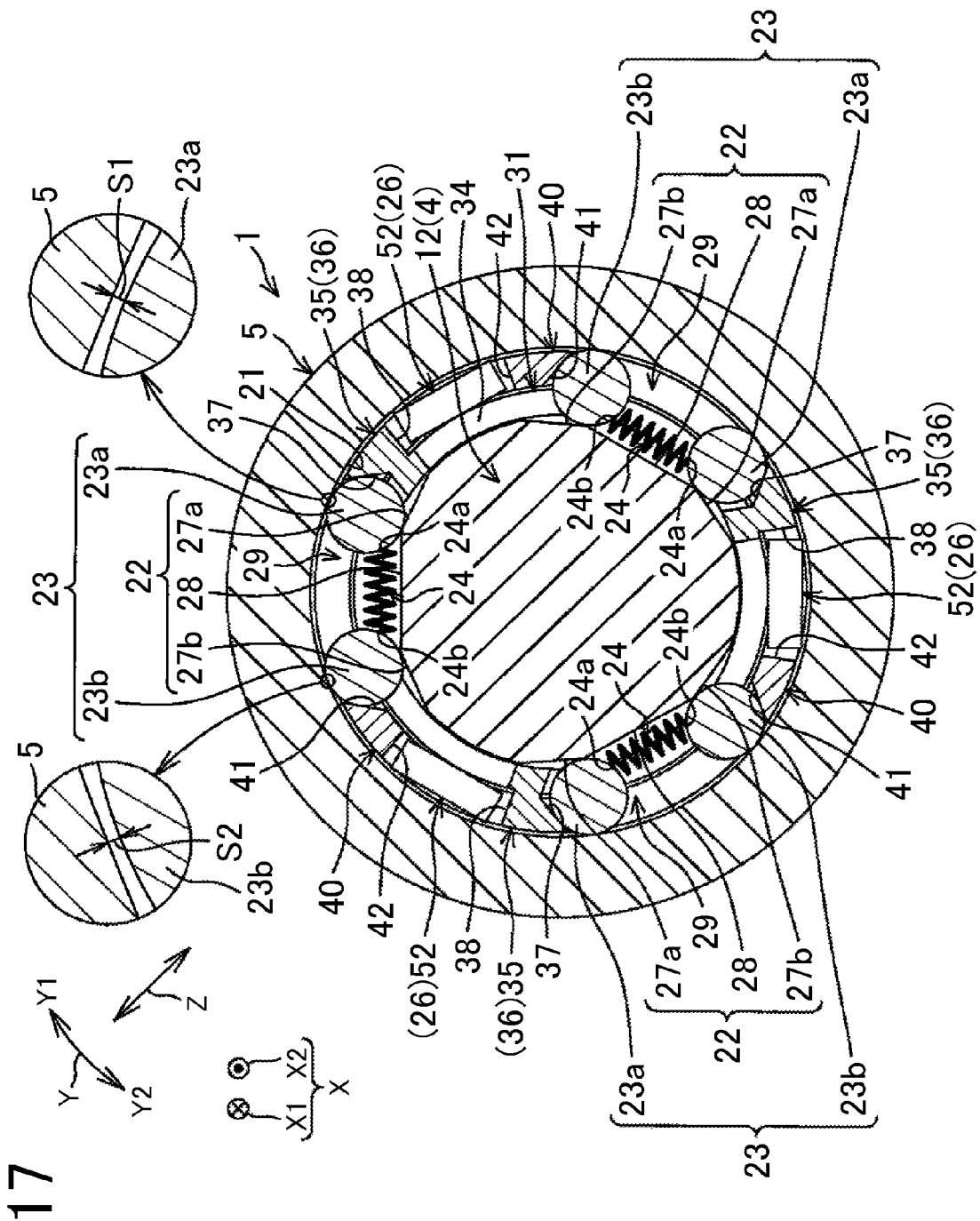
FIG. 17 is a sectional view illustrating the configuration of the two-way clutch in a released state of the two-way clutch.
Figure 18:
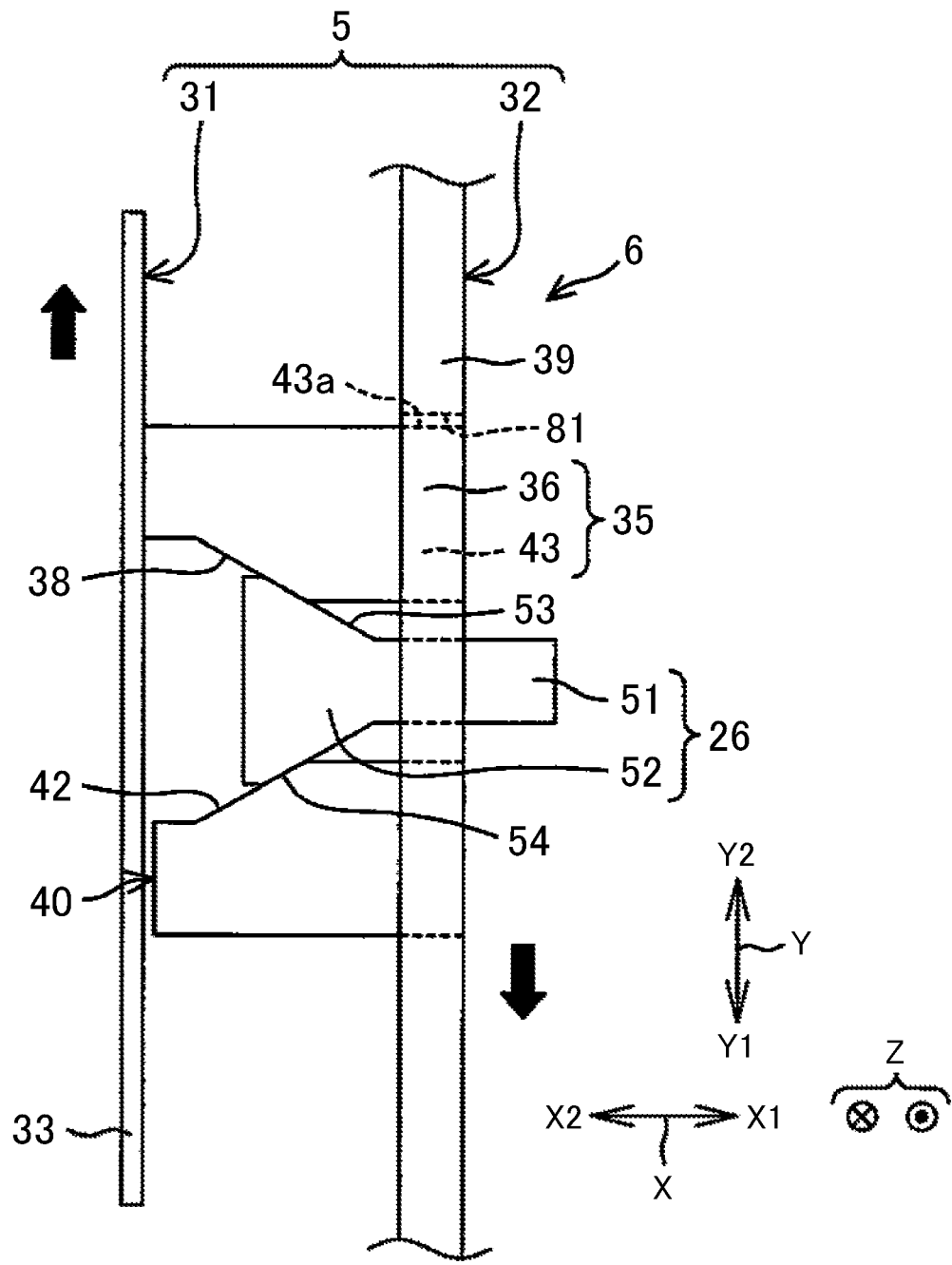
FIG. 18 is a side view illustrating a positional relationship of the wedge member with respect to the inner cage and the outer cage in a released state of the two-way clutch.
Figure 19:
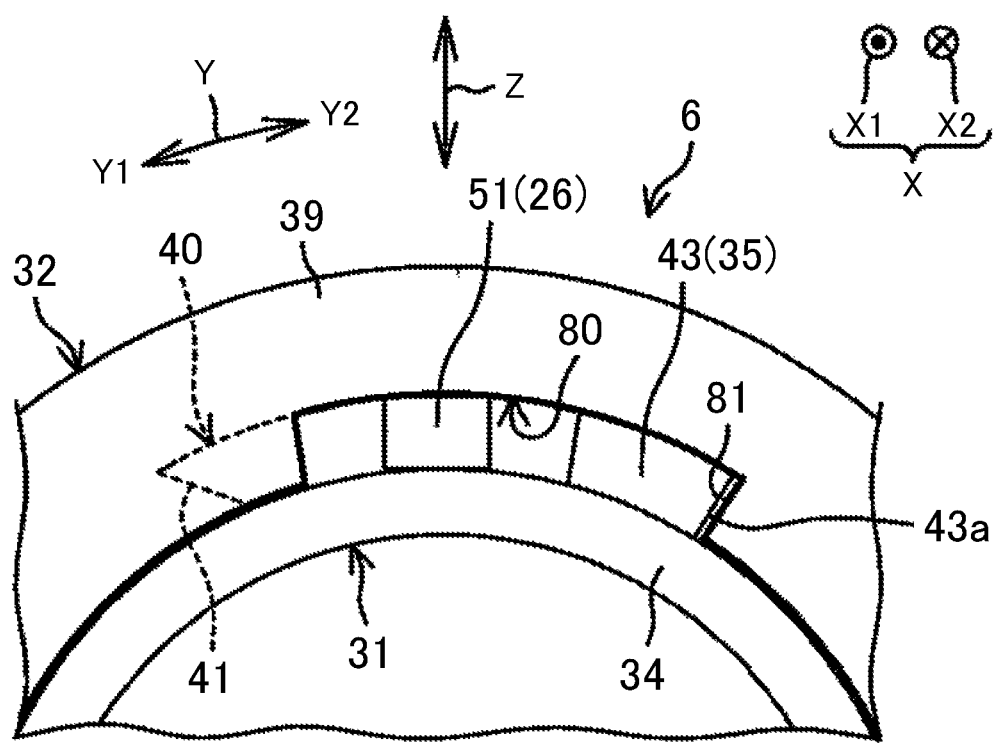
FIG. 19 is a front view illustrating a positional relationship of the wedge member with respect to the inner cage and the outer cage in a released state of the two-way clutch.

FIG. 15 is a side view illustrating a positional relationship of the wedge member 26 with respect to the inner cage 31 and the outer cage 32 in a fastened state of the two-way clutch 6. FIG. 16 is a front view illustrating a positional relationship of the wedge member 26 with respect to the inner cage 31 and the outer cage 32 in a fastened state of the two-way clutch 6. Further, FIG. 16 is a view viewed from the axial first side X1. FIG. 17 is a sectional view illustrating the configuration of the two-way clutch 6 in a released state of the two-way clutch 6, when viewed from a section line XIII-XIII in FIG. 9, similarly to FIG. 13. FIG. 18 is a side view illustrating a positional relationship of the wedge member 26 with respect to the inner cage 31 and the outer cage 32 in a released state of the two-way clutch 6. FIG. 19 is a front view illustrating a positional relationship of the wedge member 26 with respect to the inner cage 31 and the outer cage 32 in a released state of the two-way clutch 6. FIG. 19 is a view viewed from the axial first side X1.

As illustrated in FIGS. 12, 15, and 16, in an OFF state of an electromagnetic clutch 7, the two-way clutch 6 is in a fastened state and the armature 71 is not attracted by an electromagnet 73. Accordingly, the armature 71 is placed at an initial position, and the wedge member 26 provided in the armature 71 in a movable manner in the axial direction X is placed at a first position (a position illustrated in FIG. 15). In this state, as illustrated in FIGS. 12 and 13, each first roller 23a is elastically pressed by an elastic member 24 toward a first engaged position 29a provided in an end portion of a wedge space 29 on the circumferential first side Y1. When the first roller 23a is placed at the first engaged position 29a, the first roller 23a engages with an outer periphery of the inner ring 4 (the large diameter portion 12) and an inner periphery of the outer ring 5 (a second annular stepped portion 14). Further, in this state, each second roller 23b is elastically pressed by the elastic member 24 toward a second engaged position 29b provided in an end portion of the wedge space 29 on the circumferential second side Y2. When the second roller 23b is placed at the second engaged position 29b, the second roller 23b engages with the outer periphery of the inner ring 4 (the large diameter portion 12) and the inner periphery of the outer ring 5 (the second annular stepped portion 14). Thus, in an OFF state of the electromagnetic clutch 7, the first and second rollers 23a, 23b engage with the outer periphery of the inner ring 4 and the inner periphery of the outer ring 5, so that the two-way clutch 6 is in a fastened state. Further, in this state, as illustrated in FIG. 15, a large gap is provided in the circumferential direction Y between the engaged portion 43a of the engageable projection portion 43 provided in the inner cage 31 and the regulation wall 81 of the receptacle recessed portion 80.

Further, in this state, the insertion portion 51 of the wedge member 26 is inserted between the connecting portion 35 and the second projection 40 for the adjacent roller pair 23. The first slide-contact surface 53 provided on the surface of the wedge member 26 on the circumferential second side Y2 is opposed to the first slid-contact surface 38 of the connecting portion 35 via a very small gap. The second slide-contact surface 54 provided on the surface of the wedge member 26 on the circumferential first side Y1 is opposed to the second slid-contact surface 42 of the second projection 40 of the adjacent roller pair 23 via a very small gap.

In the meantime, when the electromagnetic clutch 7 is turned into an ON state, the armature 71 is attracted by the electromagnetic clutch 7 as illustrated in FIGS. 17, 18 and 19, so that the plurality of wedge members 26 connected to the armature 71 is drawn toward the axial first side X1 (the plurality of wedge members 26 moves in the axial direction X). Due to the drawing, each wedge member 26 is placed at the second position (a position of the wedge member 26 illustrated in FIG. 18) on the axial first side X1 relative to the first position (a position of the wedge member 26 illustrated in FIG. 15).

The first slide-contact surface 53 provided on the surface of the wedge member 26 on the circumferential second side Y2 is constituted by an inclined surface inclined toward the circumferential first side Y1 in the direction toward the axial first side X1. Accordingly, along with a movement of each of the wedge members 26 toward the axial first side X1, the first slide-contact surface 53 guides the connecting portion 35 toward the circumferential second side Y2 while the first slide-contact surface 53 makes slide contact with the first slid-contact surface 38 of the connecting portion 35. Further, the second slide-contact surface 54 provided on the surface of the wedge member 26 on the circumferential first side Y1 is constituted by an inclined surface inclined toward the circumferential second side Y2 in the direction toward the axial first side X1. Accordingly, along with a movement of each of the wedge members 26 toward the axial first side X1, the second slide-contact surface 54 guides the second projection 40 for the adjacent roller pair 23 toward the circumferential first side Y1 while the second slide-contact surface 54 makes slide contact with the second slid-contact surface 42 of the second projection 40. That is, along with a movement of each of the wedge members 26 toward the axial first side X1, the connecting portion 35 and the second projection 40 for the adjacent roller pair 23 are separated from each other relative to the wedge member 26 (the insertion portion 51). As a result, the inner cage 31 rotates toward the circumferential second side Y2 and the outer cage 32 rotates toward the circumferential first side Y1. At this time, the third annular portion 34 and the second annular portion 39 each slide on the back plate 70. Note that respective rotation amounts of the outer cage 32 and the inner cage 31 may be regulated by contact between the side face (regulation wall) 81, on the circumferential second side Y2, of the receptacle recessed portion 80 of the outer cage 32 and an insertion portion 51 of a corresponding wedge member 26.

Along with rotation of the inner cage 31 toward the circumferential second side Y2, each of the first abutting surfaces 37 moves toward the circumferential second side Y2, and thus, each of the first abutting surfaces 37 contacts a corresponding first roller 23a so as to press the corresponding first roller 23a toward the circumferential second side Y2. This moves each of the first rollers 23a toward the circumferential second side Y2 against an elastic pressing force from the elastic member 24. This accordingly separates each of the first rollers 23a from the first engaged position 29a (see FIG. 13), so that a gap S1 is formed between each of the first rollers 23a and the inner periphery of the outer ring 5 as illustrated in FIG. 17. Hereby, the engagement of each of the first rollers 23a with the outer periphery of the inner ring 4 and the inner periphery of the outer ring 5 is released.

Further, along with rotation of the outer cage 32 toward the circumferential first side Y1, each of the second abutting surfaces 41 moves toward the circumferential first side Y1, and thus, each of the second abutting surfaces 41 contacts a corresponding second roller 23b so as to press the corresponding second roller 23b toward the circumferential first side Y1. This moves each of the second rollers 23b toward the circumferential first side Y1 against an elastic pressing force from the elastic member 24. This accordingly separates each of the second rollers 23b from the second engaged position 29b (see FIG. 13), so that a gap S2 is formed between each of the second rollers 23b and the inner periphery of the outer ring 5 as illustrated in FIG. 17. Hereby, the engagement of each of the second rollers 23b with the outer periphery of the inner ring 4 and the inner periphery of the outer ring 5 is released.

In an ON state of the electromagnetic clutch 7, each of the rollers 23a, 23b is disengaged from the outer periphery of the inner ring 4 (the large diameter portion 12) and the inner periphery of the outer ring 5, so that the two-way clutch 6 is turned into a released state. Further, in this state, as illustrated in FIG. 19, a very small gap is provided between the engaged portion 43a of the engageable projection portion 43 provided in the inner cage 31 and the regulation wall 81 of the receptacle recessed portion 80.

In the aforementioned two-way clutch 6, the first and second slide-contact surfaces 53, 54 have a common specification, and the first and second slid-contact surfaces 38, 42 have a common specification. Accordingly, a rotation amount of the inner cage 31 and a rotation amount of the outer cage 32 along with the movement of the wedge members 26 toward the axial first side X1 are equal to each other. However, one of the inner cage 31 and the outer cage 32 may have difficulty in rotating (a situation may occur in which the one of the inner cage 31 and the outer cage 32 does not rotate or has difficulty in rotating).

Figure 20:
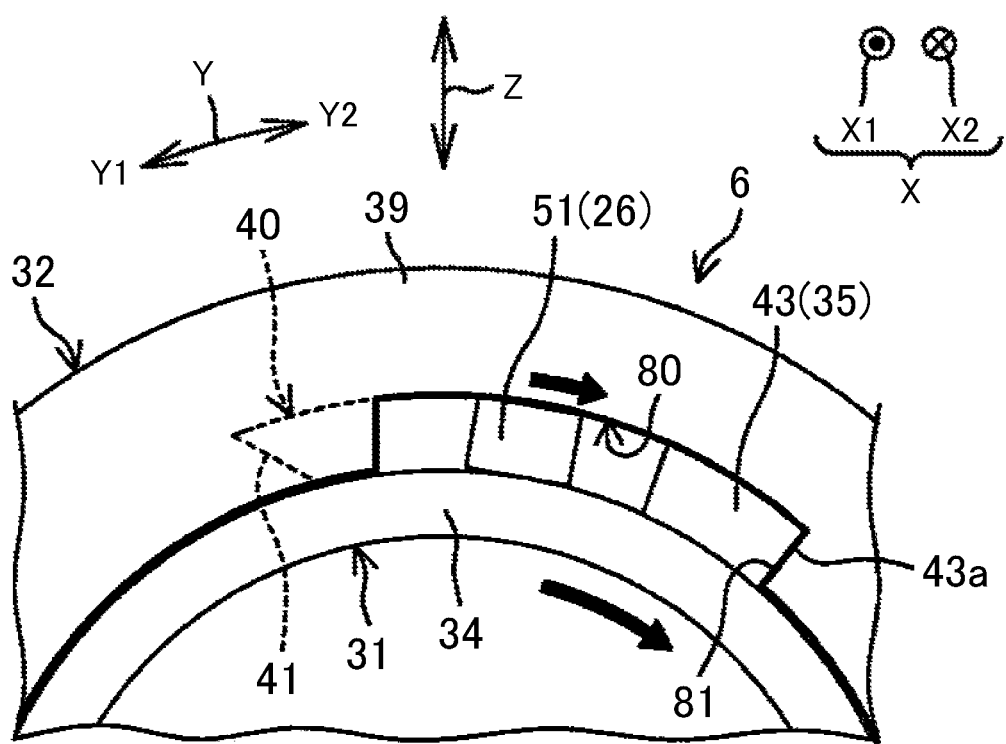
FIG. 20 is a front view illustrating a positional relationship of the wedge member with respect to the inner cage and the outer cage in a case where the outer cage has difficulty in rotating.

FIG. 20 is a front view illustrating a positional relationship of the wedge member 26 with respect to the inner cage 31 and the outer cage 32 in a case where the outer cage 32 has difficulty in rotating. FIG. 20 is a view viewed from the axial first side X1. In this case, the inner cage 31 rotates smoothly. In this case, when the wedge member 26 moves toward the axial first side X1 due to the drive of the electromagnetic clutch 7, the wedge member 26 itself moves toward the circumferential second side Y2 as illustrated in FIG. 20 due to slide contact between the second slide-contact surface 54 (see FIG. 15, etc.) and the second slid-contact surface 42 (see FIG. 15, etc.), because the outer cage 32 does not move (or has difficulty in moving). As a result, the inner cage 31 may rotate excessively toward the circumferential second side Y2 by a rotation amount more than an expected rotation amount.

In this embodiment, the engaged portion 43a of the engageable projection portion 43 provided in the inner cage 31 contacts (engages with) the regulation wall 81 of the receptacle recessed portion 80 formed on the inner periphery of the outer cage 32. This makes it possible to prevent the inner cage 31 from rotating excessively. That is, since an amount of relative rotation of the inner cage 31 and the outer cage 32 is regulated (restricted), it is possible to prevent excessive rotation of the inner cage 31 by use of this.

Further, since the excessive rotation of the outer cage 32 is prevented by the engageable projection portion 43 and the receptacle recessed portion 80 provided in the inner cage 31 and the outer cage 32, it is possible to achieve reduction of the number of components in comparison with a case where another member for preventing the excessive rotation is provided, thereby making it possible to achieve cost reduction. Further, the engageable projection portion 43 is provided on the outer periphery of the third annular portion 34 of the inner cage 31, and the receptacle recessed portion 80 is provided on the inner periphery of the second annular portion 39 of the outer cage 32. Hereby, engagement between the engageable projection portion 43 and the receptacle recessed portion 80 is realized. Thus, the engagement between the engageable projection portion 43 and the receptacle recessed portion 80 can be realized with a relatively simple configuration.

Further, since the engageable projection portion 43 is provided in the connecting portion 35, it is possible to reduce the size of the inner cage 31, in comparison with a case where the engageable projection portion 43 is provided separately from the connecting portion 35. One embodiment of the present invention has been described above, but the present invention can be carried out according to other embodiments. For example, the above embodiment deals with a case where the engageable projection portion 43 is provided in the connecting portion 35, but the engageable projection portion 43 may be provided in a part of the inner cage 31 other than the connecting portion 35. Further, the engageable projection portion 43 may be provided at a position other than the outer periphery in the inner cage 31.

Further, the receptacle recessed portion 80 may be provided at a position other than the inner periphery in the outer cage 32. Further, the engageable projection portion 43 may be provided in the outer cage 32 and the receptacle recessed portion 80 may be provided in the inner cage 31. Further, it has been described that the inner cage 31 is configured to include the first annular portion 33 and the third annular portion 34, but the third annular portion 34 may be omitted, for example. Further, a shape of the first annular portion 33 is not limited to a tonic shape and may be other annular shapes.

The following describes a third embodiment of the present invention in detail with reference to FIGS. 21 to 32. Note that a member that is the same as or equivalent to a member in the first embodiment has the same reference numeral as in the first embodiment and a redundant description thereof is omitted. FIG. 21 is a sectional view of a driving force transmission device 1 according to the third embodiment of the present invention.

Figure 22:
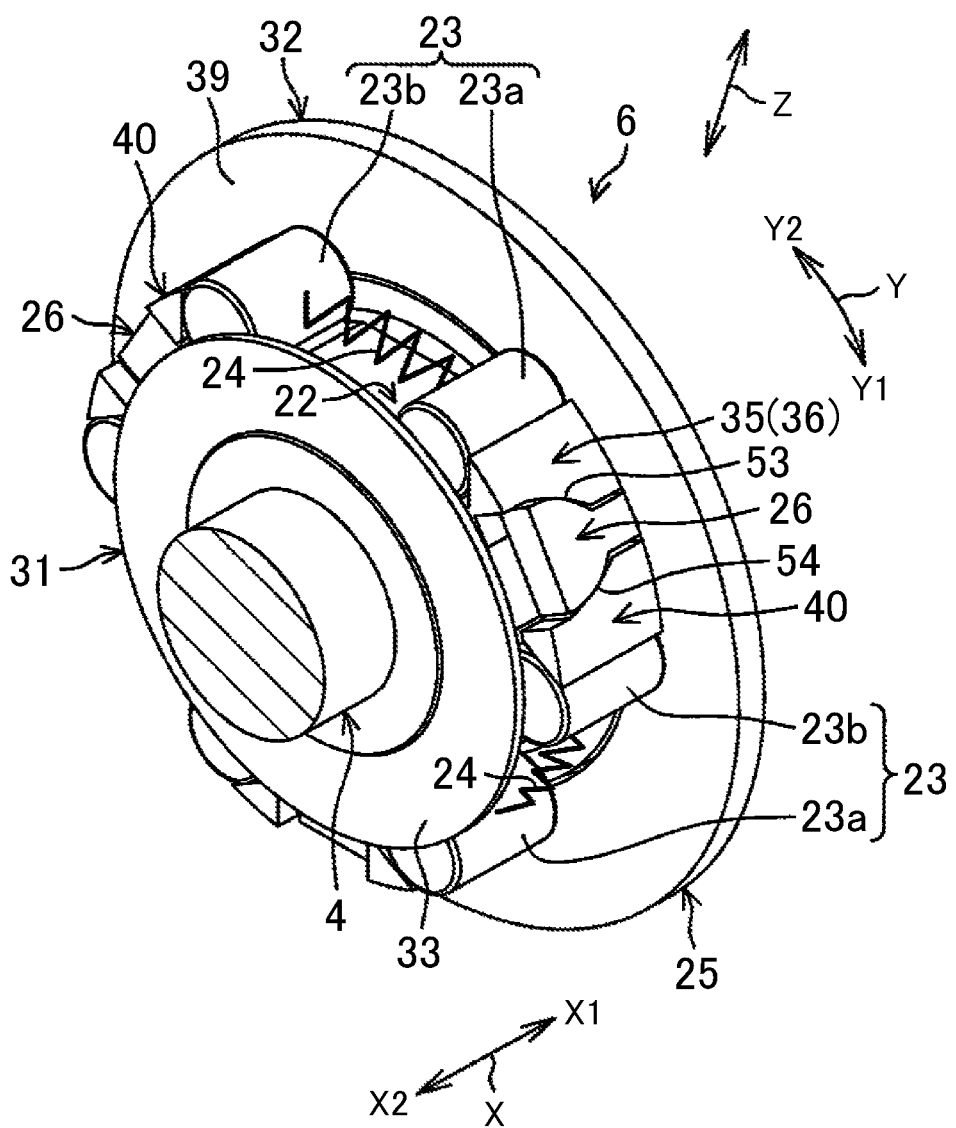
FIG. 22 is a perspective view illustrating a configuration of a two-way clutch included in the driving force transmission device according to the third embodiment.
Figure 23:
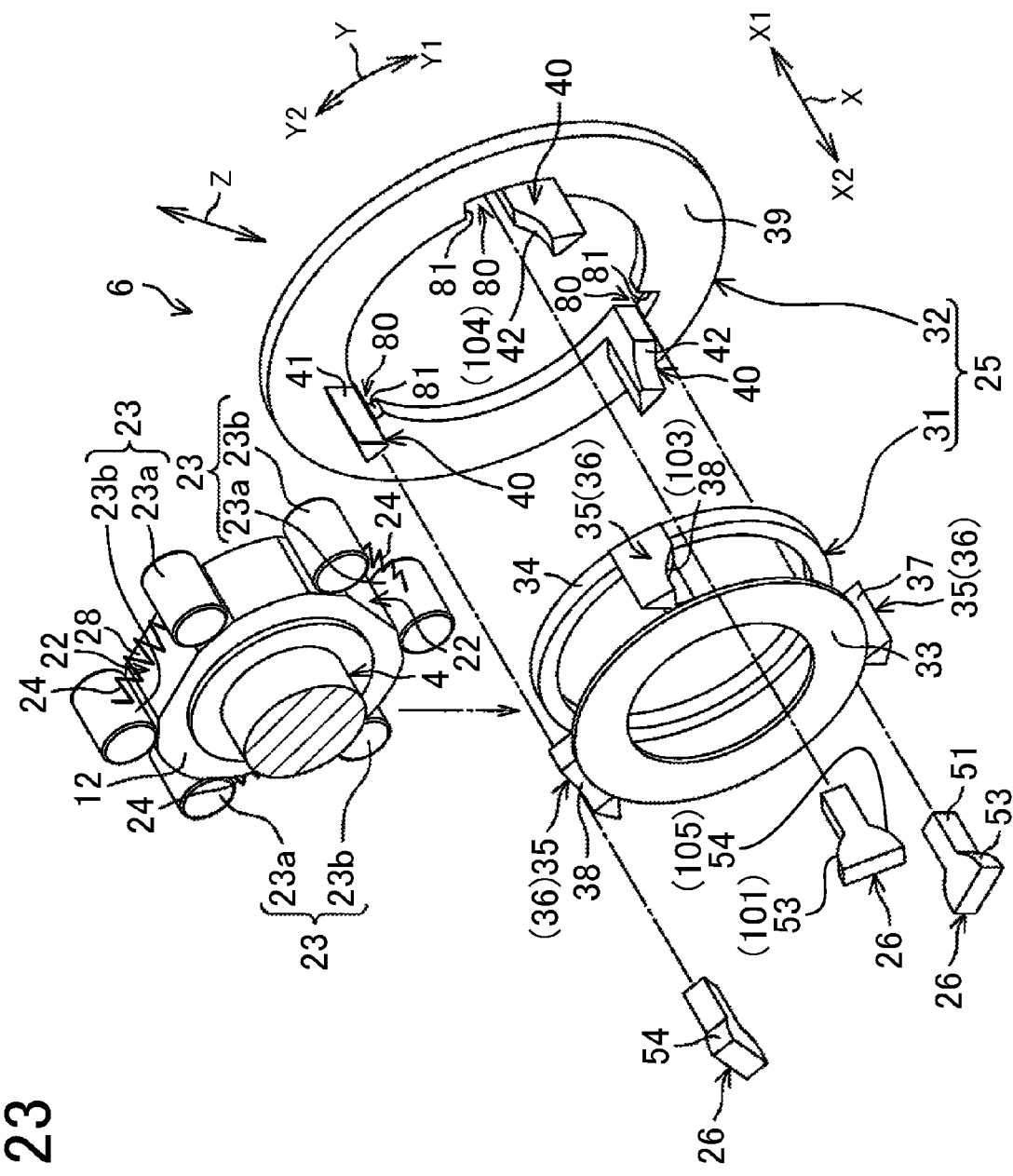
FIG. 23 is an exploded perspective view illustrating the configuration of the two-way clutch.
Figure 24:
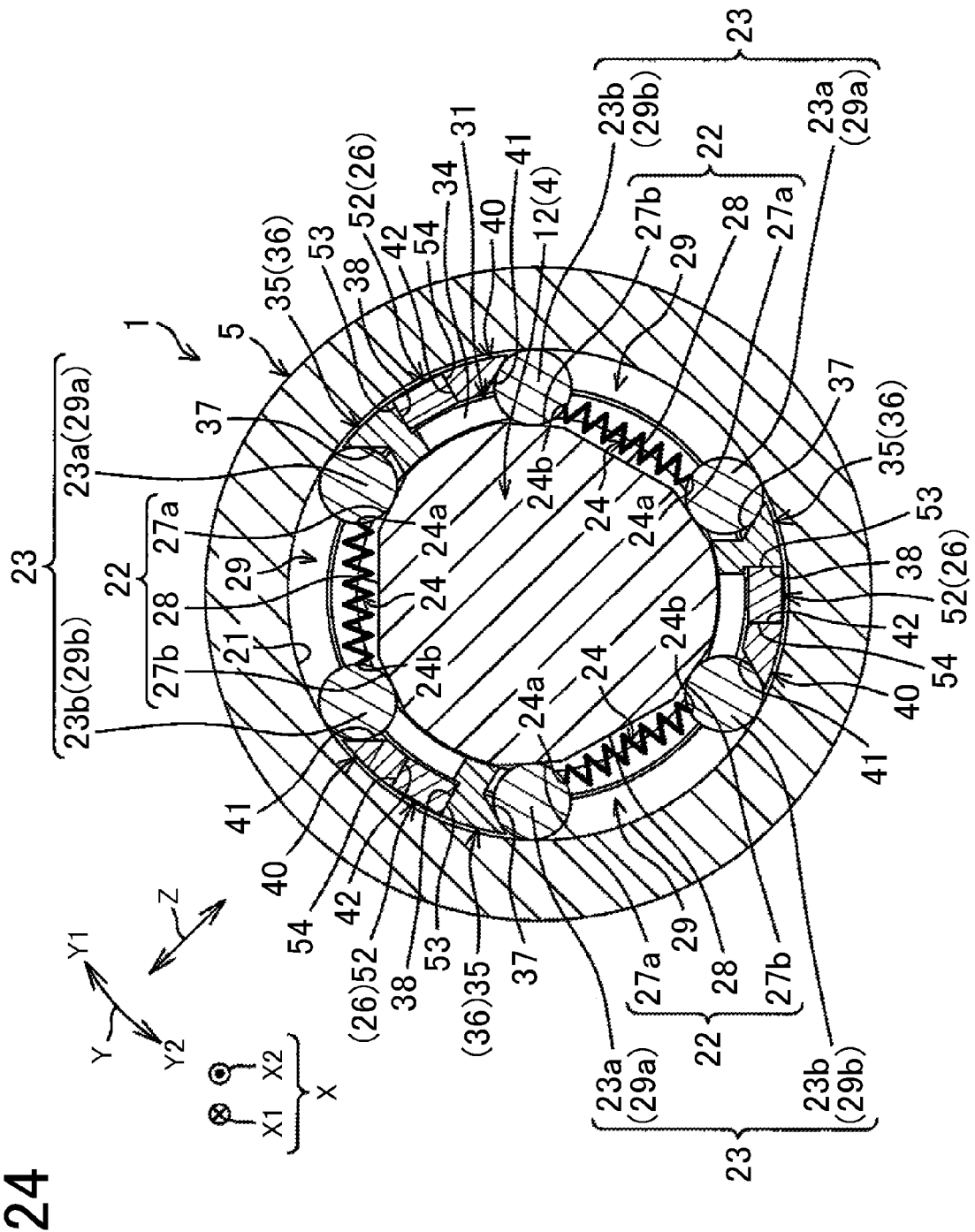
FIG. 24 is a sectional view of the configuration of the two-way clutch when viewed from a section line XXIV-XXIV in FIG. 21.

FIG. 22 is a perspective view illustrating a configuration of a two-way clutch 6. FIG. 23 is an exploded perspective view illustrating the configuration of the two-way clutch 6. Referring now to FIGS. 21 to 24, the configuration of the two-way clutch 6 is described below. In FIGS. 22 and 23, a large diameter portion 12 is mainly illustrated in an inner ring 4. Further, an outer ring 5 is not illustrated in FIGS. 22 to 24. Further, FIG. 24 illustrates a fastened state of the two-way clutch 6. FIG. 24 is a sectional view of the configuration of the two-way clutch 6 when viewed from a section line XXIV-XXIV in FIG. 21.

The two-way clutch 6 includes: a cylindrical surface 21 provided on an inner periphery of a second annular stepped portion 14 of an outer ring 5; a plurality of (e.g., three) cam surfaces 22 provided on an outer periphery of the large diameter portion 12 of the inner ring 4 so as to be arranged at regular intervals in a circumferential direction Y; a plurality of (e.g., three) roller pairs 23; a plurality of (e.g., the same number as the number of roller pairs 23) elastic members 24; a cage 25 that retains the roller pairs 23 and the elastic members 24; and a plurality of (the same number as the number of roller pairs 23) wedge members (guide members) 26 made of synthetic resin and connected to an armature 71 of an electromagnetic clutch 7 so as to be movable together with the armature 71 in an axial direction X. The cam surfaces 22 are placed at regular intervals in the circumferential direction Y on an outer periphery of the inner ring 4. Further, the plurality of cam surfaces 22 may be provided on an inner periphery of the outer ring 5 and the cylindrical surface may be provided on an outer periphery of the inner ring 4. Further, an elastic-member cage that collectively supports the plurality of elastic members 24 may be attached to the outer periphery of the inner ring 4.

On a surface of each of the connecting portions 35 on a circumferential first side Y1, a first slid-contact surface 38 (mainly see FIGS. 23 and 24) that makes slide contact with a corresponding wedge member 26 is formed. The first slid-contact surface 38 is constituted by a first recessed curved surface 103 inclined toward the circumferential first side Y1 in a direction toward the axial first side X1. A sectional shape of the first recessed curved surface 103 along the axial direction X has an arc shape or an elliptical arc shape. The first recessed curved surface 103 is curved to be recessed with a curvature smaller than that of a first projecting curved surface 101 of the after-mentioned first slide-contact surface 53 in the axial direction X. The first recessed curved surface 103 is constituted by a single recessed curved surface or a plurality of recessed curved surfaces in combination.

On an inner periphery of a second annular portion 39, receptacle recessed portions 80 each recessed outwardly in a radial direction Z are formed over the axial direction X. The same number of (e.g., three) receptacle recessed portions 80 as the number of second projections 40 are provided such that one receptacle recessed portion 80 corresponds to one second projection 40. Each of the receptacle recessed portions 80 is formed in the second annular portion 39 at a position adjacent to a circumferential second side Y2 of a corresponding second projection 40. Each of the receptacle recessed portions 80 is a recessed portion through which an insertion portion 51 of the wedge member 26 is inserted. Note that each of the receptacle recessed portions 80 may be provided so as to be elongated in the circumferential direction Y, so that a side face 81 thereof on the circumferential second side Y2 contacts an engageable projection portion (not shown) provided in the inner cage 31 so as to regulate (restrict) the amount of relative rotation of the inner cage 31 relative to the outer cage 32.

On a surface of each of the second projections 40 on the circumferential second side Y2, a second slid-contact surface 42 (mainly see FIGS. 3 and 4) that makes slide contact with a corresponding wedge member 26 is formed. The second slid-contact surface 42 includes a second recessed curved surface 104 inclined toward the circumferential second side Y2 in the direction toward the axial first side X1. A sectional shape of the second recessed curved surface 104 along the axial direction X has an arc shape or an elliptical arc shape. The second recessed curved surface 104 is curved to be recessed with a curvature smaller than that of a second projecting curved surface 105 of the after-mentioned second slide-contact surface 54 in the axial direction X. The second recessed curved surface 104 is constituted by a single recessed curved surface or a plurality of recessed curved surfaces in combination.

Figure 25A:
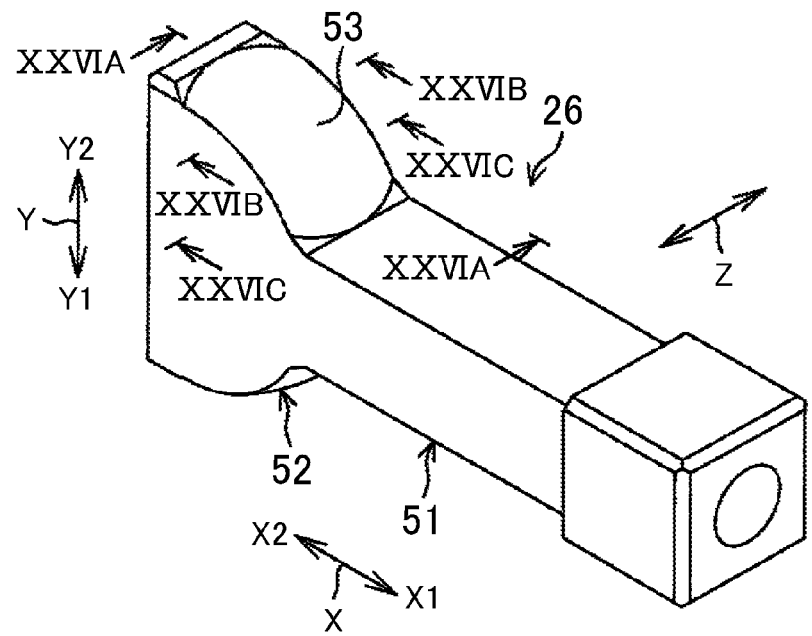
FIG. 25A is a perspective view illustrating a configuration of a wedge member.
Figure 25B:
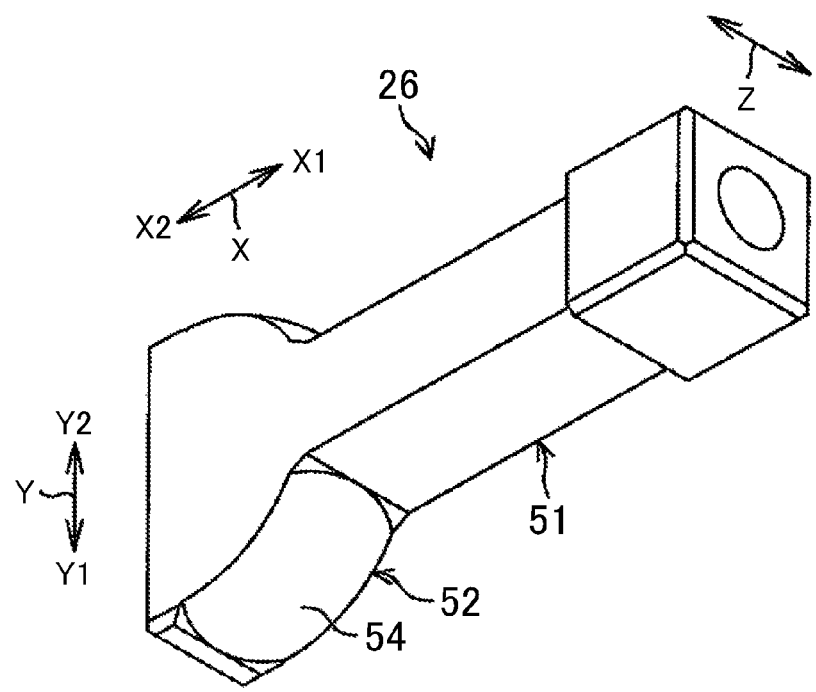
FIG. 25B is a perspective view illustrating the configuration of the wedge member.

One corresponding wedge member 26 is inserted between each of the connecting portions 35 and a second projection 40 for the adjacent roller pair 23. FIGS. 25A, 25B are perspective views each illustrating a configuration of the wedge member 26. In FIGS. 25A and 25B, the wedge member 26 is viewed from two different directions. Each of the wedge members 26 includes: an insertion portion 51 inserted between the connecting portion 35 (see FIG. 22, etc.) and the second projection 40 (see FIG. 22, etc.) for the adjacent roller pair 23; and a wedge portion 52 that expands toward both sides in the circumferential direction Y from the other end of the insertion portion 51 in the axial direction X. The insertion portion 51 extends in a stick shape along the axial direction X and a section orthogonal to its axis has a rectangular shape. The wedge portion 52 includes a first slide-contact surface 53 provided on a surface thereof on the circumferential second side Y2, and a second slide-contact surface 54 provided on a surface thereof on the circumferential first side Y1.

Figure 26A:
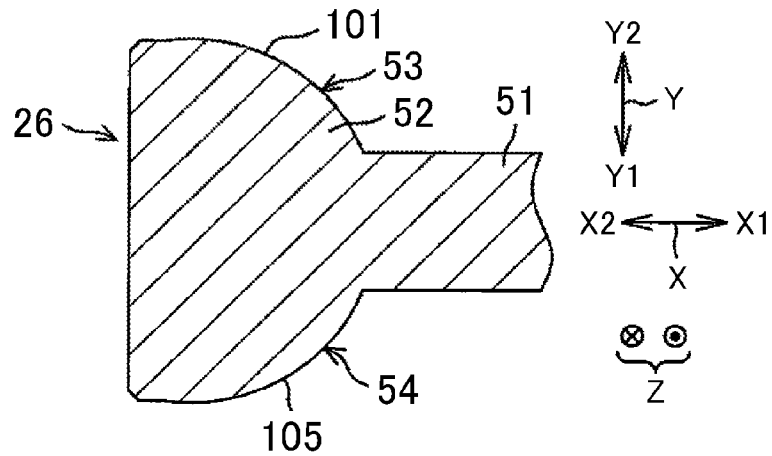
FIG. 26A is a sectional view of the wedge member when viewed from a section line XXVIA-XXVIA in FIG. 25A.
Figure 26B:
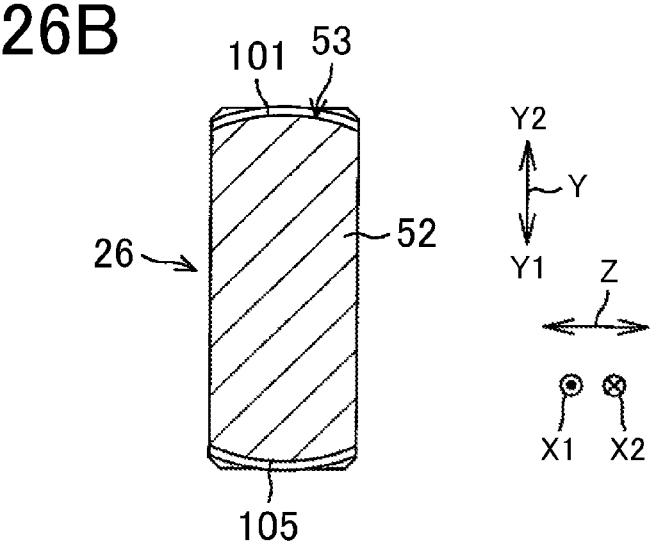
FIG. 26B is a sectional view of the wedge member when viewed from a section line XXVIB-XXVIB in FIG. 25A.
Figure 26C:
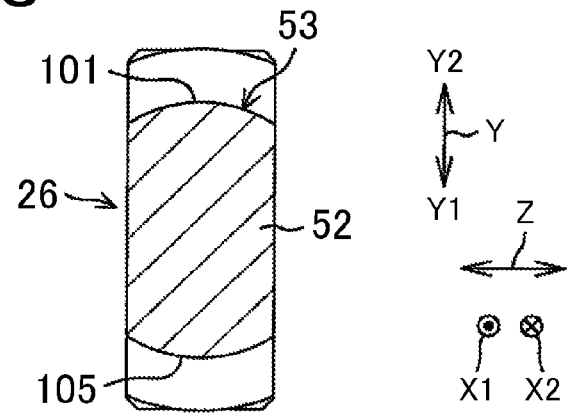
FIG. 26C is a sectional view of the wedge member when viewed from a section line XXVIC-XXVIC in FIG. 25A.

FIG. 26A is a sectional view of the wedge member 26 when viewed from a section line XXVIA-XXVIA in FIG. 25A. FIG. 26B is a sectional view of the wedge member 26 when viewed from a section line XXVIB-XXVIB in FIG. 25A. FIG. 26C is a sectional view of the wedge member 26 when viewed from a section line XXVIC-XXVIC in FIG. 25A. The first slide-contact surface 53 is constituted by a spherical or generally spherical first projecting curved surface 101 (a first curved portion and a second curved portion). In other words, a sectional shape of the first projecting curved surface 101 along the axial direction X is curved to protrude, and is directed toward the circumferential first side Y1 in the direction toward the axial first side X1. Further, a sectional shape of the first projecting curved surface 101 along the radial direction Z is curved to protrude toward the circumferential second side Y2 in directions toward a central part in the radial direction Z from both ends in the radial direction Z. As illustrated in FIGS. 30A and 30B described later, a curvature radius of the first projecting curved surface 101 along the axial direction X is decreased toward the axial first side X1 ($R_{1A} > R_{1B}$). That is, a curvature of the first projecting curved surface 101 in the axial direction X is increased toward the axial first side X1.

The second slide-contact surface 54 is constituted by a spherical or generally spherical second projecting curved surface 105 (a first curved portion and a second curved portion). In other words, a sectional shape of the second projecting curved surface 105 along the axial direction X is curved to protrude, and is directed toward the circumferential second side Y2 in the direction toward the axial first side X1. Further, a sectional shape of the second projecting curved surface 105 along the radial direction Z is curved to protrude toward the circumferential first side Y1 in directions toward a central part in the radial direction Z from both ends in the radial direction Z. As illustrated in FIGS. 30A and 30B described later, a curvature radius of the second projecting curved surface 105 along the axial direction X is decreased toward the axial first side X1 ($R_{2A} > R_{2B}$). That is, a curvature of the second projecting curved surface 105 in the axial direction X is increased toward the axial first side X1.

Figure 27:
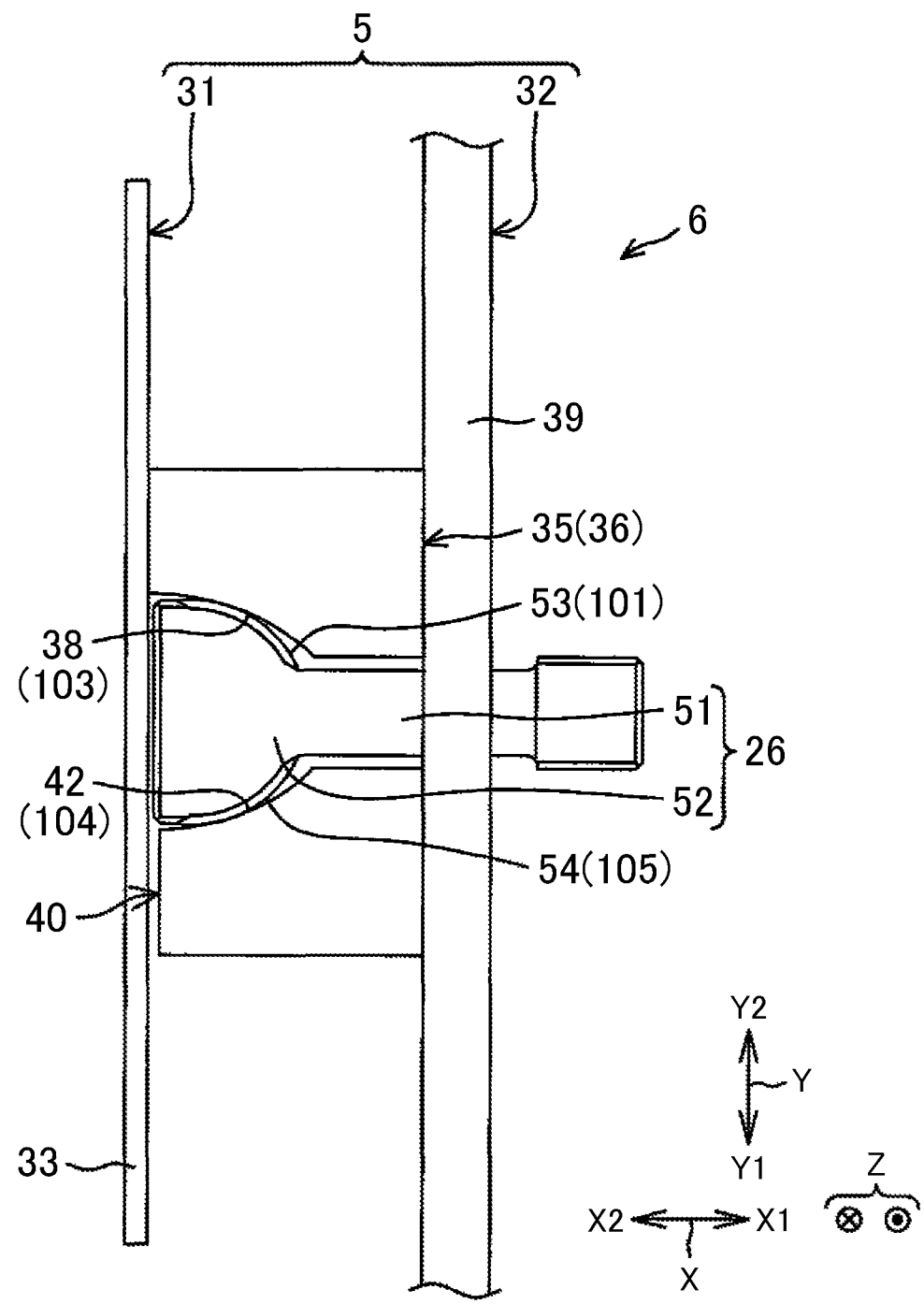
FIG. 27 is a side view illustrating a positional relationship of the wedge member with respect to inner and outer cages in a fastened state of the two-way clutch.
Figure 28:
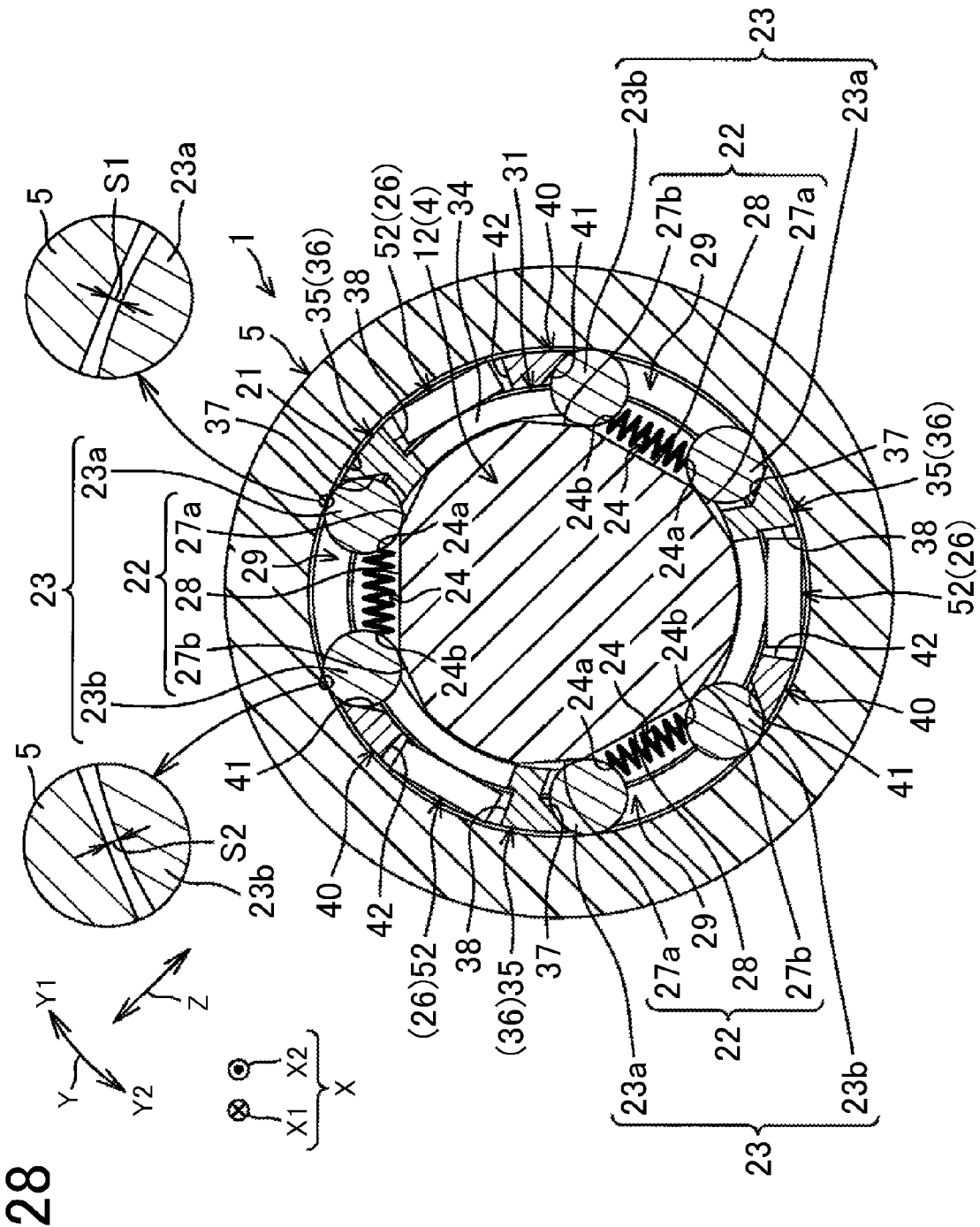
FIG. 28 is a sectional view illustrating the configuration of the two-way clutch in a released state of the two-way clutch.
Figure 29:
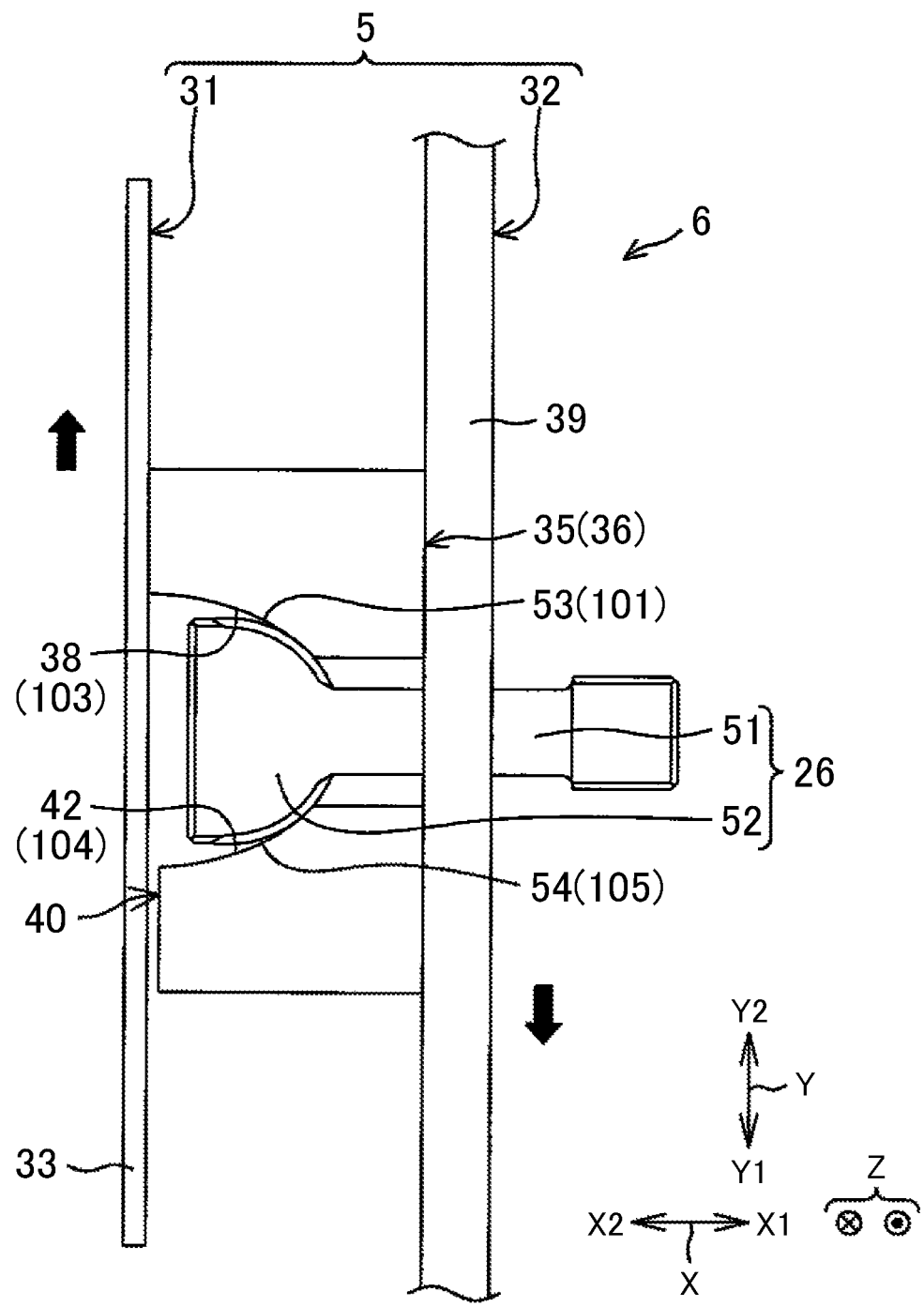
FIG. 29 is a side view illustrating a positional relationship of the wedge member with respect to the inner and outer cages in a released state of the two-way clutch.

FIG. 27 is a side view illustrating a positional relationship of the wedge member 26 with respect to the inner cage 31 and the outer cage 32 in a fastened state of the two-way clutch 6. FIG. 28 is a sectional view illustrating the configuration of the two-way clutch 6 in a released state of the two-way clutch 6, when viewed from a section line XXIV-XXIV in FIG. 21, similarly to FIG. 24. FIG. 29 is a side view illustrating a positional relationship of the wedge member 26 with respect to the inner cage 31 and the outer cage 32 in a released state of the two-way clutch 6. FIGS. 30A and 30B are schematic views illustrating a change of a first contact angle θ1 and a second contact angle θ2 along with drawing of the wedge member 26 by the electromagnetic clutch 7.

As illustrated in FIGS. 24 and 27, in an OFF state of the electromagnetic clutch 7, the two-way clutch 6 is in a fastened state and the armature 71 is not attracted by the electromagnet 73. Accordingly, the armature 71 is placed at an initial position, and the wedge member 26 provided in the armature 71 in a movable manner in the axial direction X is placed at a first position (an initial position; a position of the wedge member 26 illustrated in FIG. 27).

The following description is made on the premise that a contact angle at a contact point PC1 (see FIG. 30A) between the first slide-contact surface 53 (the first projecting curved surface 101) and the first slid-contact surface 38 (that is, an acute angle inclination, at the contact point PC1, formed between the axial direction X and a tangent line of the first slide-contact surface 53 along the axial direction X) is a first contact angle θ1, and a contact angle at a contact point PC2 (see FIG. 30B) between the second slide-contact surface 54 (the second projecting curved surface 105) and the second slid-contact surface 42 (that is, an acute angle inclination, at the contact point PC2, formed between the axial direction X and a tangent line of the second slide-contact surface 54 along the axial direction X) is a second contact angle θ2.

In a state where the wedge member 26 is placed at the first position, respective magnitudes of the first contact angle θ1 and the second contact angle θ2 are relatively small, as illustrated in FIG. 30A. In this state, as illustrated in FIG. 24, each first roller 23a is elastically pressed by an elastic member 24 toward a first engaged position 29a provided in an end portion of a wedge space 29 on the circumferential first side Y1. When the first roller 23a is placed at the first engaged position 29a, the first roller 23a engages with the outer periphery of the inner ring 4 (the large diameter portion 12) and the inner periphery of the outer ring 5 (the second annular stepped portion 14). Further, in this state, each second roller 23b is elastically pressed by the elastic member 24 toward a second engaged position 29b provided in an end portion of the wedge space 29 on the circumferential second side Y2. When the second roller 23b is placed at the second engaged position 29b, the second roller 23b engages with the outer periphery of the inner ring 4 (the large diameter portion 12) and the inner periphery of the outer ring 5 (the second annular stepped portion 14). Thus, in an OFF state of the electromagnetic clutch 7, the first and second rollers 23a, 23b engage with the outer periphery of the inner ring 4 and the inner periphery of the outer ring 5, so that the two-way clutch 6 is in a fastened state.

In the meantime, when the electromagnetic clutch 7 is turned into an ON state, the armature 71 is attracted by the electromagnetic clutch 7 as illustrated in FIG. 29, so that the plurality of wedge members 26 connected to the armature 71 is drawn toward the axial first side X1 (the plurality of wedge members 26 moves in the axial direction X). Due to the drawing, the wedge member 26 is placed at the second position (a drawing position; a position of the wedge member 26 illustrated in FIG. 29) on the axial first side X1 relative to the first position (a position of the wedge member 26 illustrated in FIG. 27).

The first slide-contact surface 53 provided on the surface of the wedge member 26 on the circumferential second side Y2 is constituted by a surface directed toward the circumferential first side Y1 in the direction toward the axial first side X1. Accordingly, along with a movement of each of the wedge members 26 toward the axial first side X1, the first slide-contact surface 53 guides the connecting portion 35 toward the circumferential second side Y2 while the first slide-contact surface 53 makes slide contact with the first slid-contact surface 38 of the connecting portion 35. Further, the second slide-contact surface 54 provided on the surface of the wedge member 26 on the circumferential first side Y1 is constituted by a surface directed toward the circumferential second side Y2 in the direction toward the axial first side X1. Accordingly, along with a movement of each of the wedge members 26 toward the axial first side X1, the second slide-contact surface 54 guides the second projection 40 toward the circumferential first side Y1 while the second slide-contact surface 54 makes slide contact with the second slid-contact surface 42 of the second projection 40 for the adjacent roller pair 23.

That is, along with a movement of each of the wedge members 26 toward the axial first side X1, the connecting portion 35 and the second projection 40 for the adjacent roller pair 23 are separated from each other relative to the wedge member 26 (the insertion portion 51). As a result, the inner cage 31 rotates toward the circumferential second side Y2 and the outer cage 32 rotates toward the circumferential first side Y1. Along with the rotation of the inner cage 31 and the outer cage 32, a third annular portion 34 of the inner cage 31 and the second annular portion 39 of the outer cage 32 each make slide contact with a back plate 70.

As illustrated in FIGS. 30A and 30B, a curvature radius of the first projecting curved surface 101 along the axial direction X is continuously decreased toward the axial first side X1 ($R_{1A} > R_{1B}$). That is, a curvature of the first projecting curved surface 101 in the axial direction X is continuously increased toward the axial first side X1. In addition, the first recessed curved surface 103 is curved to be recessed with a curvature smaller than that of the first projecting curved surface 101 in the axial direction X. Accordingly, along with the movement of the wedge member 26 toward the axial first side X1, a magnitude of the first contact angle θ1 is continuously increased.

Further, as illustrated in FIGS. 30A and 30B, a curvature radius of the second projecting curved surface 105 along the axial direction X is continuously decreased toward the axial first side X1 ($R_{2A} > R_{2B}$). That is, a curvature of the second projecting curved surface 105 in the axial direction X is continuously increased toward the axial first side X1. In addition, the second recessed curved surface 104 is curved to be recessed with a curvature smaller than that of the second projecting curved surface 105 in the axial direction X. Accordingly, along with the movement of the wedge member 26 toward the axial first side X1, a magnitude of the second contact angle θ2 is continuously increased. In other words, along with the movement of the wedge member 26 toward the axial first side X1, respective magnitudes of the first and second contact angles θ1, θ2 are continuously increased. In a state where the wedge member 26 is placed at the second position (a state illustrated in FIG. 30B), the first contact angle θ1 and the second contact angle θ2 are increased as compared with a state where the wedge member 26 is placed at the first position (a state illustrated in FIG. 30A).

Along with rotation of the inner cage 31 toward the circumferential second side Y2, each first abutting surface 37 moves toward the circumferential second side Y2, and thus, each first abutting surface 37 contacts a corresponding first roller 23a so as to press the corresponding first roller 23a toward the circumferential second side Y2. This moves each first roller 23a toward the circumferential second side Y2 against an elastic pressing force from the elastic member 24. This accordingly separates each first roller 23a from the first engaged position 29a (see FIG. 24), so that a gap S1 is formed between each first roller 23a and the inner periphery of the outer ring 5 as illustrated in FIG. 28. As a result, the engagement of each first roller 23a with the outer periphery of the inner ring 4 and the inner periphery of the outer ring 5 is released.

Further, along with rotation of the outer cage 32 toward the circumferential first side Y1, each second abutting surface 41 moves toward the circumferential first side Y1, and thus, each second abutting surface 41 contacts a corresponding second roller 23b so as to press the corresponding second roller 23b toward the circumferential first side Y1. This moves each second roller 23b toward the circumferential first side Y1 against an elastic pressing force from the elastic member 24. This accordingly separates each second roller 23b from the second engaged position 29b (see FIG. 24), so that a gap S2 is formed between each second roller 23b and the inner periphery of the outer ring 5 as illustrated in FIG. 28. As a result, the engagement of each second roller 23b with the outer periphery of the inner ring 4 and the inner periphery of the outer ring 5 is released.

Figure 31:
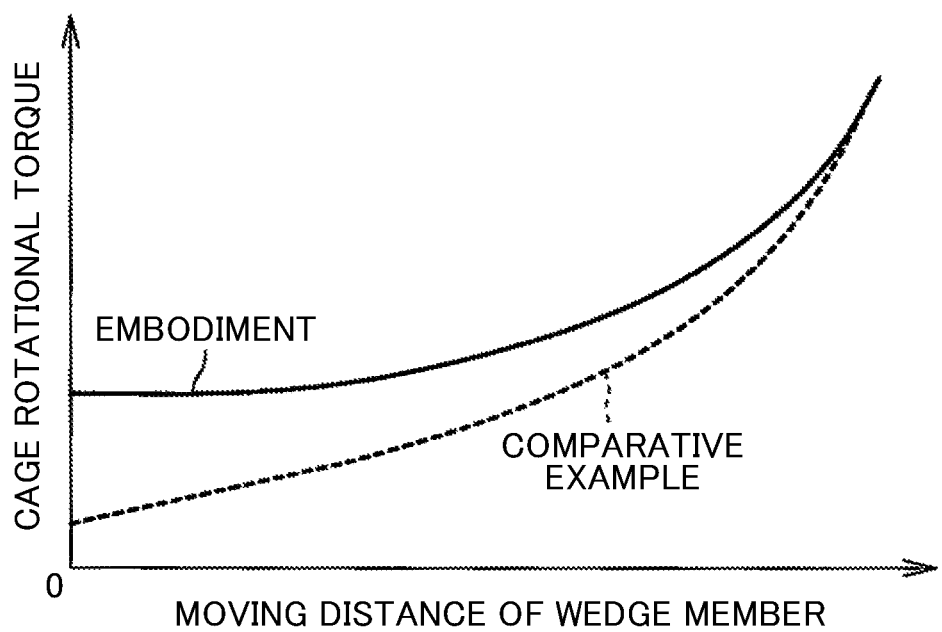
FIG. 31 is a graph illustrating a relationship between a moving distance of the wedge member from a first position and a running torque applied to the inner and outer cages.

Thus, in an ON state of the electromagnetic clutch 7, each of the rollers 23a, 23b is disengaged from the outer periphery of the inner ring 4 (the large diameter portion 12) and the inner periphery of the outer ring 5, so that the two-way clutch 6 is turned into a released state. FIG. 31 is a graph illustrating a relationship between a moving distance of the wedge member 26 from the first position and a running torque (a cage running torque) applied to the inner cage 31 and the outer cage 32. In FIG. 31, "EMBODIMENT" indicates the driving force transmission device 1 according to the present embodiment, and "COMPARATIVE EXAMPLE" indicates a driving force transmission device equivalent to the driving force transmission device 1. The driving force transmission device in the comparative example is configured such that first and second slide-contact surfaces 53, 54 are each constituted by a flat inclined surface and first and second slid-contact surfaces 38, 42 are each constituted by a flat inclined surface that fits thereto. From the graph of FIG. 31, it is found that, in the comparative example, a running torque applied to an inner cage 31 and an outer cage 32 is extremely small in a state (i.e., an initial stage of drawing) where a moving distance of a wedge member 26 is short. In contrast, it is found that, in the present embodiment, even in a state (i.e., an initial stage of drawing) where a moving distance of the wedge member 26 is short, a drop in a running torque applied to the inner cage 31 and the outer cage 32 can be suppressed.

As described above, according to this embodiment, at the time of an initial stage of the drawing of the wedge member 26 by the electromagnetic clutch 7, the first contact angle θ1 and the second contact angle θ2 are both small. As the wedge member 26 is drawn toward the axial first side X1, the first contact angle θ1 and the second contact angle θ2 are increased. In a state where the first contact angle θ1 and the second contact angle θ2 are both small, a ratio of a torque component force in the circumferential direction Y is high. Meanwhile, in a state where the first contact angle θ1 and the second contact angle θ2 are both large, the ratio of the torque component force in the circumferential direction Y is low. Since the ratio of the torque component force in the circumferential direction Y can be increased at an initial stage of the drawing of the wedge member 26 at which a drawing force of the electromagnetic clutch 7 is small, it is possible to maintain a high running torque applied to the inner cage 31 and the outer cage 32 at the initial stage of the drawing by the electromagnetic clutch 7. Accordingly, it is possible to successfully change the two-way clutch 6 from a fastened state to a disconnection state, thereby making it possible to successfully switch between transmission and disconnection of a running torque in the driving force transmission device 1.

Further, a sectional shape of the first slide-contact surface 53 along the axial direction X is curved to protrude and is directed toward the circumferential first side Y1 in the direction toward the axial first side X1. Further, a sectional shape of the second slide-contact surface 54 along the axial direction X is curved to protrude, and is directed toward the circumferential second side Y2 in the direction toward the axial first side X1. Accordingly, as the wedge member 26 moves toward the axial first side X1, the first contact angle θ1 and the second contact angle θ2 are increased. Accordingly, a structure in which the first contact angle θ1 and the second contact angle θ2 are increased as the wedge member 26 moves toward the axial first side X1 can be realized with a simple configuration.

Further, a sectional shape of the first slide-contact surface 53 along the radial direction Z is curved to protrude toward the circumferential second side Y2 in the directions toward a central part in the radial direction Z from both ends in the radial direction Z. Further, a sectional shape of the second slide-contact surface 54 along the radial direction Z is curved to protrude toward the circumferential first side Y1 in the directions toward a central part in the radial direction Z from both ends in the radial direction Z. In a case where the wedge member 26 has an inclined posture in the circumferential direction Y, the first slide-contact surface 53 and the second slide-contact surface 54 may be inclined in the circumferential direction Y. However, even in this case, since the first slide-contact surface 53 and the second slide-contact surface 54 include the projecting curved surfaces 101, 105, it is possible to prevent the first slide-contact surface 53 and the second slide-contact surface 54 from making uneven contact (point contact) with the first slid-contact surface 38 and the second slid-contact surface 42, respectively.

Further, the first slid-contact surface 38 is constituted by the recessed curved surface 103 having a curvature smaller than that of the first projecting curved surface 101, and the second slid-contact surface 42 is constituted by the recessed curved surface 104 having a curvature smaller than that of the second projecting curved surface 105. On that account, a movement of the wedge member 26 in the axial direction X relative to the inner cage 31 and the outer cage 32 can be performed smoothly.

Figure 32:
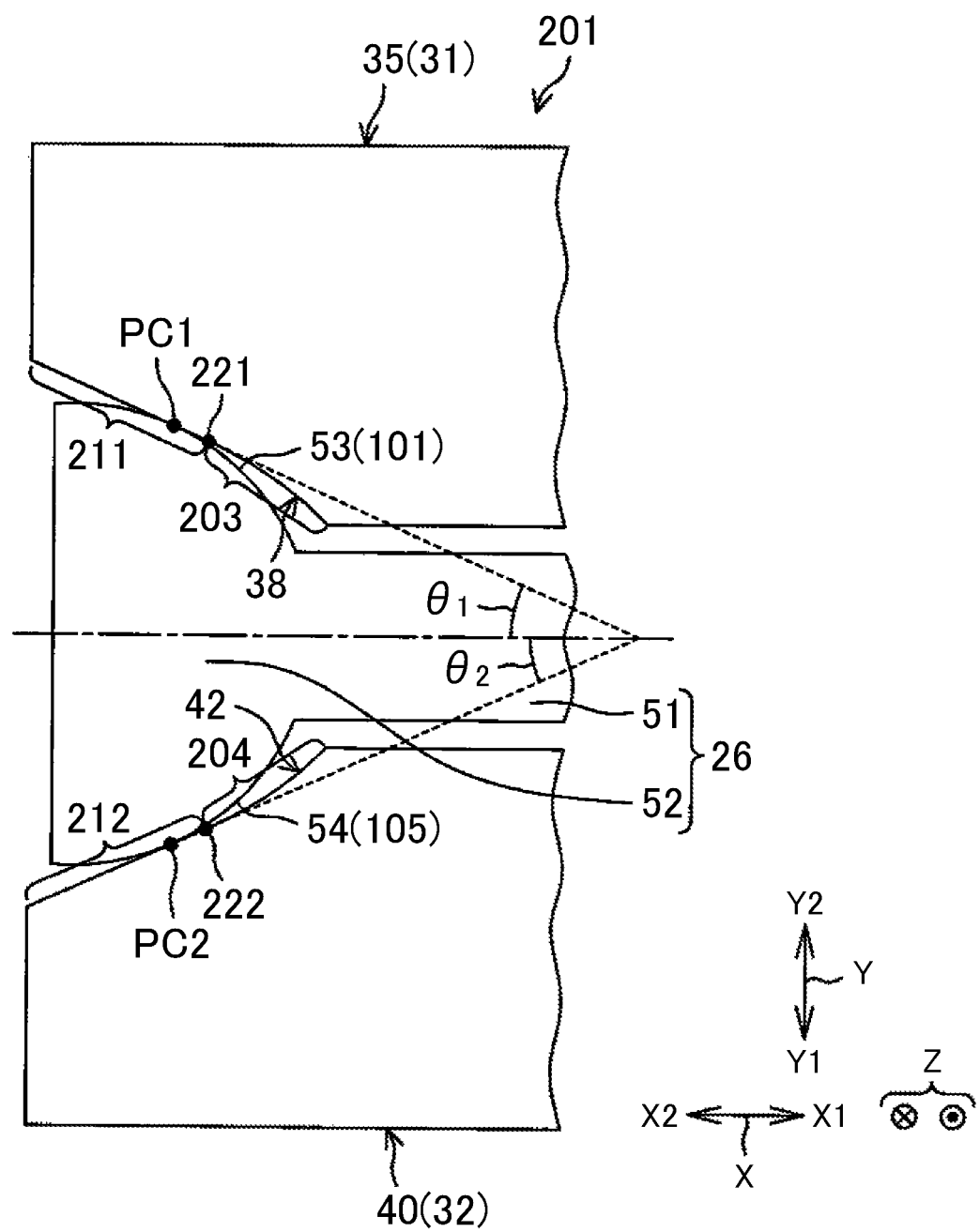
FIG. 32 is a schematic view illustrating a positional relationship of a wedge member with respect to inner and outer cages in a driving force transmission device according to a fourth embodiment of the present invention.

FIG. 32 is a schematic view illustrating a positional relationship of a wedge member 26 with respect to an inner cage 31 and an outer cage 32 in a driving force transmission device 201 according to a fourth embodiment of the present invention. The driving force transmission device 201 according to this another embodiment of the present invention is different from the driving force transmission device 1 according to the aforementioned embodiment in that: a first slid-contact surface 38 is constituted by a third recessed curved surface 203 and a first inclined surface 211 having a flat shape; and a second slid-contact surface 42 is constituted by a fourth recessed curved surface 204 and a second inclined surface 212 having a flat shape. In the driving force transmission device 201, a wedge member 26 that is the same as or similar to the wedge member in the above embodiment is employed as a guide member. In FIG. 32, a portion corresponding to each portion illustrated in the above embodiment has the same reference numeral as in the case of FIGS. 21 to 31, and a description thereof is omitted. FIG. 32 illustrates a state where the wedge member 26 is placed at a first position (an initial position).

The third recessed curved surface 203 is curved to be recessed, and is directed toward a circumferential first side Y1 in a direction toward an axial first side X1. The third recessed curved surface 203 is curved to be recessed with a curvature smaller than that of a first projecting curved surface 101 in an axial direction X. A sectional shape of the third recessed curved surface 203 along the axial direction X has an arc shape or an elliptical arc shape. The third recessed curved surface 203 is constituted by a single recessed curved surface or a plurality of recessed curved surfaces in combination. The first inclined surface 211 is continuous with an end portion of the third recessed curved surface 203 on an axial second side X2 (in other words, the first inclined surface 211 is continuous with an axial second side X2 of the third recessed curved surface 203). Further, when a boundary portion between the first inclined surface 211 and the third recessed curved surface 203 is a boundary portion 221, respective angle inclinations at respective positions of the first inclined surface 211 and the third recessed curved surface 203 are continuous with each other via the boundary portion 221 in the axial direction X.

The fourth recessed curved surface 204 is curved to be recessed, and is directed toward a circumferential second side Y2 in the direction toward the axial first side X1. The fourth recessed curved surface 204 is curved to be recessed with a curvature smaller than that of a second projecting curved surface 105 in the axial direction X. A sectional shape of the fourth recessed curved surface 204 along the axial direction X has an arc shape or an elliptical arc shape. The fourth recessed curved surface 204 is constituted by a single recessed curved surface or a plurality of recessed curved surfaces in combination. The second inclined surface 212 is continuous with an end portion of the fourth recessed curved surface 204 on the axial second side X2 (in other words, the second inclined surface 212 is continuous with an axial second side X2 of the fourth recessed curved surface 204). Further, when a boundary portion between the second inclined surface 212 and the fourth recessed curved surface 204 is a boundary portion 222, respective angle inclinations at respective positions of the second inclined surface 212 and the fourth recessed curved surface 204 are continuous with each other via the boundary portion 222 in the axial direction X.

As illustrated in FIG. 32, the first and second inclined surfaces 211, 212 are provided so that a first slide-contact surface 53 (the first projecting curved surface 101) makes contact with the first inclined surface 211 in the first slid-contact surface 38, and a second slide-contact surface 54 (the second projecting curved surface 105) makes contact with the second inclined surface 212 in the second slid-contact surface 42, in a state where the wedge member 26 is placed at a first position (a position illustrated in FIG. 32).

When an electromagnetic clutch 7 is turned on, the wedge member 26 is drawn toward the axial first side X1. For a given period from drawing start (at an initial stage of drawing), the first slide-contact surface 53 makes contact with the first inclined surface 211 in the first slid-contact surface 38, and the second slide-contact surface 54 makes contact with the second inclined surface 212 in the second slid-contact surface 42. When the wedge member 26 is further drawn, the first slide-contact surface 53 makes contact with the third recessed curved surface 203 in the first slid-contact surface 38, and the second slide-contact surface 54 makes contact with the fourth recessed curved surface 204 in the second slid-contact surface 42. As a drawing amount of the wedge member 26 is increased, a first contact angle θ1 and a second contact angle θ2 are both increased.

As described above, according to the embodiment illustrated in FIG. 32, the same effect as that in the embodiment illustrated in FIGS. 21 to 31 can be obtained. Further, due to a dimensional tolerance of the wedge member 26, the first position (see FIGS. 27 and 32) of the wedge member 26 may vary depending on each product. In this case, if each of the first and second slid-contact surfaces 38, 42 is formed of only a recessed curved surface, variations of magnitudes of the contact angles θ1, θ2 may become significant at the initial stage of drawing. As a result, a running torque applied to the inner and outer cages 31, 32 may vary.

In this regard, in the embodiment illustrated in FIG. 32, in a state where the wedge member 26 is placed at the first position (see FIG. 32), the first slide-contact surface 53 makes contact with the first inclined surface 211 in the first slid-contact surface 38 and the second slide-contact surface 54 makes contact with the second inclined surface 212 in the second slid-contact surface 42, regardless of a dimensional tolerance of the wedge member 26. When the first slide-contact surface 53 makes contact with the first inclined surface 211 constituted by a flat surface, the magnitude of the first contact angle θ1 hardly changes along with the movement of the wedge member 26 in the axial direction X. Further, when the second slide-contact surface 54 makes contact with the second inclined surface 212 constituted by a flat surface, the magnitude of the second contact angle θ2 hardly changes along with the movement of the wedge member 26 in the axial direction X. Accordingly, it is possible to suppress variations of magnitudes of the contact angles θ1, θ2 at the initial stage of drawing regardless of dimensional tolerance of the wedge member 26.

The third and fourth embodiments of the present invention have been described above, but the present invention can be carried out according to other embodiments. For example, each of the above embodiments deals with a case where the sectional shapes, along the radial direction Z, of the first and second projecting curved surfaces 101, 105 of the wedge member 26 are curved to protrude, but the sectional shapes, along the radial direction Z, of the first and second projecting curved surfaces 101, 105 may be straight.

Further, each of the above embodiments deals with a case where the first and second slide-contact surfaces 53, 54 are constituted by the projecting curved surfaces 101, 105, respectively, but one of the first and second slide-contact surfaces 53, 54 may be constituted by a flat inclined surface. In this case, the slid-contact surface 38 or 42 corresponding to the slide-contact surface having a flat inclined surface has an inclined surface that fits the slide-contact surface.

Figure 33:
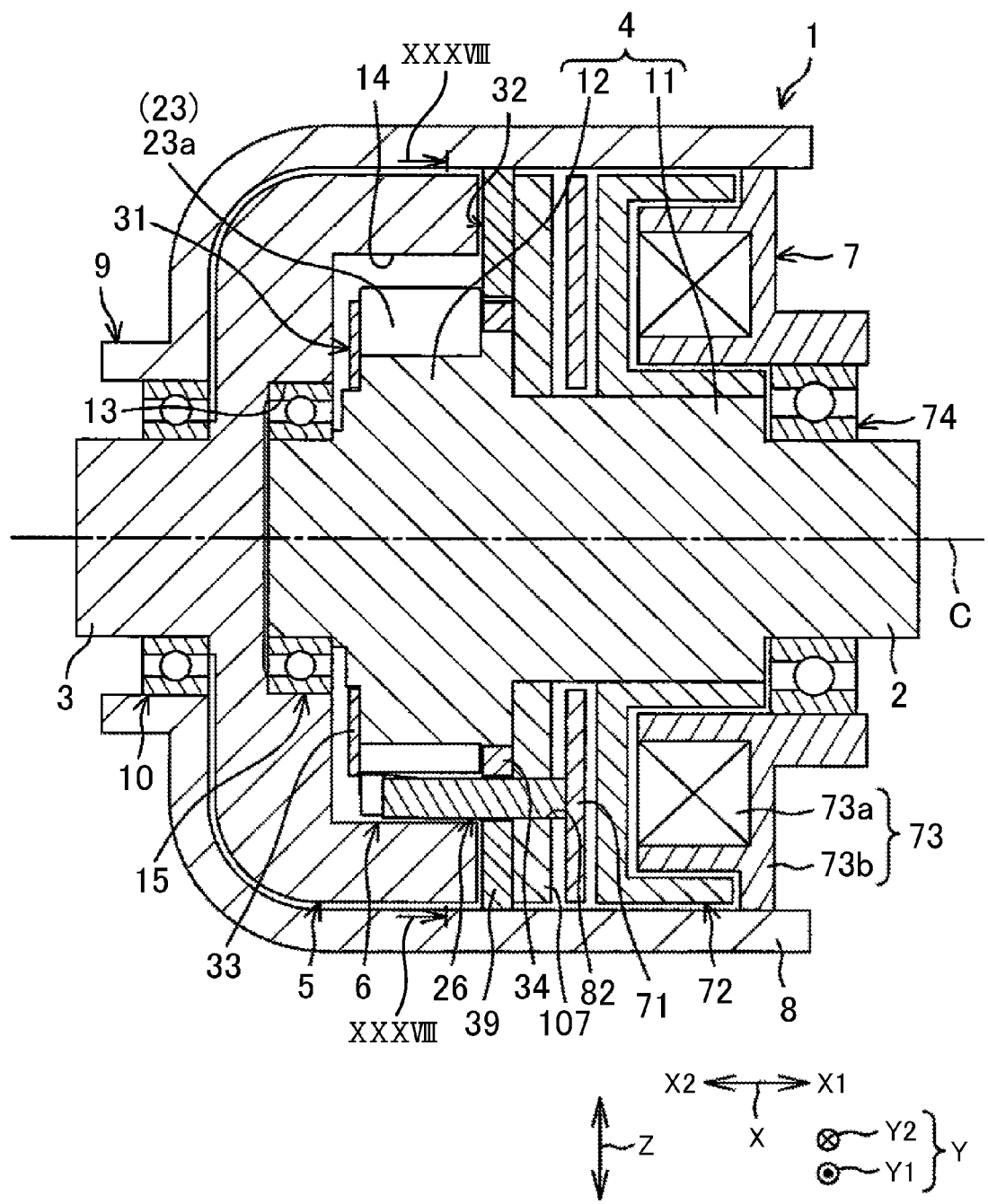
FIG. 33 is a sectional view of a driving force transmission device according to a fifth embodiment of the present invention.

The following describes a fifth embodiment of the present invention in detail with reference to FIGS. 33 to 45. Note that a member that is the same as or equivalent to a member in the first embodiment has the same reference numeral as in the first embodiment and a redundant description thereof is omitted. FIG. 33 is a sectional view of a driving force transmission device 1 according to the fifth embodiment of the present invention.

Figure 34:
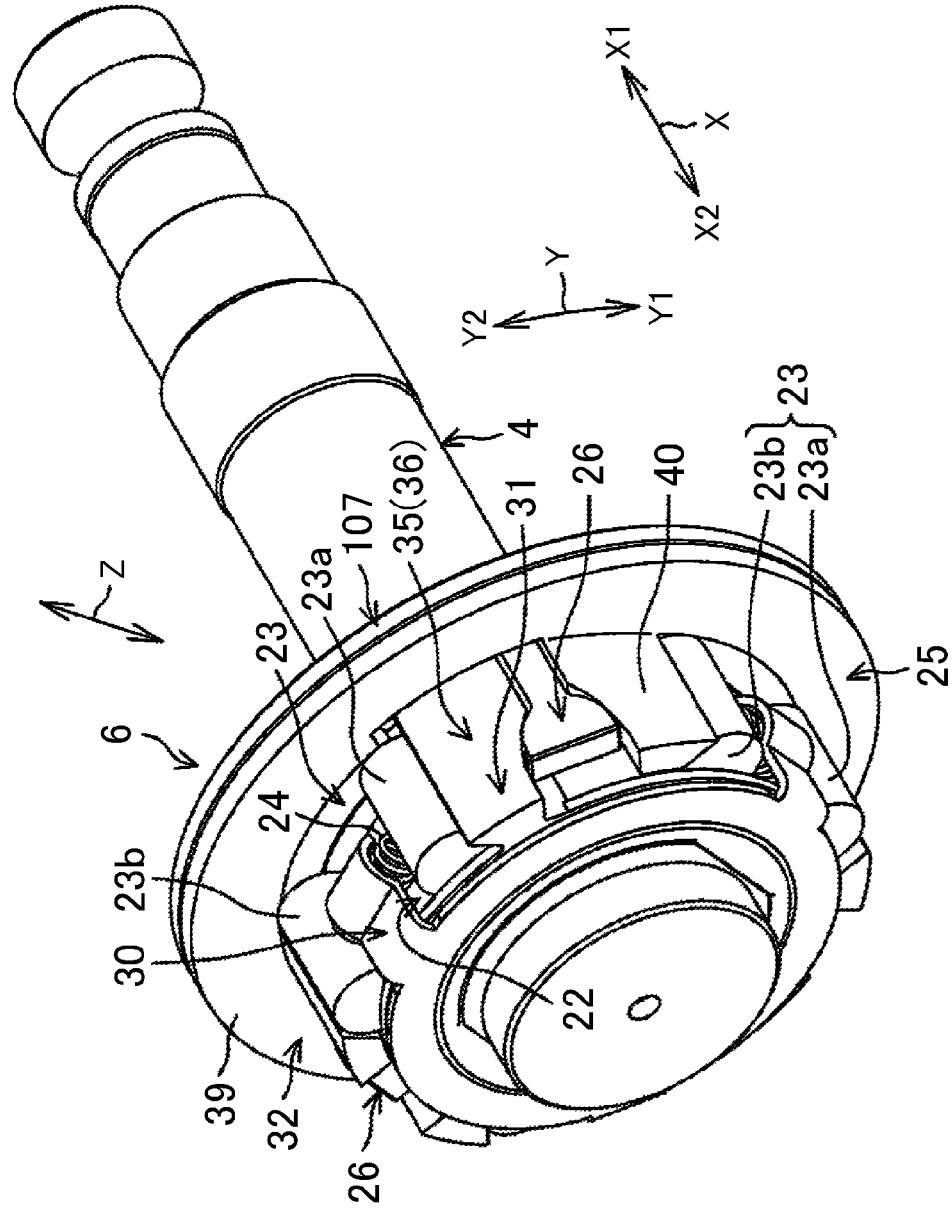
FIG. 34 is a perspective view illustrating a configuration of a two-way clutch included in the driving force transmission device according to the fifth embodiment.
Figure 37:
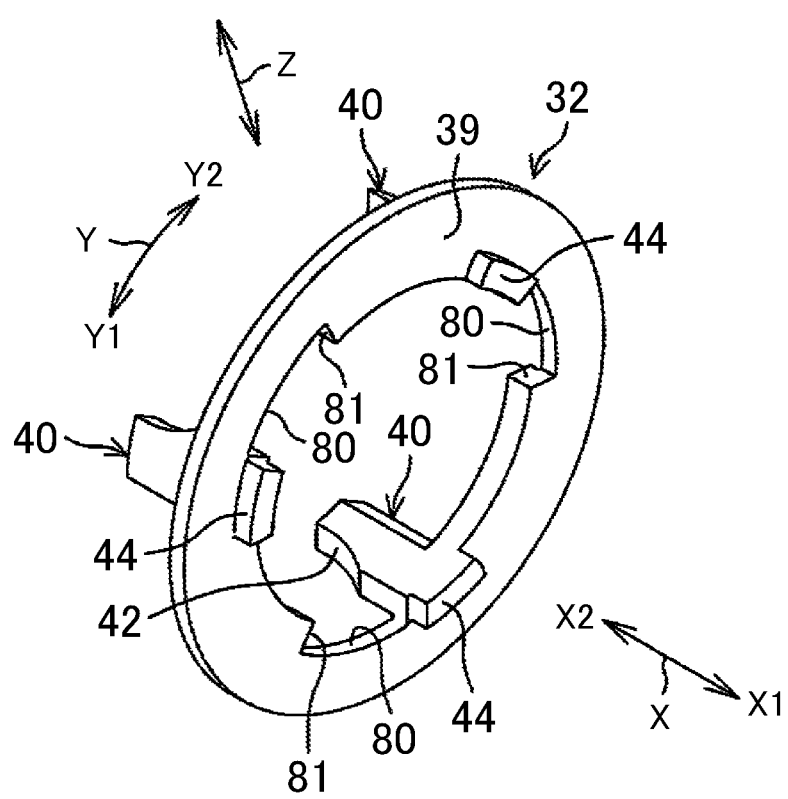
FIG. 37 is a perspective view illustrating a configuration of an outer cage.
Figure 38:
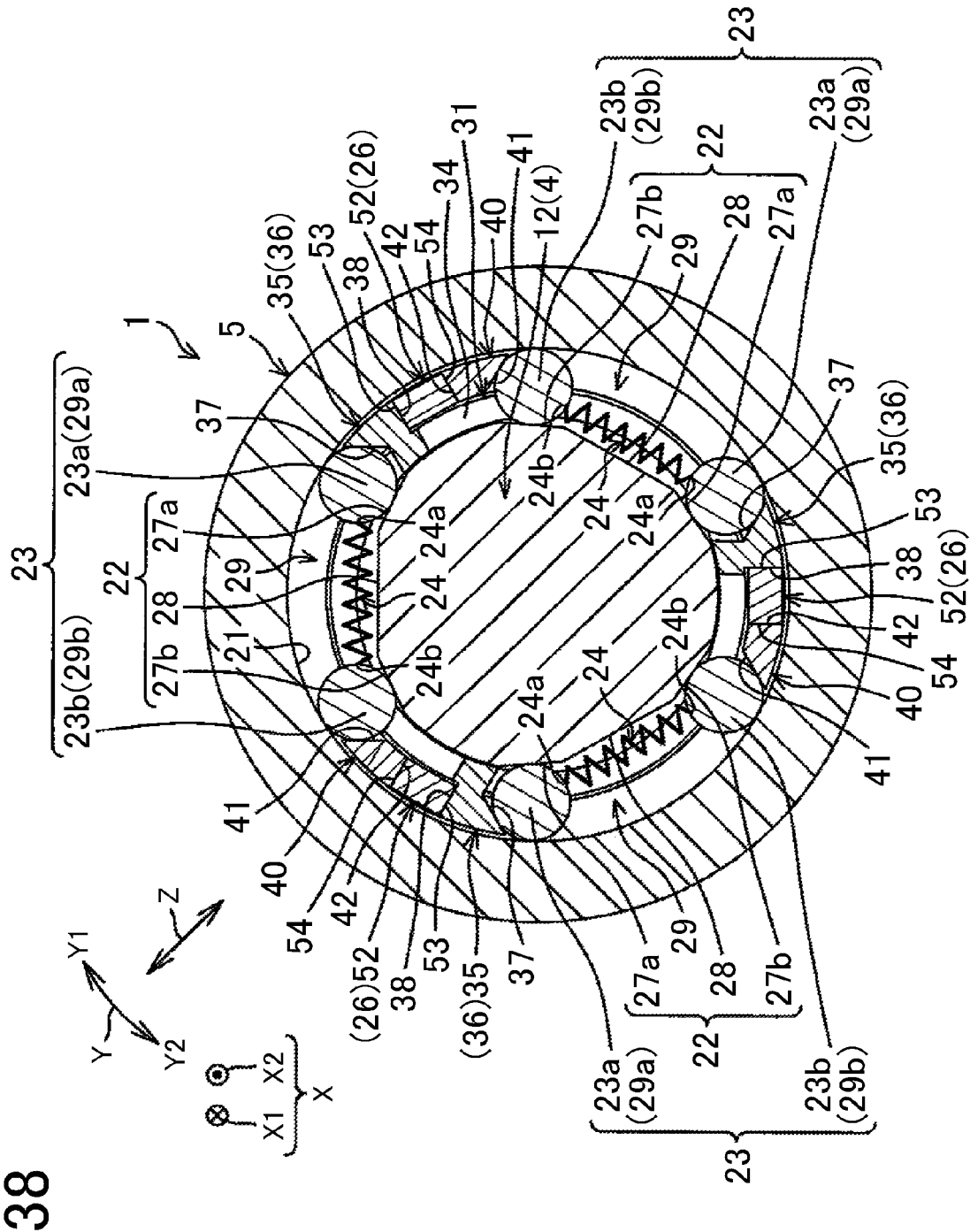
FIG. 38 is a sectional view of the configuration of the two-way clutch when viewed from a section line XXXVIII-XXXVIII in FIG. 33.

FIG. 34 is a perspective view illustrating a configuration of a two-way clutch 6. FIG. 35 is an exploded perspective view illustrating the configuration of the two-way clutch 6. FIGS. 36A and 36B are perspective views illustrating a configuration of an inner cage 31. In FIGS. 36A and 36B, the inner cage 31 is viewed from two different directions. FIG. 37 is a perspective view illustrating a configuration of an outer cage 32. FIG. 38 is a sectional view of the configuration of the two-way clutch 6 when viewed from a section line XXXVIII-XXXVIII in FIG. 33.

With reference to FIGS. 33 to 38, the following describes the configuration of the two-way clutch 6. In FIGS. 34 and 35, a large diameter portion 12 is mainly illustrated in an inner ring 4. Further, an outer ring 5 is not illustrated in FIGS. 34, 35, 38. Further, FIG. 38 illustrates a fastened state of the two-way clutch 6. The two-way clutch 6 includes: a cylindrical surface 21 provided on an inner periphery of a second annular stepped portion 14 of the outer ring 5; a plurality of (e.g., three) cam surfaces 22 provided on an outer periphery of the large diameter portion 12 of the inner ring 4 so as to be arranged at regular intervals in a circumferential direction Y; a plurality of (e.g., three) roller pairs 23; a plurality of (e.g., the same number as the number of roller pairs 23) elastic members 24; a cage 25 that retains the roller pairs 23 and the elastic members 24; a plurality of (the same number as the number of roller pairs 23) wedge members (guide members) 26 made of synthetic resin and connected to an armature 71 of an electromagnetic clutch 7 so as to be movable together with the armature 71 in an axial direction X; and a back plate (a holding plate) 107 placed between the cage 25 and the armature 71 so as to hold the wedge members 26.

As illustrated in FIG. 35, an elastic-member cage 30 that collectively supports the elastic members 24 may be fitted to an outer periphery of to the inner ring 4 so that the plurality of elastic members 24 is attached to the outer periphery of the inner ring 4.

Each of the connecting portions 35 has a pillar shape extending along the axial direction X. On a surface of each of the connecting portions 35 on a circumferential second side Y2, a first abutting surface 37 (mainly see FIG. 38) that can contact (press) a first roller 23a of the roller pair 23 is formed. Each of the connecting portions 35 integrally includes: a first projection 36 (having the first abutting surface 37) projecting from an outer periphery of the first annular portion 33 toward an axial first side X1; and a first regulation projection 45 provided in an end portion of the first projection 36 on the axial first side X1. That is, the first annular portion 33 is provided with the same number of (three in this embodiment) first regulation projections 45 as the number of wedge members 26.

The first abutting surface 37 is constituted by a flat surface, for example. That is, the first abutting surface 37 can make surface contact with the first roller 23a. However, the first abutting surface 37 is not limited to one that makes surface contact with the first roller 23a, and may be configured to make line contact or point contact with the first roller 23a. A length of the first regulation projection 45 in the axial direction X is set to be substantially the same as a thickness of the back plate 107. From a different viewpoint, each first regulation projection 45 is placed (provided) on an outer periphery of the third annular portion 34 as illustrated in FIGS. 36A and 36B. An outer periphery of each first projection 36 and an outer periphery of each first regulation projection 45 form the same cylindrical surface.

On a surface of each first projection 36 on the circumferential first side Y1, a first slid-contact surface 38 (mainly see FIGS. 35 and 38) that makes slide contact with a corresponding wedge member 26 is formed. The first slid-contact surface 38 is constituted by an inclined surface inclined toward the circumferential first side Y1 in a direction toward the axial first side X1. In this embodiment, the first slid-contact surface 38 is constituted by a recessed curved surface having an arc shape or an elliptical arc shape. The recessed curved surface is curved in a recessed manner in the axial direction X with a curvature smaller than that of the first slide-contact surface 53 constituted by a projecting curved surface. Further, the first slid-contact surface 38 may have a shape obtained by combining a recessed curved surface and a flat surface (an inclined surface) or may be formed of a flat surface (an inclined surface).

On an inner periphery of a second annular portion 39, receptacle recessed portions 80 each recessed outwardly in the radial direction Z are formed over the axial direction X. The same number of (e.g., three) receptacle recessed portions 80 as the number of second projections 40 are provided such that one receptacle recessed portion 80 corresponds to one second projection 40. In the second annular portion 39, each of the receptacle recessed portions 80 is formed in a region adjacent to a circumferential second side Y2 of a corresponding second projection 40. Each of the receptacle recessed portions 80 is a recessed portion through which an insertion portion 51 of the wedge member 26 and the first regulation projection 45 of the inner cage 31 are inserted.

As illustrated in FIGS. 35 and 37, each of the receptacle recessed portions 80 may be provided so as to be elongated in the circumferential direction Y, so that a side face 81 thereof on the circumferential second side Y2 engages with the first regulation projection 45 so as to regulate (restrict) an amount of relative rotation of the inner cage 31 and the outer cage 32. On a surface of each of the second projections 40 on the circumferential first side Y1, a second abutting surface 41 (mainly see FIG. 38) that can contact (press) a second roller 23b of the roller pair 23 is formed. The second abutting surface 41 is constituted by a flat surface, for example. That is, the second abutting surface 41 can make surface contact with the second roller 23b. However, the second abutting surface 41 is not limited to one that makes surface contact with the second roller 23b, and may be configured to make line contact or point contact with the second roller 23b.

On a surface of each of the second projections 40 on the circumferential second side Y2, a second slid-contact surface 42 (mainly see FIGS. 35 and 38) that makes slide contact with a corresponding wedge member 26 is formed. The second slid-contact surface 42 is constituted by an inclined surface inclined toward the circumferential second side Y2 in the direction toward the axial first side X1. In this embodiment, the second slid-contact surface 42 is constituted by a recessed curved surface having an arc shape or an elliptical arc shape. The recessed curved surface is curved in a recessed manner in the axial direction X with a curvature smaller than that of a second slide-contact surface 54 constituted by a projecting curved surface. Further, the second slid-contact surface 42 may have a shape obtained by combining a recessed curved surface and a flat surface (an inclined surface) or may be formed of a flat surface (an inclined surface).

As illustrated in FIG. 37, the second annular portion 39 is provided with the same number of (three in this embodiment) second regulation projections 44 as the number of wedge members 26. The second regulation projections 44 have a pillar shape projecting toward the axial first side X1. Each of the second regulation projections 44 is integrally provided in the second annular portion 39 at the same position as the position of the second projection 40 (that is, on an inner peripheral portion of the second annular portion 39). A length of the second regulation projection 44 in the axial direction X is set to be substantially the same as a thickness of the back plate 107. From a different viewpoint, each of the second regulation projections 44 is placed (provided) on the inner periphery of the second annular portion 39 as illustrated in FIG. 37. Further, an outer periphery of each of the second projections 40 and an outer periphery of each of the second regulation projections 44 form the same cylindrical surface.

As illustrated in FIG. 34, the inner cage 31 and the outer cage 32 are combined so that the plurality of connecting portions 35 and the plurality of second projections 40 are arranged alternately in the circumferential direction Y. On the circumferential second side Y2 relative to each of the connecting portions 35, a second projection 40 that can press a second roller 23b paired with a first roller 23a that can be pressed by the connecting portion 35 is provided adjacently via the roller pair 23. Further, on the circumferential first side Y1 relative to each of the connecting portions 35, a second projection 40 (hereinafter referred to as the "second projection 40 for the adjacent roller pair 23") that can press a second roller 23b of an adjacent roller pair 23 provided adjacently, on the circumferential first side Y1, to the roller pair 23 including the first roller 23a that can be pressed by the connecting portion 35 is provided adjacently via a wedge member 26. That is, in the inner cage 31 and the outer cage 32, a connecting portion 35 that can press a first roller 23a of each roller pair 23 and a second projection 40 that can press a second roller 23b of an adjacent roller pair 23 that is adjacent to a circumferential first side Y1 of the roller pair 23 are adjacent to each other via one wedge member 26. Since the first regulation projection 45 is provided in the connecting portion 35 and the second regulation projection 44 is placed in the second annular portion 39 at the same position as the position of the second projection 40, the wedge member 26 is sandwiched between the first regulation projection 45 and the second regulation projection 44 in the circumferential direction Y.

Figure 39A:
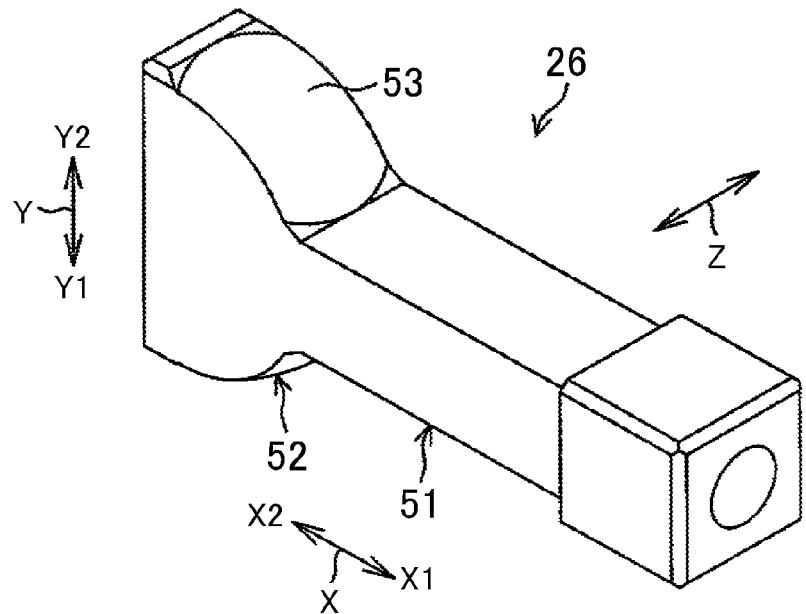
FIG. 39A is a perspective view illustrating a configuration of a wedge member.
Figure 39B:
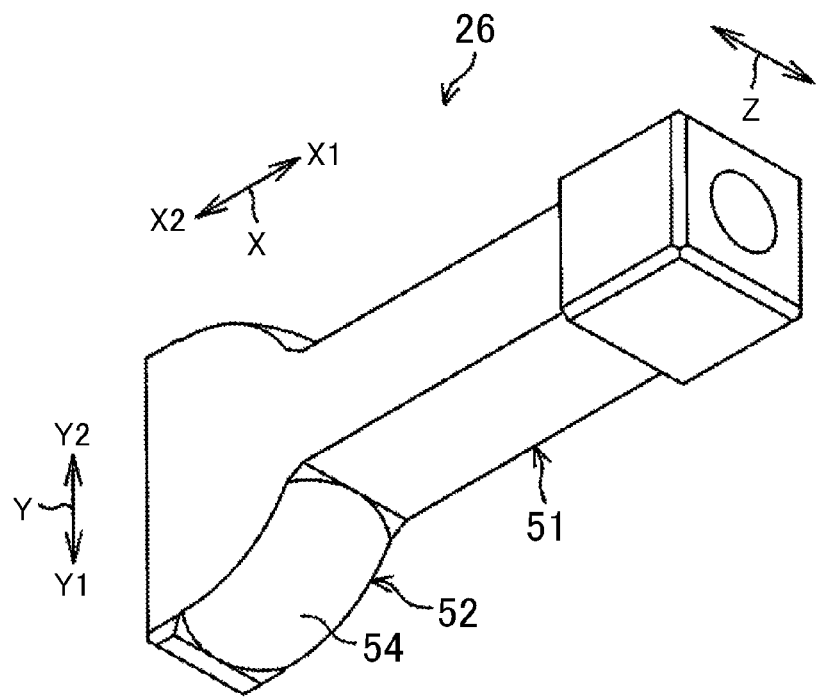
FIG. 39B is a perspective view illustrating the configuration of the wedge member.

One corresponding wedge member 26 is inserted between each of the connecting portions 35 and a second projection 40 for the adjacent roller pair 23. FIGS. 39A and 39B are perspective views each illustrating a configuration of the wedge member 26. In FIGS. 39A and 39B, the wedge member 26 is viewed from two different directions. Each of the wedge members 26 includes: an insertion portion 51 inserted between the connecting portion 35 (see FIG. 34, etc.) and the second projection 40 (see FIG. 34, etc.) for the adjacent roller pair 23; and a wedge portion 52 that expands toward both sides in the circumferential direction Y from the other end of the insertion portion 51 in the axial direction X. The insertion portion 51 extends in a stick shape along the axial direction X and a section orthogonal to its axis has a rectangular shape. The wedge portion 52 includes a first slide-contact surface 53 provided on a surface thereof on the circumferential second side Y2, and a second slide-contact surface 54 provided on a surface thereof on the circumferential first side Y1.

The first slide-contact surface 53 is constituted by an inclined surface inclined toward the circumferential first side Y1 in a direction toward the axial first side X1. In this embodiment, the first slide-contact surface 53 is constituted by a projecting curved surface having a spherical shape or a generally spherical shape. The second slide-contact surface 54 is constituted by an inclined surface inclined toward the circumferential second side Y2 in the direction toward the axial first side X1. In this embodiment, the second slide-contact surface 54 is constituted by a projecting curved surface having a spherical shape or a generally spherical shape.

Further, the first and second slide-contact surfaces 53, 54 may be formed of a flat surface (an inclined surface). As illustrated in FIG. 33, the electromagnetic clutch 7 includes an annular armature 71 to which the plurality of wedge members 26 is fixed and connected, an annular rotor 72 that is positioned on the axial first side X1 relative to the armature 71 and is opposed to the armature 71, and an electromagnet 73 placed on the axial first side X1 relative to the rotor 72.

The armature 71 is placed on the axial first side X1 via the back plate 107 relative to the third annular portion 34 of the inner cage 31 and the second annular portion 39 of the outer cage 32 (that is, the back plate 107 is disposed between the armature 71, and the third annular portion 34 of the inner cage 31 and the second annular portion 39 of the outer cage 32). The armature 71 is provided so as to be rotatable and movable in the axial direction X relative to a housing 8 and the inner ring 4. The rotor 72 is fitted to the outer periphery of the inner ring 4. The electromagnet 73 includes an electromagnetic coil 73a and a core 73b that supports the electromagnetic coil 73a. An outer periphery of the core 73b is fitted to an inner periphery of the housing 8 in a fixed manner. An inner periphery of the core 73b is supported by a third rolling bearing 74 fitted to an outer periphery of the inner ring 4 in a fixed manner so that the core 73b is rotatable relative to the inner ring 4 and immovable in the axial direction X. Due to the third rolling bearing 74, the electromagnet 73 and a first shaft body 2 are relatively rotatable.

Figure 40:
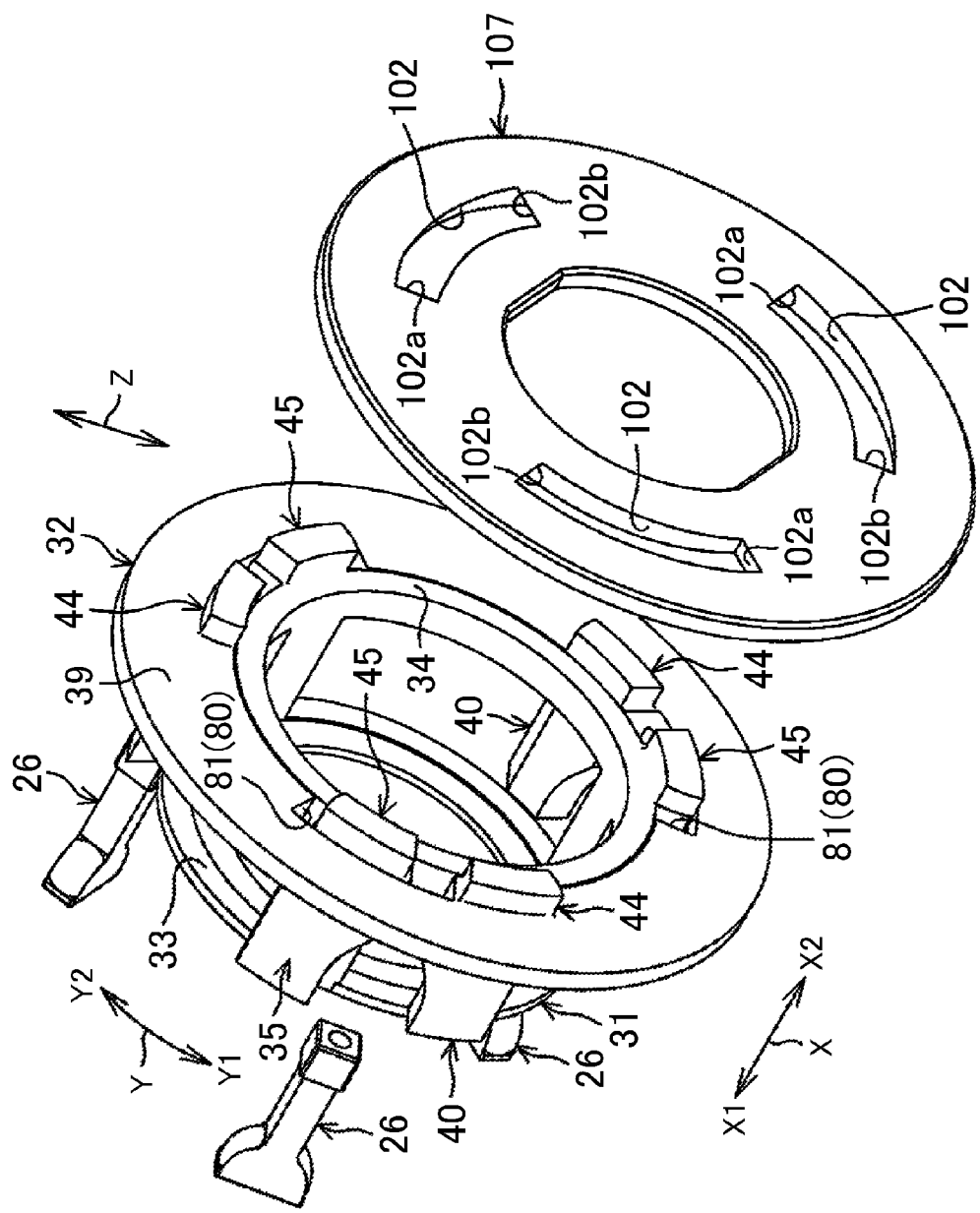
FIG. 40 is an exploded perspective view illustrating a partial configuration of the two-way clutch.

FIG. 40 is an exploded perspective view illustrating a partial configuration of the two-way clutch 6 (a configuration including the inner cage 31, the outer cage 32, the back plate 107, and the wedge member 26). As illustrated in FIGS. 33 and 40, the back plate 107 has a toric shape and is fitted to an outer periphery of a shaft portion 11 of the inner ring 4 in a fixed manner. The back plate 107 is formed by use of a steel material, for example. A principal surface 101A of the back plate 107 on the axial second side X2 makes slide contact with respective principal surfaces, on the axial first side X1, of the third annular portion 34 and the second annular portion 39. A plurality of (the same number as the number of wedge members 26) insertion recesses 102 is provided in the back plate 107 at regular intervals in the circumferential direction Y. The insertion recesses 102 are provided such that one insertion recess 102 corresponds to one wedge member 26. Each of the wedge members 26 is inserted through a corresponding insertion recess 102 so as to be connected to the armature 71 in a fixed manner.

In this embodiment, each of the insertion recesses 102 is an insertion hole extending through the back plate 107 in the axial direction X. Each of the insertion recesses 102 is a circumferential hole extending along the circumferential direction Y and has a fan shape when viewed from the axial direction X. Each of the insertion recesses 102 has, on the circumferential first side Y1, a side face (a circumferential first side end portion) 102a constituted by a flat surface. Further, each of the insertion recesses 102 has, on the circumferential second side Y2, a side face (a circumferential second side end portion) 102b constituted by a flat surface.

Each of the insertion recesses 102 is provided so that its length in the circumferential direction Y is a length that allows the first regulation projection 45, the second regulation projection 44, and the insertion portion 51 of the wedge member 26 to be collectively inserted therethrough. The first regulation projection 45, the second regulation projection 44, and the insertion portion 51 are inserted through each of the insertion recesses 102 in a state where the insertion portion 51 is sandwiched between the first regulation projection 45 and the second regulation projection 44 in the circumferential direction Y.

Figure 41:
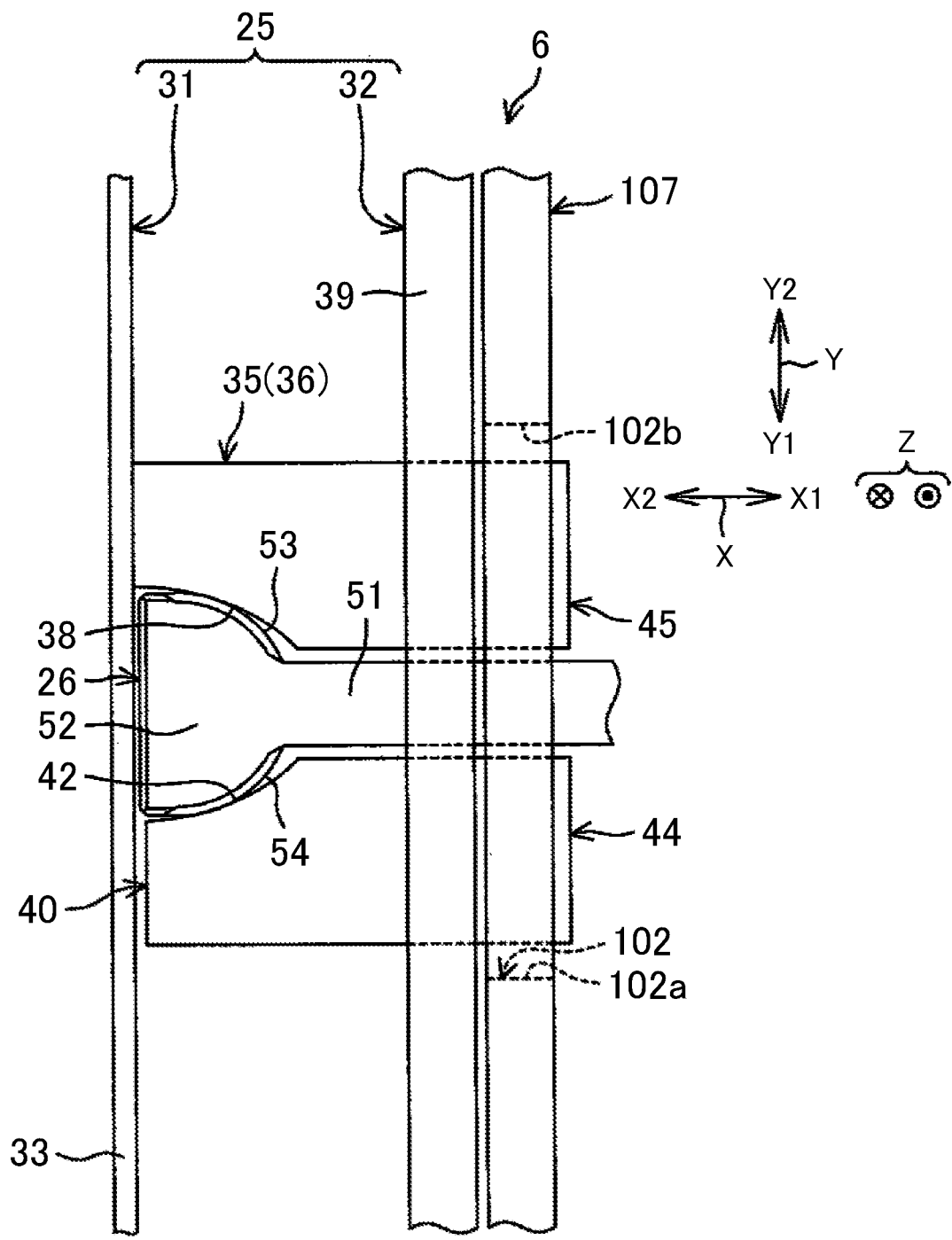
FIG. 41 is a side view illustrating a positional relationship of the wedge member with respect to the inner cage and the outer cage in a fastened state of the two-way clutch.
Figure 42:
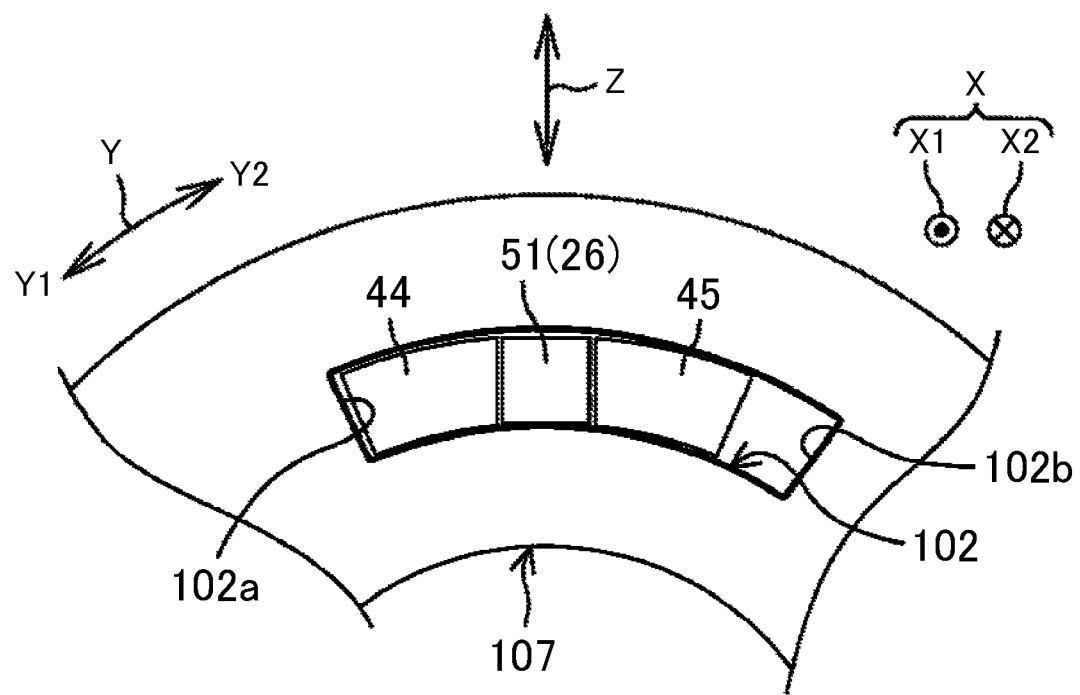
FIG. 42 is a front view illustrating a positional relationship of the wedge member with respect to the inner cage and the outer cage in a fastened state of the two-way clutch.
Figure 43:
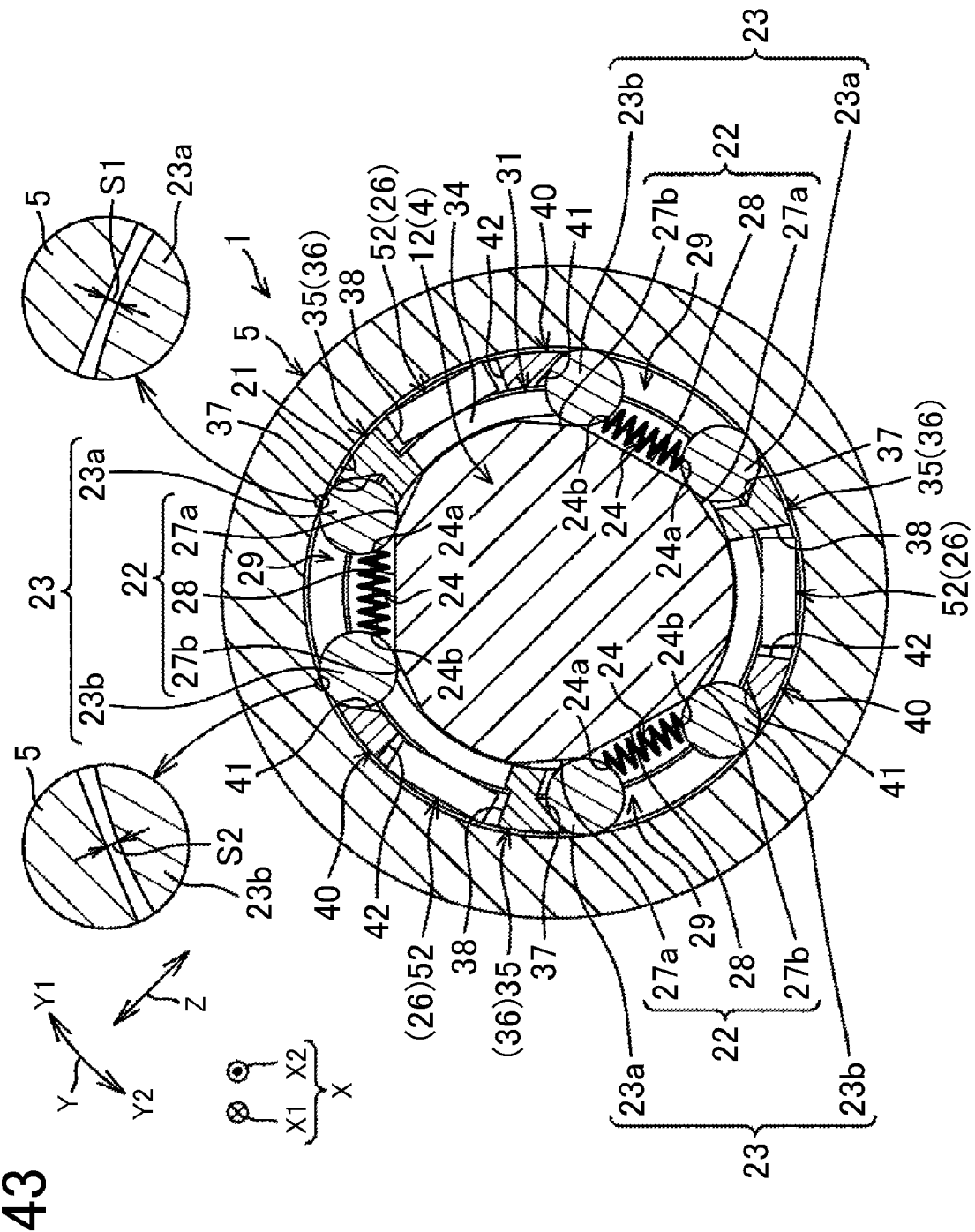
FIG. 43 is a sectional view illustrating the configuration of the two-way clutch in a released state of the two-way clutch.
Figure 44:
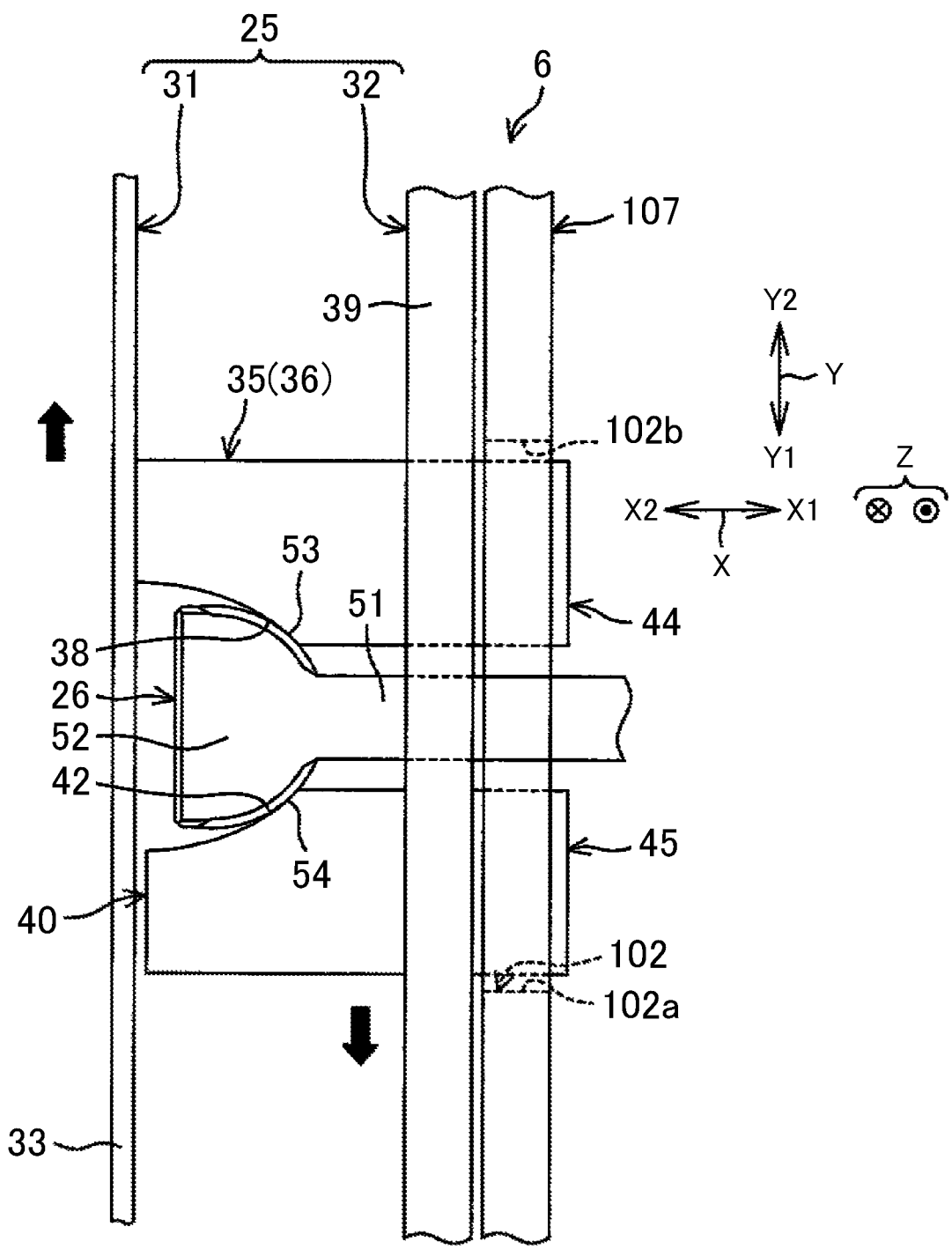
FIG. 44 is a side view illustrating a positional relationship of the wedge member with respect to the inner cage and the outer cage in a released state of the two-way clutch.
Figure 45:
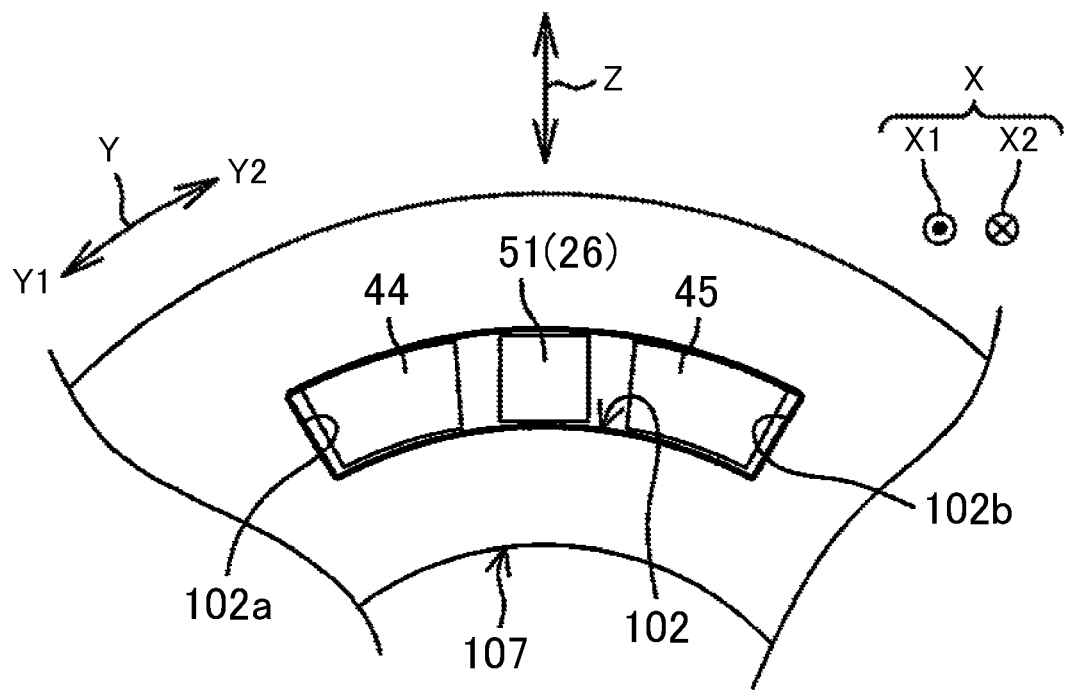
FIG. 45 is a front view illustrating a positional relationship of the wedge member with respect to the inner cage and the outer cage in a released state of the two-way clutch.

FIG. 41 is a side view illustrating a positional relationship of the wedge member 26 with respect to the inner cage 31 and the outer cage 32 in a fastened state of the two-way clutch 6. FIG. 42 is a front view illustrating a positional relationship of the wedge member 26 with respect to the inner cage 31 and the outer cage 32 in a fastened state of the two-way clutch 6. FIG. 43 is a sectional view illustrating the configuration of the two-way clutch 6 in a released state of the two-way clutch 6. FIG. 44 is a side view illustrating a positional relationship of the wedge member 26 with respect to the inner cage 31 and the outer cage 32 in a released state of the two-way clutch 6. FIG. 45 is a front view illustrating a positional relationship of the wedge member 26 with respect to the inner cage 31 and the outer cage 32 in a released state of the two-way clutch 6. In FIGS. 42 and 45, the wedge member 26 is viewed from the axial first side X1.

Along with a rotation of the inner ring 4, the back plate 107, which is fitted and fixed to the outer periphery of the inner ring 4, rotates. Since the first regulation projection 45, the second regulation projection 44, and the insertion portion 51 of the wedge member 26 are inserted through (that is, engage with) the insertion recess 102 of the back plate 107, the inner cage 31, the outer cage 32, and each of the wedge members 26 rotate along with the rotation of the back plate 107.

As illustrated in FIGS. 38 and 41, in an OFF state of the electromagnetic clutch 7, the two-way clutch 6 is in a fastened state and the armature 71 is not attracted by the electromagnet 73. Accordingly, the armature 71 is placed at an initial position, and the wedge member 26 provided in the armature 71 in a movable manner in the axial direction X is placed at a first position (an initial position; a position of the wedge member 26 illustrated in FIG. 41).

In this state, as illustrated in FIG. 38, each first roller 23a is elastically pressed by the elastic member 24 toward a first engaged position 29a provided in an end portion of a wedge space 29 on the circumferential first side Y1. When the first roller 23a is placed at the first engaged position 29a, the first roller 23a engages with the outer periphery of the inner ring 4 (the large diameter portion 12) and the inner periphery of the outer ring 5 (the second annular stepped portion 14). Further, in this state, each second roller 23b is elastically pressed by the elastic member 24 toward a second engaged position 29b provided in an end portion of the wedge space 29 on the circumferential second side Y2. When the second roller 23b is placed at the second engaged position 29b, the second roller 23b engages with the outer periphery of the inner ring 4 (the large diameter portion 12) and the inner periphery of the outer ring 5 (the second annular stepped portion 14). Thus, in an OFF state of the electromagnetic clutch 7, the first and second rollers 23a, 23b engage with the outer periphery of the inner ring 4 and the inner periphery of the outer ring 5, so that the two-way clutch 6 is turned into a fastened state.

In the meantime, when the electromagnetic clutch 7 is turned into an ON state, the armature 71 is attracted by the electromagnetic clutch 7 as illustrated in FIG. 44, so that the plurality of wedge members 26 connected to the armature 71 is drawn toward the axial first side X1 (the plurality of wedge members 26 moves in the axial direction X). Due to the drawing, the wedge member 26 is placed at a second position (a drawing position; a position of the wedge member 26 illustrated in FIG. 44) on the axial first side X1 relative to the first position (a position of the wedge member 26 illustrated in FIG. 41).

The first slide-contact surface 53 provided on the surface of the wedge member 26 on the circumferential second side Y2 is constituted by a surface directed toward the circumferential first side Y1 in a direction toward the axial first side X1. Accordingly, along with a movement of each of the wedge members 26 toward the axial first side X1, the first slide-contact surface 53 guides the connecting portion 35 toward the circumferential second side Y2 while the first slide-contact surface 53 makes slide contact with the first slid-contact surface 38 of the connecting portion 35. Further, the second slide-contact surface 54 provided on the surface of the wedge member 26 on the circumferential first side Y1 is constituted by a surface directed toward the circumferential second side Y2 in the direction toward the axial first side X1. Accordingly, along with a movement of each of the wedge members 26 toward the axial first side X1, the second slide-contact surface 54 guides the second projection 40 toward the circumferential first side Y1 while the second slide-contact surface 54 makes slide contact with the second slid-contact surface 42 of the second projection 40 for the adjacent roller pair 23.

That is, along with the movement of each of the wedge members 26 toward the axial first side X1, the connecting portion 35 and the second projection 40 for the adjacent roller pair 23 are separated from each other relative to the wedge member 26 (the insertion portion 51). As a result, the inner cage 31 rotates toward the circumferential second side Y2 relative to the wedge member 26, and the outer cage 32 rotates toward the circumferential first side Y1 relative to the wedge member 26. In a case where the inner cage 31 and the outer cage 32 rotate relative to the back plate 107, the third annular portion 34 of the inner cage 31 and the second annular portion 39 of the outer cage 32 each make slide contact with the principle surface 101A of the back plate 107 along with the rotation.

Along with the rotation of the inner cage 31 toward the circumferential second side Y2 relative to the wedge member 26, each first abutting surface 37 moves toward the circumferential second side Y2, and thus, each first abutting surface 37 contacts a corresponding first roller 23a so as to press the corresponding first roller 23a toward the circumferential second side Y2. This moves each first roller 23a toward the circumferential second side Y2 against an elastic pressing force from the elastic member 24. This accordingly separates each first roller 23a from the first engaged position 29a (see FIG. 38), so that a gap S1 is formed between the first roller 23a and the inner periphery of the outer ring 5 as illustrated in FIG. 43. As a result, the engagement of each first roller 23a with the outer periphery of the inner ring 4 and the inner periphery of the outer ring 5 is released.

Further, along with the rotation of the outer cage 32 toward the circumferential first side Y1 relative to the wedge member 26, each second abutting surface 41 moves toward the circumferential first side Y1, and thus, each second abutting surface 41 contacts a corresponding second roller 23b so as to press the corresponding second roller 23b toward the circumferential first side Y1. This moves each second roller 23b toward the circumferential first side Y1 against an elastic pressing force from the elastic member 24. This accordingly separates each second roller 23b from the second engaged position 29b (see FIG. 38), so that a gap S2 is formed between each second roller 23b and the inner periphery of the outer ring 5 as illustrated in FIG. 43. As a result, the engagement of each second roller 23b with the outer periphery of the inner ring 4 and the inner periphery of the outer ring 5 is released.

Thus, in an ON state of the electromagnetic clutch 7, each of the rollers 23a, 23b is disengaged from the outer periphery of the inner ring 4 (the large diameter portion 12) and the inner periphery of the outer ring 5, so that the two-way clutch 6 is turned into a released state. In the two-way clutch 6, the first and second slide-contact surfaces 53, 54 have a common specification, and the first and second slid-contact surfaces 38, 42 have a common specification. Accordingly, a rotation amount of the inner cage 31 and a rotation amount of the outer cage 32 along with the movement of the wedge members 26 toward the axial first side X1 are equal to each other.

In the meantime, one of the inner cage 31 and the outer cage 32 (e.g., the outer cage 32) may have difficulty in rotating (a state may occur in which one of them does not rotate or has difficulty in rotating). In this case, when the wedge member 26 moves toward the axial first side X1 due to the drive of the electromagnetic clutch 7, the wedge member 26 itself may move toward the circumferential second side Y2 due to slide contact between the second slide-contact surface 54 (see FIG. 41, etc.) and the second slid-contact surface 42 (see FIG. 41, etc.), because the outer cage 32 does not move (or has difficulty in moving).

In this embodiment, the first and second regulation projections 45, 44 are inserted through the insertion recess 102 in a state where the insertion portion 51 of the wedge member 26 is sandwiched between the first and second regulation projections 45, 44 in the circumferential direction Y. Since the inner cage 31 and the outer cage 32 are provided so as to be rotatable relative to the back plate 107, the first and second regulation projections 45, 44 rotate relative to the back plate 107 along with the rotation of the inner cage 31 and the outer cage 32.

When the first regulation projection 45 engages with the side face 102b of the insertion recess 102 on the circumferential second side Y2, further rotation of the inner cage 31 toward the circumferential second side Y2 relative to the back plate 107 is regulated (restricted). That is, a rotation amount of the inner cage 31 relative to the back plate 107 is regulated (restricted) due to the engagement between the first regulation projection 45 and the side face 102b. Further, when the second regulation projection 44 engages with the side face 102a of the insertion recess 102 on the circumferential first side Y1, further rotation of the outer cage 32 toward the circumferential first side Y1 relative to the back plate 107 is regulated (restricted). That is, a rotation amount of the outer cage 32 relative to the back plate 107 is regulated (restricted) due to the engagement between the second regulation projection 44 and the side face 102a.

Thus, in a case where the inner cage 31 and the outer cage 32 rotate along with the movement of the wedge member 26 in the axial direction X due to the drive of the electromagnetic clutch 7, it is possible to prevent the inner cage 31 from rotating excessively and to prevent the outer cage 32 from rotating excessively. Accordingly, in a case where the inner cage 31 has difficulty in rotating, it is possible to prevent the outer cage 32 from rotating excessively, and due to its reaction force, it is possible to give, to the inner cage 31, a force to cause the inner cage 31 to rotate toward the circumferential second side Y2. Further, in a case where the outer cage 32 has difficulty in rotating, it is possible to prevent the inner cage 31 from rotating excessively, and due to its reaction force, it is possible to give, to the outer cage 32, a force to cause the outer cage 32 to rotate toward the circumferential first side Y1. Thus, it is possible to successfully rotate both cages 31, 32, thereby making it possible to successfully release the roller clutch including the roller pairs 23 (i.e., thereby making it possible to successfully release the roller pairs 23 of the roller clutch).

Further, excessive rotation of the inner cage 31 and the outer cage 32 is regulated (restricted) by the engagement of the first regulation projection 45 and the second regulation projection 44 provided in the inner cage 31 and the outer cage 32 with the insertion recess 102 formed in the back plate 107. Accordingly, in comparison with a case where another member for regulating excessive rotation is provided, it is possible to achieve reduction of the number of components, thereby making it possible to achieve cost reduction.

Further, since the first regulation projection 45 is provided in the connecting portion 35, it is possible to reduce the size of the inner cage 31, in comparison with a case where the first regulation projection 45 is provided separately from the connecting portion 35. One embodiment of the present invention has been described above, but the present invention can be carried out according to other embodiments. For example, the above embodiment deals with a case where each of the insertion recesses 102 is an insertion hole, but each of the insertion recesses 102 may be provided in a form of a groove connected to an inner periphery or an outer periphery of the back plate 107.

Further, the above embodiment deals with a case where the first regulation projection 45 is provided in the connecting portion 35, but the first regulation projection 45 may be provided in a part of the inner cage 31 other than the connecting portion 35. Further, the above embodiment deals with a case where the second regulation projection 44 is provided at the same position as the position of the second projection 40, but the second regulation projection 44 may be provided at a position different from the position of the second projection 40. Further, the above embodiment deals with a configuration in which the first regulation projection 45 is provided in the inner cage 31 and the second regulation projection 44 is provided in the outer cage 32, but the regulation projection 45 or 44 may be provided in only one of the inner cage 31 and the outer cage 32.

What is claimed is:

1. A driving force transmission device configured to switch between transmission and disconnection of a rotational driving force between a first shaft body and a second shaft body placed coaxially, the driving force transmission device comprising:
    an inner ring coaxially connected to the first shaft body;
    a tubular outer ring coaxially connected to the second shaft body and provided so as to be rotatable relative to the inner ring;
    a roller pair arranged in a circumferential direction in a wedge space formed by an outer periphery of the inner ring and an inner periphery of the outer ring, the roller pair being constituted by a first roller on a circumferential first side and a second roller on a circumferential second side;
    an elastic member configured to elastically press the first roller toward a first engaged position which is provided on the circumferential first side in the wedge space and at which the first roller engages with the outer periphery of the inner ring and the inner periphery of the outer ring, and configured to elastically press the second roller toward a second engaged position which is provided on the circumferential second side in the wedge space and at which the second roller engages with the outer periphery of the inner ring and the inner periphery of the outer ring;
    a first cage including a first pressing portion provided so as to press the first roller toward the circumferential second side, the first cage being configured to retain the roller pair;
    a second cage configured to retain the roller pair, the second cage including a second pressing portion provided so as to press the second roller toward the circumferential first side, the second cage being provided so as to be rotatable relative to the first cage;
    a first guide member configured to make slide contact with the first cage from the circumferential first side, the first guide member having a first slide-contact surface constituted by a tapered surface inclined toward the circumferential first side in a direction toward an axial first side, and the first guide member being provided so as to be axially movable;

a second guide member configured to make slide contact with the second cage from the circumferential second side, the second guide member having a second slide-contact surface constituted by a tapered surface inclined toward the circumferential second side in the direction toward the axial first side, and the second guide member being provided so as to be axially movable; and an electromagnetic clutch including an armature connected to the first and second guide members, the armature being configured to be driven such that the first and second guide members are axially movable, wherein along with rotation of the first cage toward the circumferential second side, the first pressing portion presses the first roller toward the circumferential second side, and along with rotation of the second cage toward the circumferential first side, the second pressing portion presses the second roller toward the circumferential first side.

2. The driving force transmission device according to claim 1, wherein:

the first cage includes a first annular portion and a first projection projecting from the first annular portion toward the axial first side;

the first pressing portion is provided in the first projection;

the second cage includes a second annular portion placed on the axial first side relative to the first annular portion coaxially with the first annular portion, and a second projection projecting from the second annular portion toward an axial second side; and the second pressing portion is provided in the second projection.

3. The driving force transmission device according to claim 2, wherein:

the first cage includes a first slid-contact portion with which the first slide-contact surface makes slide contact;

the first slid-contact portion is provided in the first projection;

the second cage includes a second slid-contact portion with which the second slide-contact surface makes slide contact; and the second slid-contact portion is provided in the second projection.

4. The driving force transmission device according to claim 3, wherein:

a plurality of roller pairs is provided in the circumferential direction;

in the first cage and the second cage, the first projection configured to press the first roller of each of the roller pairs and the second projection configured to press the second roller of an adjacent roller pair adjacent to a circumferential first side of the roller pair are adjacent to each other;

the first and second guide members each include a wedge member provided so as to be axially movable; and the wedge member includes the first slide-contact surface that makes slide contact with the first slid-contact portion of the first projection, and the second slide-contact surface that makes slide contact with the second slid-contact portion of the second projection.

5. The driving force transmission device according to claim 2, wherein:

the first annular portion is fitted to the outer periphery of the inner ring; and the first cage further includes a third annular portion placed on the axial first side relative to the first annular portion coaxially with the first annular portion and fitted to the outer periphery of the inner ring, and a connecting portion configured to connect the first annular portion with the third annular portion.

6. The driving force transmission device according to claim 3, wherein:

the first annular portion is fitted to the outer periphery of the inner ring; and the first cage further includes a third annular portion placed on the axial first side relative to the first annular portion coaxially with the first annular portion and fitted to the outer periphery of the inner ring, and a connecting portion configured to connect the first annular portion with the third annular portion.

7. The driving force transmission device according to claim 4, wherein:

the first annular portion is fitted to the outer periphery of the inner ring; and the first cage further includes a third annular portion placed on the axial first side relative to the first annular portion coaxially with the first annular portion and fitted to the outer periphery of the inner ring, and a connecting portion configured to connect the first annular portion with the third annular portion.

8. The driving force transmission device according to claim 5, wherein:

the second annular portion is placed so as to surround an outer side of the third annular portion;

the first annular portion restricts a movement of each of the rollers toward the axial second side; and the third annular portion restricts a movement of each of the rollers toward the axial first side.

9. The driving force transmission device according to claim 5, wherein the first projection is provided in the connecting portion.

10. The driving force transmission device according to claim 6, wherein the first projection is provided in the connecting portion.

11. The driving force transmission device according to claim 1, wherein:

one of the first cage and the second cage is provided with an engageable projection portion configured to engage the first cage and the second cage with each other;

the other one of the first cage and the second cage is provided with a receptacle recessed portion configured to receive the engageable projection portion; and an amount of relative rotation of the first cage and the second cage is restricted when the engageable projection portion engages with a regulation wall of the receptacle recessed portion.

12. The driving force transmission device according to claim 11, wherein:

the engageable projection portion is provided on the outer periphery of the first cage; and the receptacle recessed portion is provided on the inner periphery of the second cage.

13. The driving force transmission device according to claim 11, wherein in the first cage, the engageable projection portion is provided in a part including the first pressing portion provided so as to press the first roller toward the circumferential second side.

14. The driving force transmission device according to claim 12, wherein in the first cage, the engageable projection portion is provided in a part including the first pressing portion provided so as to press the first roller toward the circumferential second side.

15. The driving force transmission device according to claim 1, wherein:
   the first cage includes a first slid-contact surface with which the first slide-contact surface makes slide contact;
   the second cage includes a second slid-contact surface with which the second slide-contact surface makes slide contact; and
   the first slide-contact surface and the first slid-contact surface are provided such that a first contact angle at a contact point between the first slide-contact surface and the first cage is increased as the guide member moves toward the axial first side relative to the first cage, and/or the second slide-contact surface and the second slid-contact surface are provided such that a second contact angle at a contact point between the second slide-contact surface and the second cage is increased as the guide member moves toward the axial first side relative to the second cage.

16. The driving force transmission device according to claim 15, wherein at least one of the first slide-contact surface and the second slide-contact surface includes a first curved portion whose sectional shape along an axial direction is curved to protrude.

17. The driving force transmission device according to claim 16, wherein the at least one of the first slide-contact surface and the second slide-contact surface includes a second curved portion whose sectional shape along a radial direction is curved to protrude.

18. The driving force transmission device according to claim 16, wherein at least one of the first slid-contact surface and the second slid-contact surface, with which the at least one of the first slide-contact surface and the second slide-contact surface makes slide contact, is constituted by a recessed curved surface that is curved to be recessed with a curvature smaller than a curvature of the first curved portion in the axial direction.

19. The driving force transmission device according to claim 17, wherein at least one of the first slid-contact surface and the second slid-contact surface, with which the at least one of the first slide-contact surface and the second slide-contact surface makes slide contact, is constituted by a recessed curved surface that is curved to be recessed with a curvature smaller than a curvature of the first curved portion in the axial direction.

20. The driving force transmission device according to claim 16, wherein at least one of the first slid-contact surface and the second slid-contact surface, with which the at least one of the first slide-contact surface and the second slide-contact surface makes slide contact, is constituted by a recessed curved surface that is curved to be recessed with a curvature smaller than a curvature of the first curved portion in the axial direction, and a flat inclined surface that is continuous with an axial second side of the recessed curved surface.

21. The driving force transmission device according to claim 17, wherein at least one of the first slid-contact surface and the second slid-contact surface, with which the at least one of the first slide-contact surface and the second slide-contact surface makes slide contact, is constituted by a recessed curved surface that is curved to be recessed with a curvature smaller than a curvature of the first curved portion in the axial direction, and a flat inclined surface that is continuous with an axial second side of the recessed curved surface.

22. The driving force transmission device according to claim 1, further comprising:
   a regulation projection provided in at least one of the first cage and the second cage and extending toward the axial first side from the at least one of the first cage and the second cage; and
   a holding plate placed between the armature and each of the first cage and the second cage, the holding plate being configured to hold the guide member, the holding plate having an insertion recess through which the guide member and the regulation projection are inserted, and the holding plate being provided on the inner ring so as to be rotatable together with the inner ring, wherein:
   the first cage and the second cage are provided so as to be rotatable relative to the holding plate; and
   when the regulation projection engages with a circumferential end portion of the insertion recess, a rotation amount, relative to the holding plate, of the at least one of the first cage and the second cage provided with the regulation projection is restricted.

23. The driving force transmission device according to claim 22, wherein:
   the regulation projection includes a first regulation projection provided in the first cage, and a second regulation projection provided in the second cage;
   the first regulation projection and the second regulation projection are inserted through the insertion recess in a state where the guide member is sandwiched between the first regulation projection and the second regulation projection in the circumferential direction;
   when the first regulation projection engages with an end portion of the insertion recess on the circumferential second side, a rotation amount of the first cage relative to the holding plate is restricted; and
   when the second regulation projection engages with an end portion of the insertion recess on the circumferential first side, a rotation amount of the second cage relative to the holding plate is restricted.

* * * * *